United States Patent
Wilkinson et al.

(10) Patent No.: US 12,447,089 B2
(45) Date of Patent: Oct. 21, 2025

(54) MULTI-ACTIVE-AXIS, NON-EXOSKELETAL ROBOTIC REHABILITATION DEVICE

(71) Applicant: Barrett Technology, LLC, Newton, MA (US)

(72) Inventors: David D. Wilkinson, Dedham, MA (US); Alvin Yen, Newton, MA (US); Claude F. Valle, IV, Burlington, MA (US); Michael Schiess, Duxbury, MA (US); William T. Townsend, Weston, MA (US)

(73) Assignee: Barrett Technology, LLC, Newton, MA (US)

( * ) Notice: Subject to any disclaimer, the term of this patent is extended or adjusted under 35 U.S.C. 154(b) by 0 days.

(21) Appl. No.: 16/778,902

(22) Filed: Jan. 31, 2020

(65) Prior Publication Data
US 2020/0179212 A1    Jun. 11, 2020

Related U.S. Application Data

(63) Continuation-in-part of application No. 16/066,189, filed as application No. PCT/US2016/054999 on Sep.
(Continued)

(51) Int. Cl.
*A61H 1/02*    (2006.01)

(52) U.S. Cl.
CPC ... *A61H 1/0274* (2013.01); *A61H 2201/0107* (2013.01); *A61H 2201/0192* (2013.01);
(Continued)

(58) Field of Classification Search
CPC ...... A61H 1/0274; A61H 1/02; A61H 1/0277; A61H 1/0281; A61H 1/0285;
(Continued)

(56) References Cited

U.S. PATENT DOCUMENTS

| | | |
|---|---|---|
| 4,629,185 A | 12/1986 | Amann |
| 4,669,451 A | 6/1987 | Blauth et al. |

(Continued)

FOREIGN PATENT DOCUMENTS

| | | |
|---|---|---|
| CN | 101288620 | 10/2008 |
| CN | 101361678 A | 2/2009 |

(Continued)

OTHER PUBLICATIONS

•Loureiro et al. (NPL: R. C. V. Loureiro and W. S. Harwin, "Reach & Grasp Therapy: Design and Control of a 9-DOF Robotic Neurorehabilitation System," 2007 IEEE 10th International Conference on Rehabilitation Robotics, Noordwijk, Netherlands, 2007, pp. 757-763, doi: 10.1109/ICORR.2007.4428510.) (Year: 2007).*

(Continued)

*Primary Examiner* — Khoi H Tran
(74) *Attorney, Agent, or Firm* — Pandiscio & Pandiscio

(57) ABSTRACT

A robotic device for operation in association with a body of a user, wherein the body of the user comprises a torso and a limb, the robotic device comprising: a base; an arm having a first end and a second end, the first end of the arm being mounted to the base; an endpoint device having a first end and a second end, the first end of the endpoint device being mounted to the second end of the arm; and a grip configured to be gripped by a limb of a user, wherein the grip is mounted to the second end of the endpoint device, and further wherein the grip is adjustable relative to the endpoint device along a pitch axis, a yaw axis and a roll axis.

19 Claims, 38 Drawing Sheets

Related U.S. Application Data 30, 2016, which is a continuation-in-part of application No. 14/500,810, filed on Sep. 29, 2014, now Pat. No. 10,130,546.

(60) Provisional application No. 62/799,502, filed on Jan. 31, 2019, provisional application No. 62/340,832, filed on May 24, 2016, provisional application No. 62/235,276, filed on Sep. 30, 2015, provisional application No. 61/883,367, filed on Sep. 27, 2013.

(52) U.S. Cl.
CPC .......... A61H 2201/1215 (2013.01); A61H 2201/1638 (2013.01); A61H 2201/165 (2013.01); A61H 2201/1659 (2013.01); A61H 2201/5007 (2013.01); A61H 2201/5043 (2013.01)

(58) Field of Classification Search
CPC .... A61H 2201/0107; A61H 2201/1638; A61H 2201/1685; A61H 2201/0153
See application file for complete search history.

(56) References Cited

U.S. PATENT DOCUMENTS

| | | |
|---|---|---|
| 4,773,398 A | 9/1988 | Tatom |
| 4,903,536 A | 2/1990 | Salisbury, Jr. et al. |
| 5,089,007 A | 2/1992 | Kirsch et al. |
| 5,179,939 A | 1/1993 | Donovan et al. |
| 5,193,963 A | 3/1993 | McAffee et al. |
| 5,417,643 A | 5/1995 | Taylor |
| 5,466,213 A | 11/1995 | Hogan et al. |
| 6,695,795 B2 | 2/2004 | Knoll |
| 6,821,259 B2 | 11/2004 | Rahman et al. |
| 7,252,644 B2 | 8/2007 | Dewald et al. |
| 7,511,443 B2 | 3/2009 | Townsend et al. |
| 7,618,381 B2 | 11/2009 | Krebs et al. |
| 7,854,631 B2 | 12/2010 | Townsend et al. |
| 8,012,107 B2 | 9/2011 | Einav et al. |
| 8,177,732 B2 * | 5/2012 | Einav .................. A63B 21/012 601/5 |
| 8,317,730 B2 | 11/2012 | Zhang et al. |
| 8,409,118 B2 | 4/2013 | Agrawal et al. |
| 8,740,794 B2 | 6/2014 | Scott |
| 8,858,374 B2 | 10/2014 | Townsend |
| 8,968,220 B2 | 3/2015 | Han et al. |
| 9,044,630 B1 | 6/2015 | Lampert et al. |
| 9,144,529 B2 | 9/2015 | Culver |
| 9,358,173 B2 | 6/2016 | Fu et al. |
| 9,415,262 B2 | 8/2016 | An |
| 10,736,808 B2 | 8/2020 | Benda et al. |
| 11,161,002 B2 | 11/2021 | Radcliffe et al. |
| 2002/0169058 A1 | 11/2002 | Harmon |
| 2003/0023195 A1 | 1/2003 | Rahman et al. |
| 2003/0115954 A1 | 6/2003 | Zemlyakov et al. |
| 2004/0067832 A1 | 4/2004 | Hassler |
| 2006/0079817 A1* | 4/2006 | Dewald ............ A63B 21/4019 482/901 |
| 2006/0293617 A1 | 12/2006 | Einav et al. |
| 2007/0066918 A1 | 3/2007 | Dewald et al. |
| 2007/0270685 A1 | 11/2007 | Kang et al. |
| 2008/0010706 A1 | 1/2008 | Moses et al. |
| 2008/0033597 A1 | 2/2008 | Kraft |
| 2008/0161733 A1 | 7/2008 | Einav et al. |
| 2009/0140683 A1 | 6/2009 | Chang et al. |
| 2009/0276058 A1 | 11/2009 | Ueda et al. |
| 2010/0016766 A1 | 1/2010 | Zhang et al. |
| 2010/0100013 A1 | 4/2010 | Hu et al. |
| 2010/0113987 A1 | 5/2010 | Agrawal et al. |
| 2011/0127390 A1 | 6/2011 | Brown |
| 2011/0137464 A1 | 6/2011 | Sabater Navarro et al. |
| 2011/0164949 A1* | 7/2011 | Kim ....................... B25J 9/0006 414/1 |
| 2011/0213197 A1* | 9/2011 | Robertson ............ G16H 50/50 600/27 |
| 2011/0230801 A1 | 9/2011 | Bonutti et al. |
| 2011/0256983 A1 | 10/2011 | Malack et al. |
| 2011/0300994 A1 | 12/2011 | Verkaaik et al. |
| 2012/0029391 A1 | 2/2012 | Sung et al. |
| 2012/0077163 A1 | 3/2012 | Sucar Succar et al. |
| 2012/0109025 A1 | 5/2012 | Weinberg et al. |
| 2012/0179075 A1 | 7/2012 | Perry et al. |
| 2013/0060171 A1 | 3/2013 | Fu et al. |
| 2013/0237374 A1 | 9/2013 | Ashby |
| 2013/0237883 A1* | 9/2013 | Malosio .............. A61H 1/0281 601/33 |
| 2014/0016803 A1 | 1/2014 | Puskarich |
| 2014/0100491 A1 | 4/2014 | Hu et al. |
| 2014/0277726 A1 | 9/2014 | Nakamura et al. |
| 2014/0309779 A1 | 10/2014 | Niu |
| 2014/0316308 A1 | 10/2014 | Lee et al. |
| 2014/0336542 A1* | 11/2014 | Fu ...................... A61H 1/0277 601/5 |
| 2015/0290494 A1 | 10/2015 | King |
| 2016/0051434 A1 | 2/2016 | Erkilic et al. |
| 2017/0092094 A1* | 3/2017 | Yang ..................... A47C 9/002 |
| 2017/0361154 A1 | 12/2017 | Whitaker |
| 2018/0318648 A1 | 11/2018 | Rai et al. |
| 2019/0201273 A1 | 7/2019 | Soltani-Zarrin et al. |
| 2020/0197744 A1 | 6/2020 | Schweighofer |
| 2021/0298983 A1 | 9/2021 | Deshpande et al. |
| 2021/0322196 A1 | 10/2021 | McDaid |
| 2021/0346225 A1 | 11/2021 | Song et al. |
| 2022/0168167 A1 | 6/2022 | Xie et al. |

FOREIGN PATENT DOCUMENTS

| | | |
|---|---|---|
| CN | 101448467 | 6/2009 |
| CN | 102046081 A | 5/2011 |
| CN | 102149322 A | 8/2011 |
| CN | 102258849 | 11/2011 |
| CN | 102283761 | 12/2011 |
| CN | 202437606 | 9/2012 |
| CN | 102933269 A | 2/2013 |
| CN | 202776915 U | 3/2013 |
| CN | 103142383 | 6/2013 |
| CN | 103690333 | 4/2014 |
| CN | 204072658 | 1/2015 |
| CN | 108113848 | 6/2018 |
| CN | 110997245 | 4/2020 |
| EP | 2911754 | 9/2015 |
| EP | 2942044 | 11/2015 |
| GB | 2523502 | 8/2015 |
| JP | H02310948 | 12/1990 |
| JP | 3-73133 | 7/1991 |
| JP | 2004041519 A | 2/2004 |
| JP | 2004222777 A | 8/2004 |
| JP | 2005348779 A | 12/2005 |
| JP | 2007-050249 | 3/2007 |
| JP | 2015139825 A | 8/2015 |
| JP | 2015149795 A | 8/2015 |
| WO | WO 2006/047753 | 5/2006 |
| WO | WO 2008/047355 | 4/2008 |
| WO | WO 2015/041618 | 3/2015 |
| WO | WO 2015/048688 | 4/2015 |
| WO | WO 2015/087335 | 6/2015 |
| WO | WO 2017/059359 | 4/2017 |

OTHER PUBLICATIONS

Burgar, Charles G. et al., Development of robots for rehabilitation therapy: The Palo Alto VA/Standord experience, Journal of Rehabilitation Research and Development, vol. 36, No. 6, 2000, pp. 663-673.

Rose, Dorian K. et al., Bimanual Training After Stroke: Are Two Hands Better Than One?, Topics in Stroke Rehabilitation, vol. 11, No. 4, 2004, pp. 20-30.

Hocoma, "ArmeoPower", https://www.hocoma.com/solutions/armeo-power.

(56) References Cited

OTHER PUBLICATIONS

Hocoma, "ArmeoSpring", https://www.hocoma.com/solutions/armeo-spring.
Nef, T. et al., ARMin: a robot for patient-cooperative arm therapy, Med Bio Eng Comput, 2007, vol. 45, pp. 887-900.
Bai, J. et al., A Novel Human-Robot Cooperative Method for Upper Extremity Rehabilitation. Int J of Soc Robotics, 2017, vol. 9, pp. 265-275.
Krebs, H. et al., Rehabilitation Robotics: Performance-Based Progressive Robot-Assisted Therapy. Autonomous Robots, 2003, vol. 15, pp. 7-20.
Zaman, A. et al., Robot sensor system for supervised rehabilitation with real-time feedback. Multimedia Tools and Applications, 2020, vol. 79, pp. 26643-26660.

\* cited by examiner

MULTI-ACTIVE-AXIS, NON-EXOSKELETAL ROBOTIC REHABILITATION DEVICE

REFERENCE TO PENDING PRIOR PATENT APPLICATIONS

This patent application:
(i) is a continuation-in-part of prior U.S. patent application Ser. No. 16/066,189, filed Sep. 30, 2016 by Barrett Technology, LLC and William T. Townsend et al. for MULTI-ACTIVE-AXIS, NON-EXOSKELETAL REHABILITATION DEVICE, which application is a 371 of International (PCT) Patent Application No. PCT/US2016/054999, filed Sep. 30, 2016 by Barrett Technology, LLC and William T. Townsend et al. for MULTI-ACTIVE-AXIS, NON-EXOSKELETAL REHABILITATION DEVICE, which patent application:
  (a) is a continuation-in-part of prior U.S. patent application Ser. No. 14/500,810, filed Sep. 29, 2014 by Barrett Technology, LLC and William T. Townsend et al. for MULTI-ACTIVE-AXIS, NON-EXOSKELETAL REHABILITATION DEVICE, which patent application claims benefit of prior U.S. Provisional Patent Application Ser. No. 61/883,367, filed Sep. 27, 2013 by Barrett Technology, Inc. and William T. Townsend et al. for THREE-ACTIVE-AXIS REHABILITATION DEVICE;
  (b) claims benefit of prior U.S. Provisional Patent Application Ser. No. 62/235,276, filed Sep. 30, 2015 by Barrett Technology, Inc. and Alexander Jenko et al. for MULTI-ACTIVE-AXIS, NON-EXOSKELETAL REHABILITATION DEVICE; and
  (c) claims benefit of prior U.S. Provisional Patent Application Ser. No. 62/340,832, filed May 24, 2016 by Barrett Technology, LLC and William T. Townsend et al. for MULTI-ACTIVE-AXIS, NON-EXOSKELETAL REHABILITATION DEVICE; and
(ii) claims benefit of prior U.S. Provisional Patent Application Ser. No. 62/799,502, filed Jan. 31, 2019 by Barrett Technology, LLC and Michael Schiess et al. for A MOTORIZED END-EFFECTOR ENABLING WRIST PRONATION AND SUPINATION ON AN UPPER-EXTREMITY ROBOTIC THERAPY SYSTEM.

The seven (7) above-identified patent applications are hereby incorporated herein by reference.

STATEMENT REGARDING FEDERALLY SPONSORED RESEARCH OR DEVELOPMENT

This invention was made with Government support under Agreement No. R44HD080278 awarded by Department of Health and Human Services. The Government has certain rights in the invention.

FIELD OF THE INVENTION

This invention relates to devices for the rehabilitation of disabled persons with a neurological injury, such as stroke or spinal-cord injury, or otherwise impaired anatomical extremities.

BACKGROUND OF THE INVENTION

A new and exciting branch of physical and occupational therapies is therapy assisted by a computer-directed robotic arm or device (sometimes also called a "manipulator" to distinguish it from the human arm that may engage it, in certain embodiments). These robotic systems leverage plasticity in the brain, which literally rewires the brain. Recent science has demonstrated that dosage (i.e., the amount of time engaged in therapy) is an essential element in order to benefit from this effect. The potential benefits of using a manipulator system for tasks such as post-stroke rehabilitative therapy, which typically involves moving a patient's limb(s) through a series of repeated motions, are significant. There exist some types of therapy, such as error-augmentation therapy, that simply cannot be implemented effectively by a human therapist. Furthermore, computer-directed therapy can engage the patient in games, thereby making the experience more enjoyable and encouraging longer and more intense therapy sessions, which are known to benefit patients. Finally, the therapist is able to work with more patients, e.g., the therapist is able to work with multiple patients simultaneously, the therapist is able to offer patients increased therapy duration (higher dosage) since the session is no longer constrained by the therapist's physical endurance or schedule, and the therapist is able to work more consecutive therapy sessions since the number of consecutive therapy sessions is no longer constrained by the therapist's physical endurance or schedule.

A useful way to categorize robotic rehabilitation systems is by the number of degrees of freedom, or DOFs, that they have. Generally speaking, for mechanical systems, the degrees of freedom (DOFs) can be thought of as the different motions permitted by the mechanical system. By way of example but not limitation, the motion of a ship at sea has six degrees of freedom (DOFs): (1) moving up and down, (2) moving left and right, (3) moving forward and backward, (4) swiveling left and right (yawing), (5) tilting forward and backward (pitching), and (6) pivoting side to side (rolling). The majority of commercial robotic rehabilitation systems fall into one of two broad categories: low-DOF systems (typically one to three DOFs) which are positioned in front of the patient, and high-DOF exoskeletal systems (typically six or more DOFs) which are wrapped around the patient's limb, typically an arm or leg. Note that these exoskeletons also need the ability to adjust the link lengths of the manipulator in order to accommodate the differing geometries of specific patients. Generally speaking, an exoskeletal system can be thought of as an external skeleton mounted to the body, where the external skeleton has struts and joints corresponding to the bones and joints of the natural body. The current approaches for both categories (i.e., low-DOF systems and high-DOF exoskeletal systems) exhibit significant shortcomings, which have contributed to limited realization of the potential of robotic rehabilitation therapies.

Low-DOF systems are usually less expensive than high-DOF systems, but they typically also have a smaller range of motion. Some low-DOF systems, such as the InMotion ARM™ Therapy System of Interactive Motion Technologies of Watertown, Massachusetts, USA, or the KINARM End-Point Robot™ system of BKIN Technologies of Kingston, Ontario, Canada, are limited to only planar movements, greatly reducing the number of rehabilitation tasks that the systems can be used for. Those low-DOF systems which are not limited to planar movements must typically contend with issues such as avoiding blocking a patient's line of sight, like the DeXtreme™ system of BioXtreme of Rehovot, Israel; providing an extremely limited range of motion, such as with the ReoGO® system of Motorika Medical Ltd of Mount Laurel, New Jersey, USA; and insufficiently supporting a patient's limb (which can be critically important where the patient lacks the ability to support their own limb). Most of these systems occupy space in front of the patient, impinging on the patient's workspace, increasing the overall footprint needed for a single rehabilitation "station" and consuming valuable space within rehabilitation clinics.

High-DOF exoskeletal systems, such as the Armeo®Power system of Hocoma AG of Volketswil, Switzerland, the Armeo®Spring system of Hocoma AG of Volketswil, Switzerland, and the 8+2 DOF exoskeletal rehabilitation system disclosed in U.S. Pat. No. 8,317,730, are typically significantly more complex, and consequently generally more expensive, than comparable low-DOF systems. While such high-DOF exoskeletal systems usually offer greater ranges of motion than low-DOF systems, their mechanical complexity also makes them bulky, and they typically wrap around the patient's limb, making the high-DOF exoskeletal systems feel threatening and uncomfortable to patients. Furthermore, human joints do not conform to axes separated by links the way robots joints do, and the anatomy of every human is different, with different bone lengths and different joint geometries. Even with the high number of axes present in high-DOF exoskeletal systems, fine-tuning an exoskeleton system's joint locations and link lengths to attempt to follow those of the patient takes considerable time, and even then the high-DOF exoskeletal system frequently over-constrains the human's limb, potentially causing more harm than good.

Finally, there are a handful of currently-available devices which do not fit in either of the two categories listed above: for example, high-DOF non-exoskeletal devices, or low-DOF exoskeletal devices. To date, these devices have generally suffered the weaknesses of both categories, without leveraging the strengths of either. A particularly notable example is the KINARM Exoskeleton Robot™ of BKIN Technologies of Kingston, Ontario, Canada, which is an exoskeletal rehabilitation device designed for bi-manual and uni-manual upper-extremity rehabilitation and experimentation in humans and non-human primates. Like the KINARM End-Point Robot™ of BKIN Technologies of Kingston, Ontario, Canada (see above), the KINARM Exoskeletal Robot™ system provides only two degrees of freedom for each limb, limiting the range of rehabilitation exercises that it can conduct. Meanwhile, by implementing an exoskeletal design, the KINARM Exoskeletal Robot™ device can provide some additional support to the patient's limb, but at the cost of significant increases in device size, cost, complexity and set-up time.

While robot-assisted physical and occupational therapy offers tremendous promise to many groups of patients, the prior art has yet to match that promise. As the previous examples have shown, current therapy devices are either too simplistic and limited, allowing only the most rudimentary exercises and frequently interfering with the patient in the process; or too complex and cumbersome, making the devices expensive, intimidating to patients, and difficult for therapists to use. Thus there remains a need for a novel device and method that can provide patients and therapists with the ability to perform sophisticated 2-D and 3-D rehabilitation exercises, in a simple, unobtrusive and welcoming form factor, at a relatively low price.

SUMMARY OF THE INVENTION

The present invention bridges the categories of low-DOF systems and high-DOF exoskeletal systems, offering the usability, mechanical simplicity and corresponding affordability of a low-DOF system, as well as the reduced footprint, range of motion, and improved support ability of a high-DOF exoskeletal system.

More particularly, the present invention comprises a relatively low number of active (powered) DOFs—in the preferred embodiment, three active DOFs, although the novel features of the invention can be implemented in systems with other numbers of DOFs—which reduces the device's cost and complexity to well below that of high-DOF exoskeletal systems. However, because of the innovative positional and orientational relationship of the system to the patient—unique among non-exoskeletal systems to date, as explained further below—the device of the present invention enjoys advantages that have previously been limited to high-DOF exoskeletal systems, such as more optimal torque-position relationships, better workspace overlap with the patient and a greater range of motion.

In addition, it has been discovered that a novel implementation of a cabled differential (with the differential input being used as a pitch axis and the differential output being used as a yaw axis relative to the distal links of the device) permits the mass and bulk of the power drives (e.g., motors) to be shifted to the base of the system, away from the patient's workspace and view. Through the combination of these two major innovations—the orientation and position of the device relative to the patient, and the implementation of a cabled differential with special kinematics—as well as other innovations, the present invention provides a unique rehabilitation device that fills a need in the rehabilitation market and is capable of a wide variety of rehabilitation tasks.

Significantly, the present invention enables a new method for bi-manual rehabilitation—a new class of rehabilitative therapy where multiple limbs, usually arms, are rehabilitated simultaneously—in which rehabilitative exercises can be conducted in three dimensions, by using two similar devices, simultaneously and in a coordinated fashion, on two different limbs of the patient.

In one preferred form of the invention, there is provided a non-exoskeletal rehabilitation device, with as few as 2 active degrees of freedom, wherein the device is oriented and positioned such that its frame of reference (i.e., its "reference frame") is oriented generally similarly to the reference frame of the patient, and motions of the patient's endpoint are mimicked by motions of the device's endpoint.

In another preferred form of the invention, there is provided a non-exoskeletal rehabilitation device, with as few as 2 active degrees of freedom, of which 2 degrees are linked through a cabled differential.

In another preferred form of the invention, there is provided a method for bi-manual rehabilitation, wherein the method utilizes a pair of rehabilitation devices, wherein each rehabilitation device is designed to be capable of inducing motion in three or more degrees of freedom, is easily reconfigurable to allow both right-handed and left-handed usage, and is located relative to the patient such that two devices may be used simultaneously without interfering with each other.

In another preferred form of the invention, there is provided a robotic device for operation in association with an appendage of a user, wherein the appendage of the user has an endpoint, the robotic device comprising:
 a base; and
 a robotic arm attached to the base and having an endpoint, the robotic arm having at least two active degrees of freedom relative to the base and being configured so that when the base is appropriately positioned relative to a user, the reference frame of the robotic device is oriented generally similarly to the reference frame of the user and motions of the endpoint of the appendage of the user are mimicked by motions of the endpoint of the robotic arm.

In another preferred form of the invention, there is provided a method for operating a robotic device in association with an appendage of a user, wherein the appendage of the user has an endpoint, the method comprising:

providing a robotic device comprising:
  a base; and
  a robotic arm attached to the base and having an endpoint, the robotic arm having at least two active degrees of freedom relative to the base and being configured so that when the base is appropriately positioned relative to a user, the reference frame of the robotic device is oriented generally similarly to the reference frame of the user and motions of the endpoint of the appendage of the user are mimicked by motions of the endpoint of the robotic arm;

positioning the base relative to the user so that the reference frame of the robotic device is oriented generally similarly to the reference frame of the user, and attaching the appendage of the user to the robotic arm; and moving at least one of the endpoint of the appendage of the user and the endpoint of the robotic arm.

In another preferred form of the invention, there is provided a robotic device comprising:

a base;
an arm having a first end and a second end, the first end of the arm being mounted to the base and the second end of the arm being configured to receive an endpoint device;
an endpoint device configured to be mounted to the second end of the arm and being configured for engagement by a limb of a user; and
a controller mounted to at least one of the base and the arm for controlling operation of the arm;
wherein the endpoint device comprises a user-presence sensing unit for detecting engagement of the endpoint device by a limb of a user and advising the controller of the same.

In another preferred form of the invention, there is provided a robotic device comprising:

a base;
an arm having a first end and a second end, the first end of the arm being mounted to the base and the second end of the arm being configured to receive an endpoint device;
an endpoint device configured to be mounted to the second end of the arm and being configured for engagement by a limb of a user; and
a controller mounted to at least one of the base and the arm for controlling operation of the arm;
wherein the endpoint device is mountable to the second end of the arm using a modular connection which provides mechanical mounting of the endpoint device to the second end of the arm and electrical communication between the endpoint device and the arm.

In another preferred form of the invention, there is provided a robotic device comprising:

a base;
an arm having a first end and a second end, the first end of the arm being mounted to the base and the second end of the arm being configured to receive an endpoint device;
an endpoint device configured to be mounted to the second end of the arm and being configured for engagement by a limb of a user; and
a controller mounted to at least one of the base and the arm for controlling operation of the arm;
wherein the endpoint device is adjustable relative to the second end of the arm along a pitch axis and a yaw axis.

In another preferred form of the invention, there is provided a robotic device comprising:

a base;
an arm having a first end and a second end, the first end of the arm being mounted to the base and the second end of the arm being configured to receive an endpoint device;
an endpoint device configured to be mounted to the second end of the arm and being configured for engagement by a limb of a user; and
a controller mounted to at least one of the base and the arm for controlling operation of the arm;
wherein the controller is configured to compensate for the effects of gravity when the endpoint device is engaged by a limb of a user.

In another preferred form of the invention, there is provided a method for providing rehabilitation therapy to a user, the method comprising:

providing a robotic device comprising:
  a base;
  an arm having a first end and a second end, the first end of the arm being mounted to the base and the second end of the arm being configured to receive an endpoint device;
  an endpoint device configured to be mounted to the second end of the arm and being configured for engagement by a limb of a user; and
  a controller mounted to at least one of the base and the arm for controlling operation of the arm;
  wherein the endpoint device comprises a user-presence sensing unit for detecting engagement of the endpoint device by a limb of a user and advising the controller of the same; and
operating the robotic device.

In another preferred form of the invention, there is provided a method for providing rehabilitation therapy to a user, the method comprising:

providing a robotic device comprising:
  a base;
  an arm having a first end and a second end, the first end of the arm being mounted to the base and the second end of the arm being configured to receive an endpoint device;
  an endpoint device configured to be mounted to the second end of the arm and being configured for engagement by a limb of a user; and
  a controller mounted to at least one of the base and the arm for controlling operation of the arm;
  wherein the endpoint device is mountable to the second end of the arm using a modular connection which provides mechanical mounting of the endpoint device to the second end of the arm and electrical communication between the endpoint device and the arm; and
operating the robotic device.

In another preferred form of the invention, there is provided a method for providing rehabilitation therapy to a user, the method comprising:

providing a robotic device comprising:
  a base;

an arm having a first end and a second end, the first end of the arm being mounted to the base and the second end of the arm being configured to receive an endpoint device;

an endpoint device configured to be mounted to the second end of the arm and being configured for engagement by a limb of a user; and a controller mounted to at least one of the base and the arm for controlling operation of the arm;

wherein the endpoint device is adjustable relative to the second end of the arm along a pitch axis and a yaw axis; and operating the robotic device.

In another preferred form of the invention, there is provided a method for providing rehabilitation therapy to a user, the method comprising:

providing a robotic device comprising:
a base;
an arm having a first end and a second end, the first end of the arm being mounted to the base and the second end of the arm being configured to receive an endpoint device;
an endpoint device configured to be mounted to the second end of the arm and being configured for engagement by a limb of a user; and
a controller mounted to at least one of the base and the arm for controlling operation of the arm;
wherein the controller is configured to compensate for the effects of gravity when the endpoint device is engaged by a limb of a user; and operating the robotic device.

In another preferred form of the invention, there is provided a robotic device for operation in association with a body of a user, wherein the body of the user comprises a torso and a limb, the robotic device comprising:

a base;
an arm having a first end and a second end, the first end of the arm being mounted to the base;
an endpoint device having a first end and a second end, the first end of the endpoint device being mounted to the second end of the arm; and
a grip configured to be gripped by a limb of a user, wherein the grip is mounted to the second end of the endpoint device, and further wherein the grip is adjustable relative to the endpoint device along a pitch axis, a yaw axis and a roll axis.

In another preferred form of the invention, there is provided a method for providing rehabilitation therapy to a user, the method comprising:

providing a robotic device comprising:
a base;
an arm having a first end and a second end, the first end of the arm being mounted to the base;
an endpoint device having a first end and a second end, the first end of the endpoint device being mounted to the second end of the arm; and
a grip configured to be gripped by a limb of a user, wherein the grip is mounted to the second end of the endpoint device, and further wherein the grip is adjustable relative to the endpoint device along a pitch axis, a yaw axis and a roll axis; and operating the robotic device.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein.

DETAILED DESCRIPTION OF THE PREFERRED EMBODIMENTS

The Novel, Multi-Active-Axis Non-Exoskeletal Robotic Device in General

Figure 1:
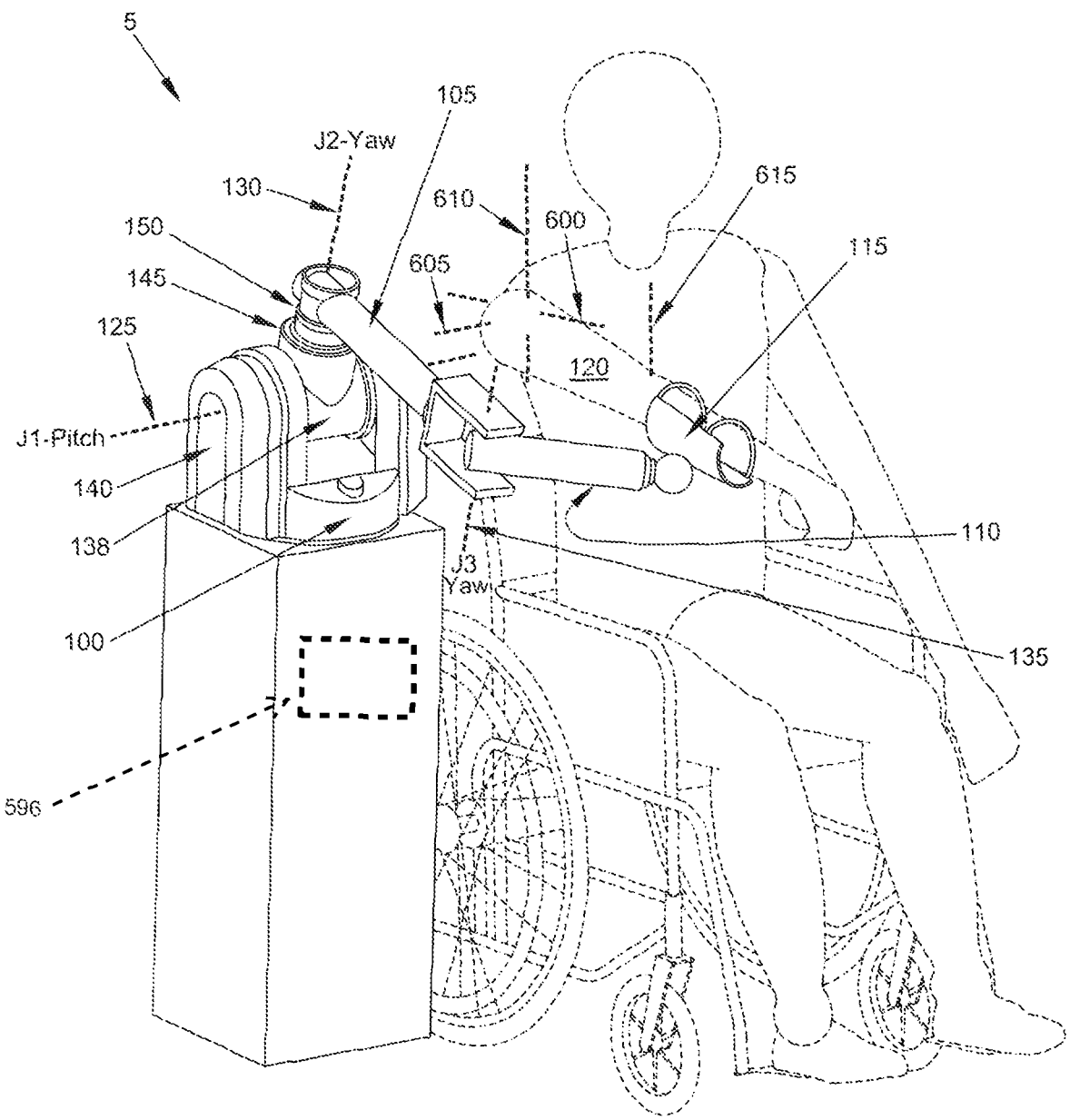
FIGS. 1 and 2 are schematic front perspective views showing one preferred form of robotic device formed in accordance with the present invention.

Looking first at FIG. 1, there is shown a novel multi-active-axis, non-exoskeletal robotic device 5 that is suitable for various robotic-assisted therapies and other applications. Robotic device 5 generally comprises a base 100, an inner link 105, an outer link 110, and a coupling element 115 for coupling outer link 110 to a patient, commonly to a limb of the patient (e.g., as shown in FIG. 1, the patient's arm 120).

The preferred embodiment shown in FIG. 1 has three degrees of freedom, although it will be appreciated by one skilled in the art that the present invention may comprise fewer or greater numbers of degrees of freedom. Three degrees of freedom theoretically provide the ability to access all positions in Cartesian space, subject to the kinematic limitations of the device, such as joint limits, link lengths, and transmission ranges. To produce those three degrees of freedom, robotic device 5 comprises three revolute joints, shown in FIG. 1 as joint J1 providing pitch around an axis 125, joint J2 providing yaw around an axis 130 and joint J3 providing yaw around an axis 135. In the preferred embodiment, these joints are implemented as follows. Joint J1 is a pitch joint, and consists of a segment 138 which rotates inside a generally U-shaped frame 140. Joint J2 is a yaw joint, and consists of a second segment 145 attached perpendicularly to segment 138. This segment 145 contains a third segment 150, which rotates inside segment 145. In the preferred embodiment, these two joints (i.e., joint J1 and joint J2) are linked through a cabled differential as will hereinafter be discussed. Joint J3 is also a yaw joint, and is separated from joint J2 by inner link 105. As will hereinafter be discussed, a cable transmission connects the motor that actuates joint J3 (and which is located coaxially to the axis 130 of joint J2, as will hereinafter be discussed) to the output of joint J3; this cable transmission runs through inner link 105. It should be noted that while this particular embodiment has been found to be preferable, the present invention may also be implemented in alternative embodiments including but not limited to:
  devices with alternative kinematics—for example, three joints in a yaw-pitch-yaw arrangement (as opposed to the pitch-yaw-yaw arrangement of FIG. 1);
  devices using other types of joints, such as prismatic joints (i.e., slider joints); and
  devices that implement other drive technologies, such as gear drivetrains, belts, hydraulic drives, etc.

To provide additional degrees of freedom, different endpoint attachments may be provided at the location of the coupling element 115, to permit different degrees of control over the patient's limb orientation, or to provide additional therapeutic modalities. By way of example but not limitation, different endpoint attachments may comprise a single-DOF endpoint attachment for performing linear rehabilitation exercises; or a three-DOF endpoint attachment to enable more complex motions, by enabling control over the orientation of the patient's limb; or an actively-controlled multi-DOF endpoint attachment. By reducing the number of degrees of freedom in the core of the robotic device to three in the preferred implementation (i.e., the robotic device 5 shown in FIG. 1), the design of the robotic device is vastly simplified, reducing cost while maintaining the device's ability to provide a wide range of rehabilitative services including three-dimensional rehabilitative therapies.

Figure 6:
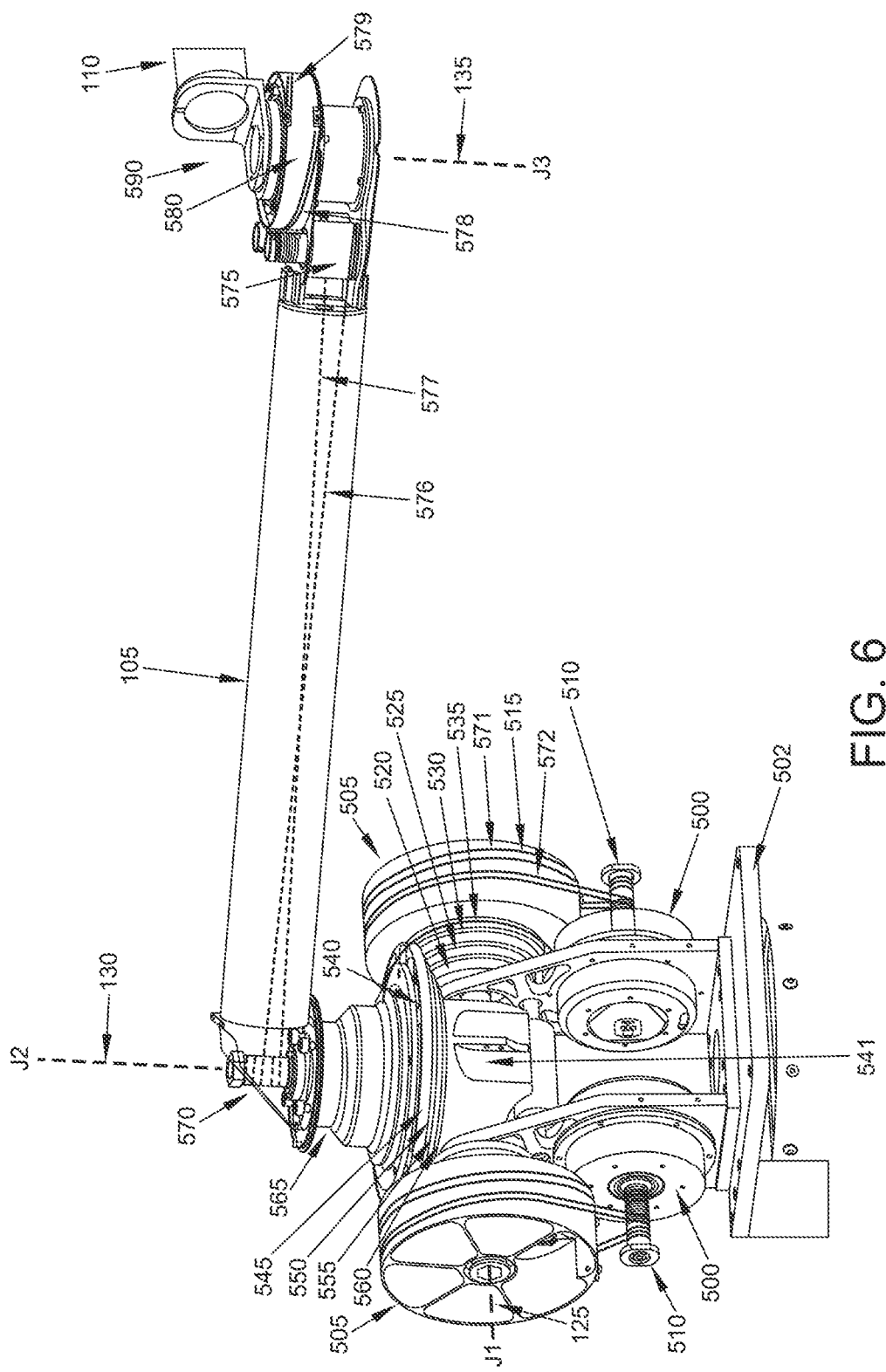
FIGS. 6 and 7 are schematic views showing details of selected portions of the robotic device of FIGS. 1 and 2.

Looking next at FIGS. 1 and 6, further details of the construction of the preferred embodiment of the present invention are shown. The preferred embodiment of the robotic device consists of the following four kinematic frames (i.e., the kinematic frames of reference for various points on the robotic device):

1) The ground kinematic frame, consisting of all components that are generally static when the device is in use;
  2) The joint J1 kinematic frame, consisting of all non-transmission components that rotate exclusively about axis 125 of joint J1;
  3) The joint J2 kinematic frame, consisting of all non-transmission components that may rotate exclusively about axis 125 of joint J1 and axis 130 of joint J2; and
  4) The joint J3 kinematic frame, consisting of all non-transmission components that may rotate about axis 125 of joint J1, axis 130 of joint J2 and axis 135 of joint J3.

In this definition of kinematic frames, transmission components are excluded to simplify definition: a pulley within a transmission may be located away from a given joint, but rotate with that joint. Similarly, some pulleys in the system may be caused to rotate by the motion of more than one axis—for example, when they are part of a cabled differential, such as is employed in the preferred form of the present invention.

In the preferred embodiment, joints J1 and J2 are implemented through the use of a cabled differential transmission, designed similarly to that disclosed in U.S. Pat. No. 4,903,536, issued Feb. 27, 1990 to Massachusetts Institute of Technology and J. Kenneth Salisbury, Jr. et al. for COMPACT CABLE TRANSMISSION WITH CABLE DIFFERENTIAL, which patent is hereby incorporated herein by reference.

As described in U.S. Pat. No. 4,903,536, a cabled differential is a novel implementation of a differential transmission, in which two input pulleys (e.g., pulleys 505 in the robotic device 5 shown in FIG. 6) with a common axis of rotation are coupled to a common output pulley, (e.g., pulley 540 in the robotic device 5 shown in FIGS. 1 and 6) which is affixed to a spider or carrier (e.g., carrier 541 in the robotic device 5 shown in FIGS. 1 and 6). This carrier is able to rotate about the common axis of rotation of the two input pulleys independently of those pulleys. The common output pulley, meanwhile, is able to rotate about an axis perpendicular to, and coincident with, the common axis of rotation of the two input pulleys. The two input pulleys are coupled to the output pulley such that a differential relationship is established between the three, wherein the rotation of the output pulley (e.g., pulley 540 in robotic device 5 shown in FIGS. 1 and 6) is proportional to the sum of the rotations of the two input pulleys (e.g., pulleys 505 in robotic device 5 shown in FIGS. 1 and 6), and the rotation of the carrier (e.g., carrier 541 in robotic device 5 shown in FIGS. 1 and 6) is proportional to the difference of the rotations of the two input pulleys. In robotic device 5 shown in FIGS. 1 and 6, the rotation of the carrier of the differential is used to produce motion of the system about one axis of rotation (in the preferred embodiment, about axis 125 of joint J1), and the rotation of the output of the differential transmission (i.e., the rotation of output pulley 540) is used to produce motion of the system about a second axis of rotation (in the preferred embodiment, about axis 130 of joint J2). The use of a cabled differential enables these two motions to be produced by motors, which are affixed to lower kinematic frames (in the case of the preferred embodiment, to the ground kinematic frame, consisting of all components that are generally static when the device is in use). This dramatically decreases the moving mass of the device, thereby improving the dynamic performance and feel of the device. In the preferred implementation, this cabled differential transmission consists of two motors 500, input pulleys 505, output pulley 540, etc., as hereinafter discussed.

Stated another way, as described in U.S. Pat. No. 4,903, 536, the cabled differential is a novel implementation of a differential transmission, in which two input pulleys (e.g., pulleys 505 in robotic device 5 shown in FIG. 6) with a common axis of rotation are coupled to a third common output pulley (e.g., pulley 540 in robotic device 5 shown in FIG. 6), which rotates about an axis perpendicular to the input pulley axis, and is affixed to a carrier (e.g., carrier 541 in robotic device 5 shown in FIG. 6) that rotates about the input pulley axis (i.e., axis 125 in robotic device 5 shown in FIG. 6). The two input pulleys are coupled to the output pulley such that a differential relationship is established between the three, wherein the rotation of the output pulley is proportional to the sum of the rotations of the two input pulleys, and the rotation of the carrier is proportional to the difference of the rotations of the two input pulleys. This mechanism produces rotations about two axes (e.g., axis 125 of joint J1 and axis 130 of joint J2), while allowing the motors producing those motions to be affixed to lower kinematic frames, thereby decreasing the moving mass of the device and improving dynamic performance and feel. In the preferred implementation, this transmission consists of two motors 500, two input pulleys 505, output pulley 540, etc., as hereinafter discussed.

In other words, as described in U.S. Pat. No. 4,903,536, the cabled transmission is a novel implementation of a differential transmission, wherein two input pulleys (e.g., pulleys 505 in robotic device 5 shown in FIG. 6) are connected to a third common output pulley (e.g., pulley 540 in robotic device 5 shown in FIG. 6) such that the rotation of the output pulley is proportional to the sum of the rotations of the two input pulleys, and the rotation of the differential carrier (e.g., carrier 541 in robotic device 5 shown in FIG. 6) is proportional to the difference of the rotations of the two input pulleys. In the preferred implementation, this transmission consists of two motors 500, two input pulleys 505, output pulley 540, etc., as hereinafter discussed.

As seen in FIG. 6, the cabled differential transmission preferably comprises two motors 500 which are affixed to the ground kinematic frame (e.g., base 502), which are coupled to input pulleys 505 through lengths of cable 571 and 572—commonly wire rope, but alternatively natural fiber, synthetic fiber, or some other construction generally recognized as a form of cable—that are attached to the pinions 510 of motors 500, wrapped in opposite directions but with the same chirality about pinions 510, and terminated on the outer diameters 515 of input pulleys 505. These input pulleys 505 rotate about axis 125 of joint J1, but their rotation may produce rotation of the device about axis 125 of joint J1, axis 130 of joint J2, or both axes simultaneously, due to the properties of the cable differential; furthermore, these input pulleys 505 are fixed to neither the aforementioned joint J1 kinematic frame nor the aforementioned joint J2 kinematic frame. As per U.S. Pat. No. 4,903,536, these input pulleys 505 include both large outer diameters 515, as well as a series of substantially smaller stepped outer diameters 520, 525, 530 and 535. These smaller stepped outer diameters 520, 525, 530 and 535 are coupled through further lengths of cable to output pulley 540, which comprises a series of stepped outer diameters 545, 550, 555, and 560, which are substantially larger than the steps 520, 525, 530 and 535 they are coupled to on input pulleys 505. This output pulley 540 rotates about axis 130 of joint J2, and is fixed to the joint J2 kinematic frame. It has been found that it can be useful to make the range of motion of joint J2 symmetric about a plane coincident with joint J2 and perpendicular to joint J1, as this facilitates switching the device's chirality as described below.

By implementing this set of diametral relationships in the series of pulleys (i.e., input pulleys 505 and output pulley 540), progressively higher transmission ratios are achieved through the cabled transmission. In the preferred embodiment, a transmission ratio of 8.51:1 is implemented between motor pinions 510 and input pulleys 505, and a transmission ratio of 1.79:1 is implemented between input pulleys 505 and output pulley 540, generating a maximum transmission ratio between motor pinions 510 and output pulley 540 of 15.26:1. Throughout this cabled transmission, and all cabled transmissions of the present invention, care is taken to ensure that the ratio between the diameter of a given cable and the smallest diameter that it bends over is kept at 1:15 or smaller. Larger ratios, occurring when the cable is bent over smaller diameters, are known to significantly reduce cable fatigue life.

Still looking now at FIG. 6, distal to output pulley 540 is another cable transmission, comprising a motor 565, coupled from its motor pinion 570 through cables 576, 577 to intermediate pulleys 575, which are in turn coupled through cables 578, 579 to an output pulley 580. These transmission cables are contained inside inner link 105, which is fixed to the aforementioned joint J2 kinematic frame. In this additional cable transmission, no differential element is implemented. In keeping with the cable transmission design taught in U.S. Pat. No. 4,903,536, the first stage of the cable transmission between motor pinion 570 and intermediate pulleys 575 is designed to be a high-speed, lower-tension transmission stage that traverses a greater distance; while the second stage of the cable transmission, between intermediate pulleys 575 and output pulley 580, is designed to be a low-speed, higher-tension transmission stage that traverses a very short distance. In this cable transmission, intermediate pulleys 575, output pulley 580 and the joint axis 135 of joint J3 are substantially distal to motor 565, a design which is accomplished by implementing a long cable run between motor pinion 570 and intermediate pulleys 575.

As described in U.S. Pat. No. 4,903,536, this design has the benefit of moving the mass of motor 565 toward base 502 of robotic device 5, reducing the inertia of the system. In the preferred implementation, the motor's mass is positioned coaxial to axis 130 of joint J2, and as close as possible to axis 125 of joint J1, thereby reducing inertia about both axes. This design is particularly valuable in the preferred implementation shown, since the mass of motor 565 is moved close to both axis 130 of joint J2 and axis 125 of joint J1, thereby reducing inertia about both axes. A transmission ratio of 1.89:1 is preferably implemented between motor pinion 570 and intermediate pulleys 575, and a transmission ratio of 5.06:1 is preferably implemented between intermediate pulleys 575 and output pulley 580, yielding a maximum transmission ratio between motor pinion 575 and output pulley 580 of 9.55:1.

All transmission ratios listed here have been optimized based on a range of factors, including:
  device link lengths;
  device component inertias and moments about axes;
  the intended position of the device relative to the patient;
  motor instantaneous peak and sustained torque limits;
  motor controller output current capacity, and motor current capacity;
  desired ability of device to overpower patient/be overpowered by patient; and
  expected peak output force of patient.
This optimization process is extensive and at least partially qualitative; it is not reproduced here, since both the optimization process and its outcome will change significantly as the above factors change. Based on data gathered from a number of sources and internal experimentation, these forces are estimated to be:
  push/pull away from/towards patient's body: 45 N
  up/down in front of patient: 15 N
  left/right laterally in front of patient: 17 N
It should be noted that generous factors of safety have been applied to these estimates.

Figure 7:
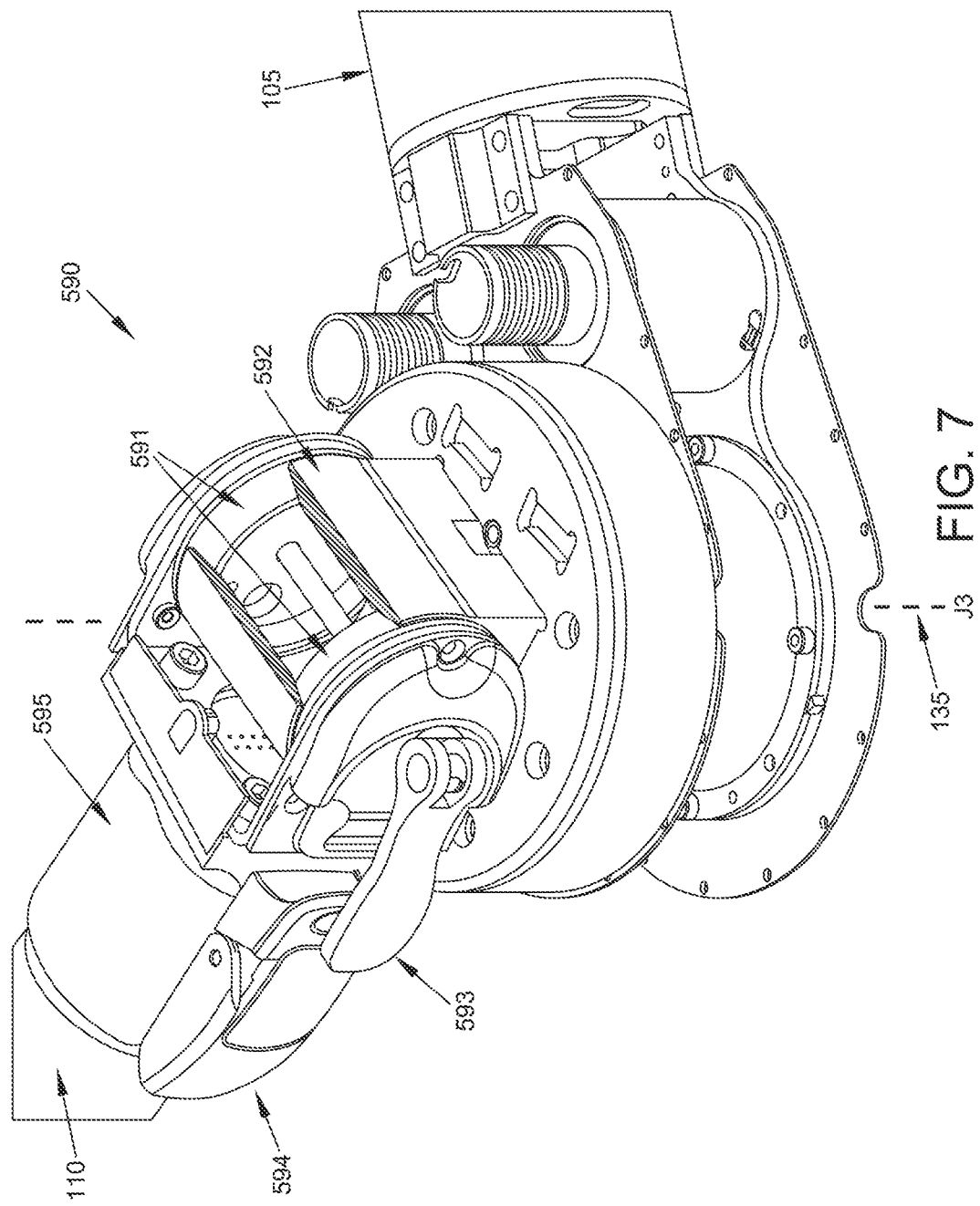

Beyond output pulley 580 of joint J3, there is generally an outer link 110 (FIGS. 1, 6 and 7). Outer link 110 is connected to output pulley 580 (FIGS. 6 and 7) of joint J3 by a mechanism 590 that allows the position of outer link 110 to be adjusted relative to output pulley 580 of joint J3. Mechanism 590 (FIG. 7), which in a preferred embodiment allows the position of outer link 110 to be moved by some number of degrees (e.g., 172.5 degrees) about axis 135 of joint J3 relative to output pulley 580 of joint J3, facilitates reversing the chirality of the robotic device, the importance and method of which is described herein. In the preferred embodiment, mechanism 590 is implemented by means of clamping two tabs 591 against a central hub 592 (which is shown in FIG. 7 in cutaway) by means of a toggle lock 593 (e.g., like those commonly found on the forks of bicycles). The contacting faces of tabs 591 and central hub 592 are tapered as shown in FIG. 7, to both locate the parts in directions transverse to the direction of force application, and to increase the amount of torque that the clamped parts can resist. It has been found that it is important to ensure that the taper (at the contacting faces of tabs 591 and central hub 592) is a non-locking type, so that the system does not jam. Mechanism 590 allows outer link 110 to be flipped across a plane coincident to axis 135 of joint J3, rather than rotated around axis 135 of joint J3. While this initially seems like a minor distinction, when implemented with certain types of endpoint attachments, utilizing a mechanism that flips, rather than rotates, can significantly reduce the time required to reverse the chirality of the robotic device. There are also other components of the sort well known in the art of robotic arms that are not shown here which are used to ensure that mechanism 590 reaches its desired position, and that the mechanism's position does not shift during operation. By way of example but not limitation, these components may include limit switches, magnets, latches, etc. of the sort well known to a person skilled in the art of robotic arms. There is also a separate mechanism that allows outer link 110 to be removed from mechanism 590, which facilitates switching between different types of endpoint attachments. In the preferred construction shown in FIG. 7, this is implemented through a latch 594, which firmly clamps outer link 110 inside a tubular member 595 which is firmly attached to tabs 591. This latch 594 is engaged when the robotic device is in use, but may be released to allow outer link 110 to be removed.

Figure 2:
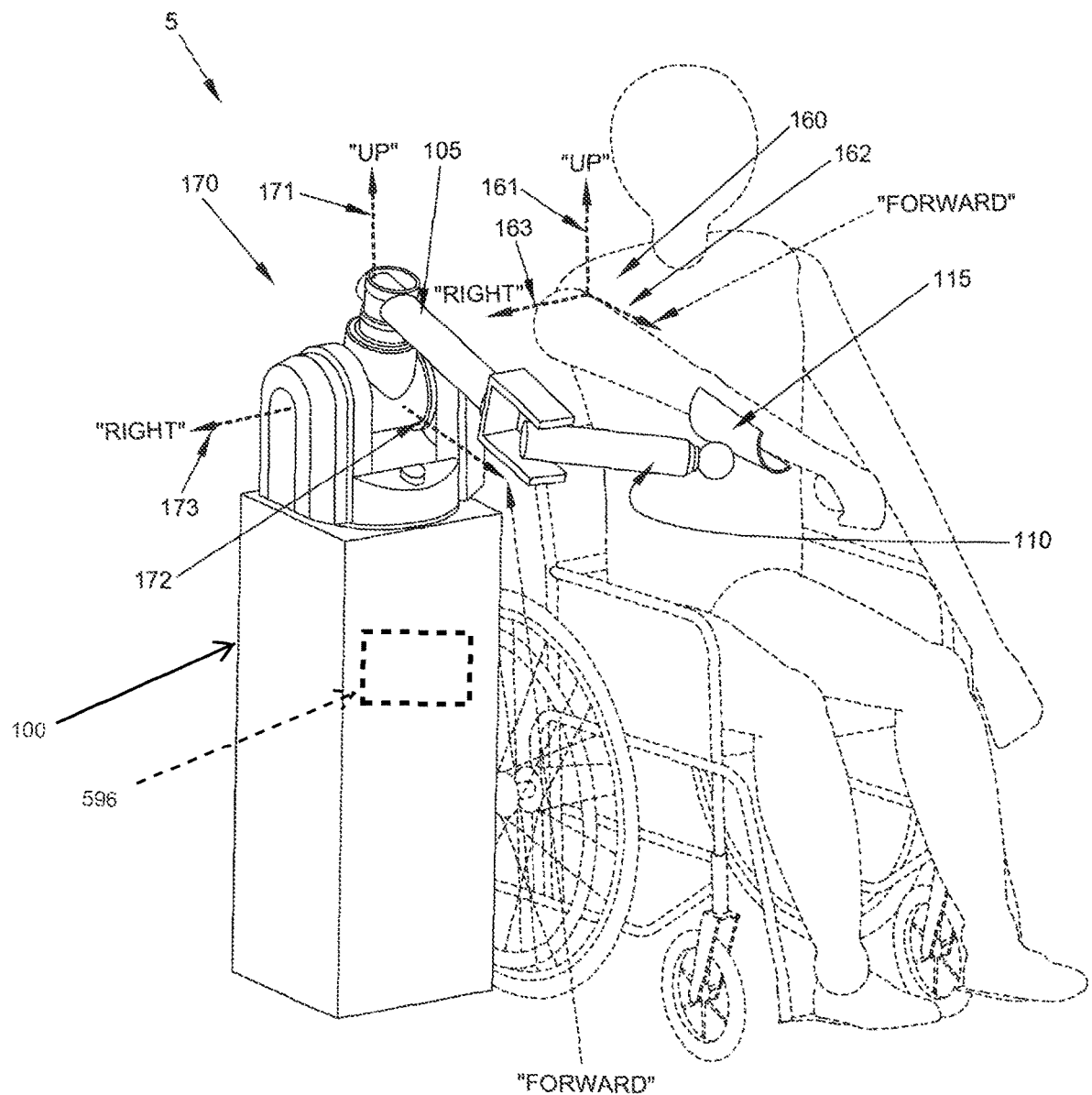
Figure 11:
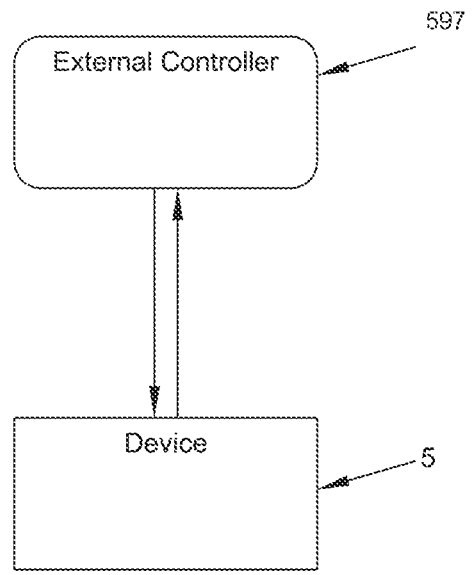
FIG. 11 is a schematic view showing how the robotic device may communicate with an external controller.

Robotic device 5 also comprises an onboard controller and/or an external controller for controlling operation of robotic device 5. The onboard controller and/or external controller are of the sort which will be apparent to those skilled in the art in view of the present disclosure. By way of example but not limitation, FIGS. 1 and 2 show an onboard controller 596 for controlling operation of robotic device 5. Onboard controller 596 may sometimes be referred to herein as an "internal controller". FIG. 11 shows how an external controller 597 may be used to control operation of robotic device 5 and/or to receive feedback from robotic device 5 (where robotic device 5 may or may not also have an onboard controller).

There may also be other components that are included robotic device 5 which are well known in the art of robotic devices but are not shown or delineated here for the purposes of preserving clarity of the inventive subject matter, including but not limited to: electrical systems to actuate the motors (e.g., motors 500 and 565) of the robotic device; other computer or other control hardware for controlling operation of the robotic device; additional support structures for the robotic device (e.g., a mounting platform); covers and other safety or aesthetic components of the robotic device; and structures, interfaces and/or other devices for the patient (e.g., devices to position the patient relative to the robotic device, a video screen for the patient to view while interacting with the robotic device, a patient support such as, but not limited to, a wheelchair for the patient to sit on while using the robotic device, etc.).

Some specific innovative aspects of the present invention will hereinafter be discussed in further detail.

Non-Exoskeletal Device

As discussed above, robotic device 5 is a non-exoskeletal rehabilitation device. Exoskeletal rehabilitation devices are generally understood as those having some or all of the following characteristics:
  joint axes that pierce/are coaxial to the patient's limb joint axes, typically with each patient joint matched to at least one device joint; and
  device components that capture each of the patient's limbs that are being rehabilitated, typically firmly constraining each limb segment to a corresponding segment of the arm of the robotic device.

In FIG. 1, a simplified representation of the joint axes of a patient's shoulder are shown: the abduction and adduction axis 600, the flexion and extension axis 605, and the internal and external rotation axis 610. Also shown in FIG. 1 is the axis 615 of the patient's elbow joint. As FIG. 1 shows, joint axes J1, J2 and J3 of robotic device 5 are, by design, non-coaxial with the patient's joint axes 600, 605, 610 and 615. Furthermore, in the preferred embodiment, the patient's limb 120 is only connected to, or captured by, robotic device 5 at the coupling element 115. In other embodiments of the present invention, there may be multiple coupling points between the patient and the robotic device, which may partially or completely enclose the patient's limb; however, the majority of the structure of the robotic device of the present invention is not capturing the patient's limb.

Because the aforementioned two "conditions" of an exoskeletal system are not met (i.e., the joint axes J1, J2 and J3 of the robotic device are not intended to be coaxial with the patient's joint axes 600, 605, 610 and 615, and because the segments of the patient's limb are not secured to corresponding segments of the arm of the robotic device), the robotic device of the present invention is not an exoskeletal rehabilitation device. While there are many non-exoskeletal rehabilitation devices currently in existence, the non-exoskeletal design of the present device is a critical characteristic distinguishing it from the prior art, since the device incorporates many of the beneficial characteristics of exoskeletal devices while avoiding the cost and complexity that are innate to exoskeletal designs.

Kinematic Relationship of Robotic Device and Patient

Figure 3:
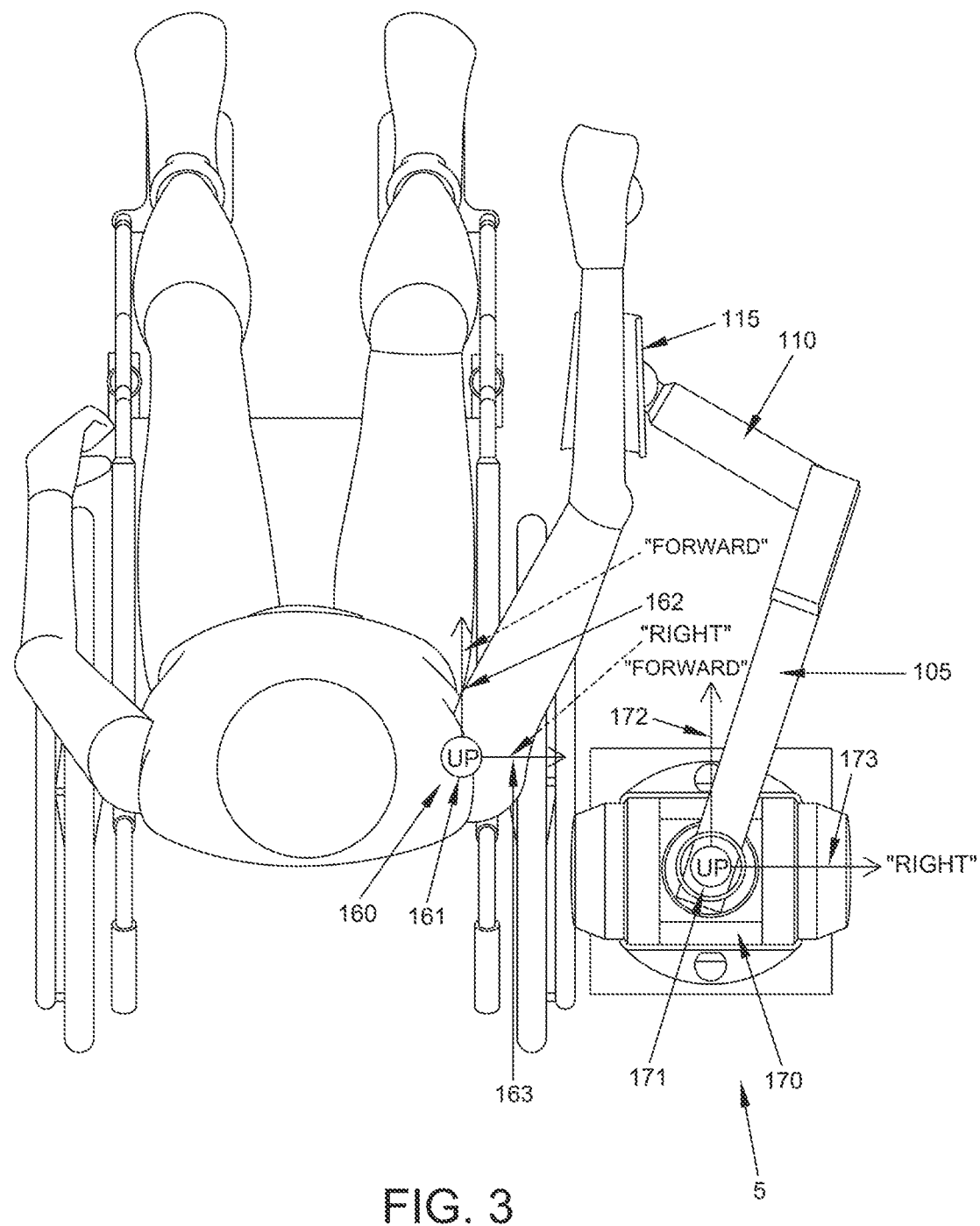
FIGS. 3 and 4 are schematic top views showing the robotic device of FIGS. 1 and 2.

FIGS. 2 and 3 show a coordinate reference frame 160 for the patient (consisting of an up axis 161, a forward axis 162 and a right axis 163), as well as a coordinate reference frame 170 for robotic device 5 (consisting of an up axis 171, a forward axis 172 and a right axis 173). The locations and orientations of these reference frames 160, 170 defines a kinematic relationship between (i) robotic device 5 and its links 105, 110, and (ii) the patient and their limb: robotic device 5 is designed such that its motions mimic those of the patient, in that a given motion of the patient's endpoint in reference frame 160 of the patient will be matched by a generally similar motion of the device's endpoint in reference frame 170 of robotic device 5. This relationship is important to the definition of many of the innovative aspects of robotic device 5, as shown below.

Before further explaining this concept, it is helpful to provide some terminology. The "patient reference frame" (or PRF) 160 and the "device reference frame" (or DRF) 170, as used here, are located and oriented by constant physical characteristics of the patient and robotic device 5. As shown in FIGS. 2 and 3, the origin of PRF 160 is defined at the base of the patient's limb which is coupled to the robotic device, and is considered fixed in space. The "up" vector 161, which is treated as a "Z" vector in a right-handed coordinate system, is defined to point from this origin in the commonly accepted "up" direction (i.e., against the direction of gravity). The "forward" vector 162 is likewise defined in the commonly accepted "forward" direction (i.e., in front of the patient). More precisely, it is treated as a "Y" vector in a right-handed coordinate system, and is defined as the component of the vector pointing from the origin to the center of the limb's workspace which is perpendicular to the "up" vector. Finally, the "right" vector 163 points to the right of the patient. Rigorously defined, it is treated as an "X" vector in a right-handed coordinate system, and is consequently defined by the other two vectors. Thus, a reference frame 160 is defined for the patient which is located and oriented entirely by constant physical characteristics and features. While this coordinate frame definition has been executed in FIGS. 2 and 3 for a patient's arm, this definition method can easily be extended to other limbs, such as a leg.

A similar reference frame is defined for the robotic device. The origin is placed at the centroid of the base of robotic device 5, which must also be fixed in space. The "forward" vector 172 is defined as the component of the vector pointing from the origin to the geometric centroid of the device's workspace. The "up" vector 171 and the "right" vector 173 may be defined in arbitrary directions, so long as they meet the following conditions:
1) they are mutually perpendicular;
2) they are both perpendicular to "forward" vector 172;
3) they meet the definition of a right-handed coordinate system wherein "up" vector 171 is treated as a Z vector, "right" vector 173 is treated as an X vector, and "forward" vector 172 is treated as a Y vector; and
4) preferably, but not necessarily, "up" vector 171 is oriented as closely as possible to the commonly accepted "up" direction (i.e., against the direction of gravity).

In some cases, such as with the ReoGO® arm rehabilitation system of Motorika Medical Ltd. of Mount Laurel, New Jersey, USA, the aforementioned condition "4)" cannot be satisfied because the device's "forward" vector already points in the generally accepted "up" direction; consequently, the "up" vector may be defined arbitrarily subject to the three previous conditions. This case is further detailed below.

When existing rehabilitation devices are separated into exoskeletal and non-exoskeletal devices as per the description above, a further distinction between these two groups becomes apparent based on this definition of reference frames. In exoskeletal devices, the robotic device and the patient operate with their reference frames (as defined above) oriented generally similarly, i.e., "up", "right" and "forward" correspond to generally the same directions for both the patient and the robotic device, with the misalignment between any pair of directions in the PRF (patient reference frame) and DRF (device reference frame), respectively, preferably no greater than 60 degrees (i.e., the "forward" direction in the DRF will deviate no more than 60 degrees from the "forward" direction in the PRF), and preferably no greater than 45 degrees. Meanwhile, to date, a non-exoskeletal device in which the device reference frame and the patient reference frame are generally oriented similarly in this way has not been created. Devices available today are oriented relative to the patient in a number of different ways, including the following:

The DRF may be rotated 180° around the "up" axis relative to the PRF so that the device "faces" towards the patient, or rotated 90° around the "up" axis so that the device "faces" perpendicular to the patient: for example, in the InMotion ARM™ system of Interactive Motion Technologies of Watertown, Massachusetts, USA; the HapticMaster™ haptic system of Moog Incorporated of East Aurora, New York, USA; the DeXtreme™ arm of BioXtreme of Rehovot, Israel; or the KINARM End-Point Robot™ of BKIN Technologies of Kingston, Ontario, Canada. In the case of the DeXtreme™ arm, for example, the device is designed to be used while situated in front of the patient. Its workspace, which is generally shaped like an acute segment of a right cylinder radiating from the device's base, likewise faces toward the patient. When a coordinate reference frame is generated for the device's workspace as outlined above, the "forward" direction for the device—which points from the centroid of the base of the device to the centroid of the device's workspace—will be found to point toward the patient. Consequently, the device reference frame is not oriented similarly to the patient reference frame.

Alternatively, the DRF may be rotated 90° about the "right" axis relative to the PRF such that the device's "forward" axis is parallel to the patient's "up" axis; or other combinations. One example is the ReoGO® arm rehabilitation system of Motorika Medical Ltd of Mount Laurel, New Jersey, USA, where the device's base sits underneath the patient's arm undergoing rehabilitation, and its primary link extends up to the patient's arm. Its workspace is generally conical, with the tip of the cone located at the centroid of the base of the device. When a coordinate reference frame is generated for the device as outlined above, the "forward" vector of the device reference frame will be found to have the same direction as the "up" vector in the patient reference frame. Consequently, the device reference frame is not oriented similarly to that of the patient reference frame.

Finally, devices like the ArmAssist™ device of Tecnalia® of Donostia-San Sebastián, Spain may not have a definable DRF. The ArmAssist™ device is a small mobile platform which is designed to sit on a tabletop in front of the patient. The patient's arm is attached to the device, which then moves around the tabletop to provide rehabilitative therapy. Since the ArmAssist™ device is fully mobile, a fixed origin cannot be defined for it as per the method outlined above, and it is not relevant to this discussion.

The robotic device of the present invention is the first non-exoskeletal device which is designed to operate with its reference frame 170 oriented generally similarly to the reference frame 160 of the patient. This innovation allows the robotic device to leverage advantages that are otherwise limited to exoskeletal devices, including:

- Reduced interference with the patient's line-of-sight or body, since the robotic device does not need to sit in front of/to the side of the patient.
- More optimal position-torque relationships between patient and device, since the moment arms between the device and patient endpoints and their joints are directly proportional to one another, rather than inversely proportional to one another as in other devices. For example, when the device's links are extended, the patient's limb undergoing rehabilitation will generally be extended as well. While the device is not able to exert as much force at its endpoint as it can when the endpoint is closer to the device's joints, the patient's force output capacity will likewise be reduced. Similarly, when the patient's limb is contracted and the force output is maximized, the device's endpoint will be closer to its joints, and its endpoint output force capacity will also be maximized.
- Better workspace overlap between the patient and the device, since the device's links extend from its base in the same general direction that the patient's limb extends from the body.

Figure 4:
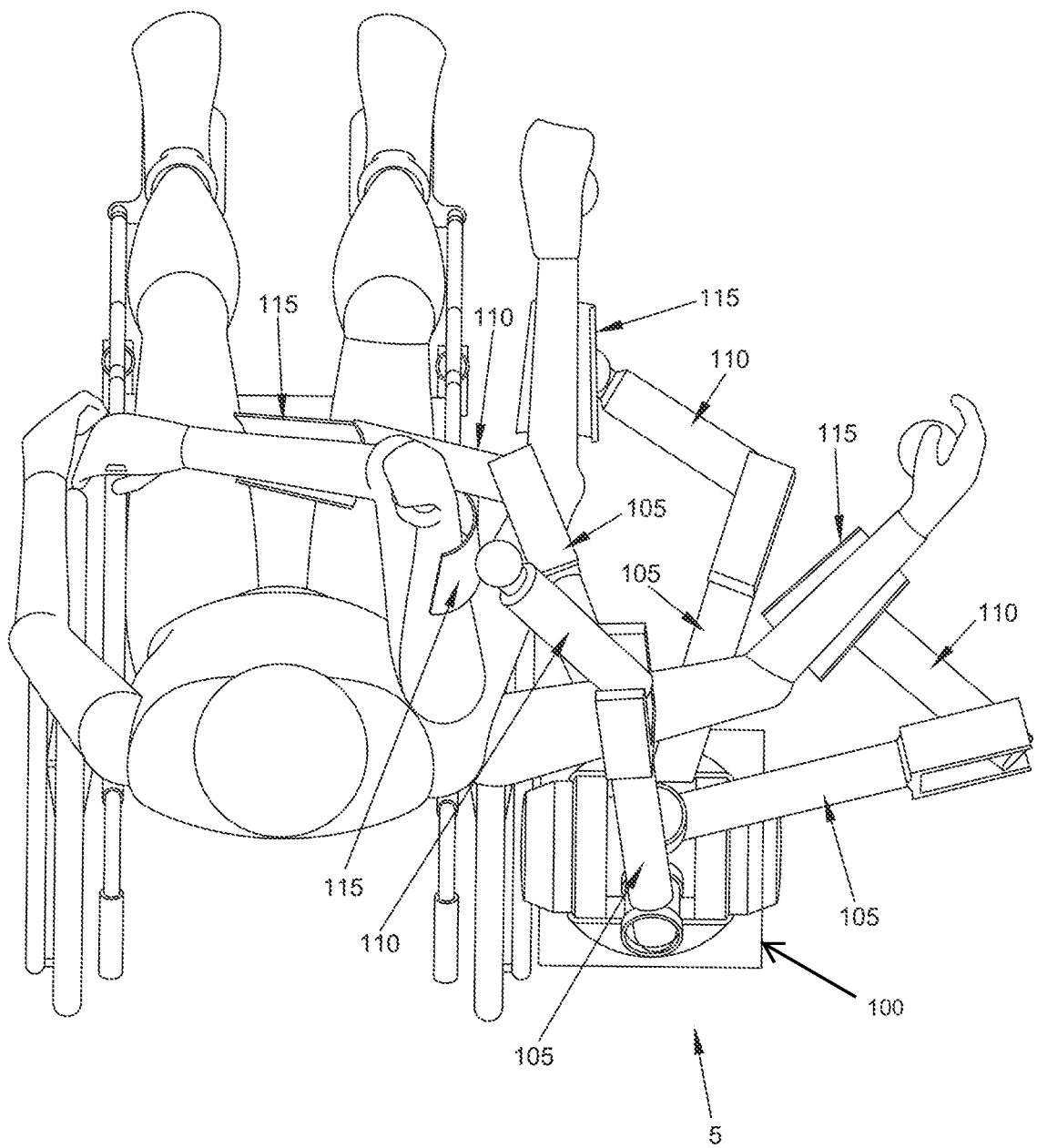

Like an exoskeletal device, robotic device 5 generally mimics the movements of the patient's limb, in that the endpoint of the device tracks the patient's limb, and a given motion in reference frame 160 of the patient produces motion in a generally similar direction in the device's reference frame 170. For example, if the patient moves their limb to the right in the patient's reference frame 160, the device's links will generally move to the right in the device's reference frame 170, as shown in FIG. 4. However, unlike an exoskeletal device, the individual links and joints of the robotic device do not necessarily mimic the motions of individual segments or joints of the patient's limb, even though the endpoint of the robotic device does track the patient's endpoint. As shown in FIG. 4, in the preferred embodiment, motions in front of the patient cause both the patient's limbs and links 105, 110 of robotic device 5 to extend; by contrast, in FIG. 4, motions to the far right of the patient cause the patient's limb to straighten while links 105, 110 of robotic device 5 bend. By operating without this constraint (i.e., that the individual links and joints of the robotic device do not necessarily mimic the motions of the individual segments or joints of the patient's limb), robotic device 5 avoids many of the weaknesses inherent in exoskeletal devices, particularly the bulk, complexity, cost and set-up time associated with directly replicating the kinematics of a limb.

Because of the need for this distinction between the robotic device of the present invention and exoskeletal devices (i.e., that a relationship cannot easily be defined between the patient's limb and the links of robotic device 5), it is necessary to define the relationship between the robotic device and the patient as a function of the bases, endpoints and orientations of the robotic device and the patient. By defining device and patient reference frames in this manner, the previous statement that "robotic device 5 is designed such that its motions mimic those of the patient, in that a given motion of the patient's endpoint in reference frame 160 of the patient will be matched by a generally similar motion of the device's endpoint in reference frame 170 of robotic device 5" is satisfied only when robotic device 5 is oriented relative to the patient as described herein.

A series of simple logical tests have been developed to aid in determining whether a device meets the criteria outlined above. For these tests, the device is assumed to be in its typical operating position and configuration relative to the patient, and a PRF is defined for the patient's limb undergoing rehabilitation as described above.

1) Is the device an exoskeletal rehabilitation device, as defined previously?
   a. YES: Device does not meet criteria—criteria are only applicable to non-exoskeletal devices.
   b. NO: Continue.
2) Can an origin that is fixed relative to the world reference frame and located at the centroid of the base of the device be defined?
   a. YES: Continue.
   b. NO: Device does not meet criteria—criteria are not applicable to mobile devices.
3) Consider the device's workspace, and find the geometric centroid of that workspace. Can a "forward", or Y, vector be defined between the geometric centroid of the device's workspace and the device's origin?
   a. YES: Continue.
   b. NO: Device does not meet criteria.
4) Can the "up", or Z, vector and the "right", or X, vector be defined as outlined above relative to the "forward", or Y, vector?
   a. YES: Continue.
   b. NO: Device does not meet criteria—it is likely designed for a significantly different rehabilitation paradigm than the device disclosed here.
5) Are the workspaces of the device and patient oriented generally similarly, in that the "right", or X, "forward", or Y, and "up", or Z, vectors of both coordinate reference frames have generally the same direction, with a deviation of less than a selected number of degrees between any pair of vectors? (In the preferred embodiment, this is preferably less than 60 degrees, and more preferably less than 45 degrees.)
   a. YES: Continue.
   b. NO: The device does not meet the criteria outlined—it is positioned differently relative to the patient than the device outlined here.
6) Are motions of the patient's endpoint mimicked or tracked by similar motions of the device's endpoint?
   a. YES: The device meets the criteria outlined.
   b. NO: The device does not meet the criteria outlined.

To date, no device with more than 2 degrees of freedom, other than the system described herein, has been found that successfully passes this series of tests.

Stated another way, generally similar orientation between the patient and the device can be examined by identifying a "forward" direction for both the user and the device. In the patient's case, the "forward" direction can be defined as the general direction from the base of the patient's arm undergoing rehabilitation, along the patient's limb, towards the patient's endpoint when it is at the position most commonly accessed during use of the device. In the device's case, the "forward" direction can be defined as the general direction from the base of the device, along the device's links and joints, towards the device's endpoint when it is at the position most commonly accessed during use of the device. If the "forward" direction of the device and the "forward" direction of the patient are generally parallel (e.g., preferably with less than 60 degrees of deviation, and more preferably with less than 45 degrees of deviation), then the device and the user can be said to be generally similarly oriented.

General Location of System

One preferred embodiment of the present invention is shown in FIGS. 3 and 4, where robotic device 5 is positioned to the side of, and slightly behind, the patient (in this case, with axis 125 of joint J1 behind, or coincident to, the patient's coronal plane). In this embodiment, reference frame 170 of robotic device 5 and reference frame 160 of the patient are oriented generally similarly to one another, as described above. Robotic device 5 is kept out of the patient's workspace and line of sight, making it both physically and visually unobtrusive. The workspaces of the robotic device and the patient overlap to a high degree. The range of motion allowed by this positioning is still quite large, as shown in FIG. 4, and approaches or exceeds that allowed by high-DOF exoskeletal systems.

It should be noted that while this arrangement (i.e., with robotic device 5 positioned to the side of, and slightly behind, the patient) has been found to be preferable for certain rehabilitative therapies, there are other embodiments in which robotic device 5 is positioned differently relative to the patient which may be better suited to other applications, such as use as a haptic input/control device, or other rehabilitative activities. For example, in the case of advanced-stage arm rehabilitation, in situations where the patient is reaching up and away from the device, it may prove optimal to place the robotic device slightly in front of the patient.

Link Stacking Order

Figure 5:
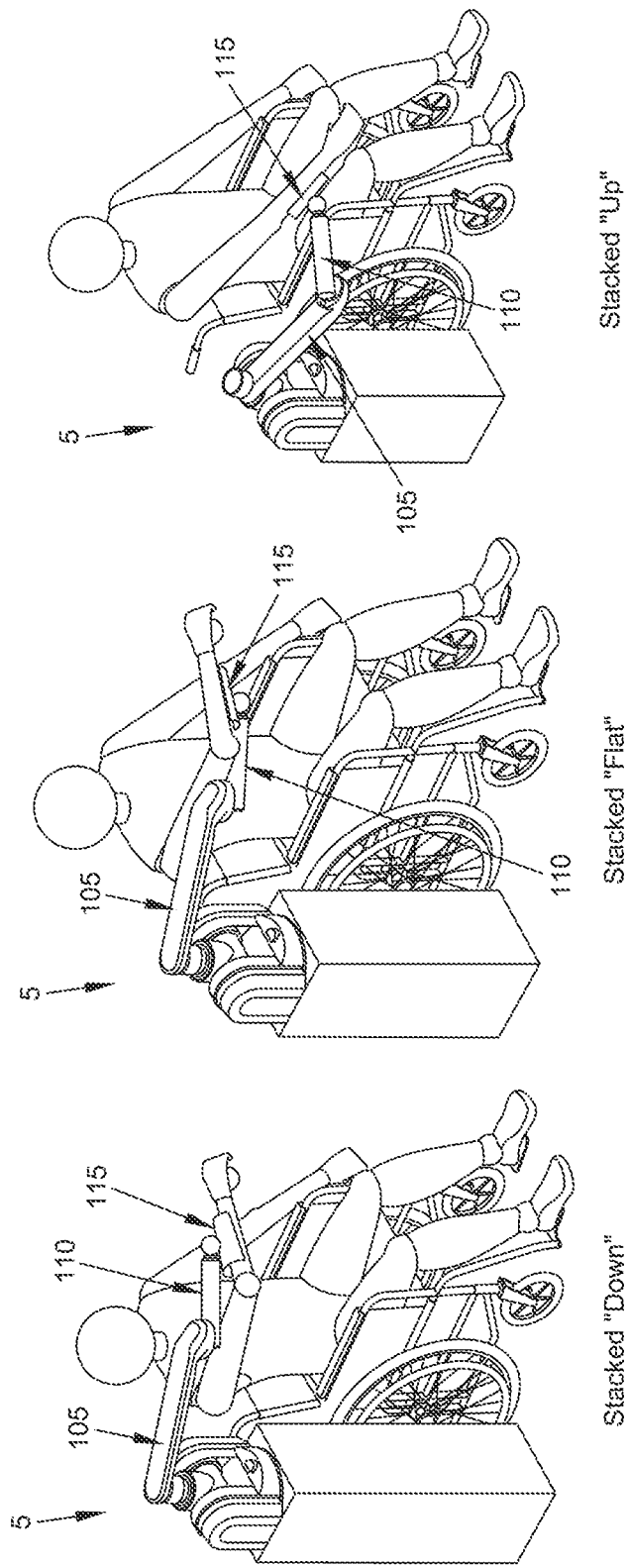
FIGS. 5A, 5B and 5C are schematic front perspective views showing how the robotic device of FIGS. 1 and 2 may use a "stacked down", "stacked flat" or "stacked up" construction.

Looking next at FIGS. 5A, 5B and 5C, several novel implementations of the system are shown wherein the device's links 105, 110 are ordered in different directions to facilitate different activities. By way of example but not limitation, FIG. 5A shows a configuration referred to as the "stacked-down" configuration, in which outer link 110 of robotic device 5 is attached to the underside of inner link 105 of robotic device 5, allowing the device to reach from above the patient, downwards, to their limb (attached via coupling element 115). FIG. 5C shows a configuration referred to as the "stacked-up" configuration, in which outer link 110 of robotic device 5 is attached to the top side of inner link 105 of robotic device 5, allowing the device to reach from below the patient, upwards, to their limb (attached via coupling element 115). Both implementations may prove optimal in different situations. The "stacked-down" variant is less likely to interfere with the patient's arm during rehabilitation activity because of its position above the patient's workspace, and may prove more useful for high-functioning rehabilitation patients who require expanded workspace. Conversely, the "stacked-up" variant is better able to support a patient's arm, and is less likely to interfere with the patient's visual workspace; it is better suited for low-functioning patients. FIG. 5B shows a configuration referred to as the "stacked-flat" configuration, in which outer link 110 of robotic device 5 is attached to the bottom side of inner link 105 of robotic device 5, and coupling element 115 is attached to the top side of outer link 110, allowing the device to reach the patient so that the forearm of the patient is approximately flat with inner link 105.

Cabled Differential, with Alternative Configurations

FIG. 6 illustrates an important aspect of the present invention, i.e., the use of a cabled differential (see, for example, U.S. Pat. No. 4,903,536) in a rehabilitation device. The preferred embodiment of robotic device 5 comprises three revolute joints J1, J2 and J3, implemented in a pitch-yaw-yaw configuration (FIG. 1), with the first two joints (i.e., J1 and J2) linked in a cabled differential as shown in FIG. 6. As shown in FIG. 6, the use of a cabled differential allows a motor that would normally be mounted on a higher-level kinematic frame to be moved down to a lower-level frame. For example, in the preferred embodiment shown in FIG. 6, motors 500 that cause rotation about joint J1 and joint J2 are moved from the aforementioned joint J1 kinematic frame (which rotates about axis 125 of joint J1) down to the aforementioned ground kinematic frame (the ground frame; co-located with base 100 in FIG. 1). This significantly reduces the inertia that motors 500 are required to move, which improves the performance of the robotic device and reduces its cost by permitting smaller motors 500 to be used. Although this is implemented in the preferred embodiment at the base of the robotic device, the principle behind this design is valid anywhere along a device's kinematic chain. This is a particularly important innovation in the context of a rehabilitation device because of its ability to reduce the device's cost, which must be kept low to ensure the commercial success of the device. This configuration also allows the exclusive use of rotary joints (instead of prismatic joints), which greatly simplifies the design of the device. Lower inertia also improves the safety of the device by lowering the momentum of the device. Finally, this innovation also maximizes usability by allowing the visual bulk of the device to be shifted away from the patient's line of sight towards the base of the device. While this concept is executed as part of a rehabilitation device with three degrees of freedom in the preferred embodiment, it is clearly applicable to other rehabilitation devices with as few as two degrees of freedom.

Figure 8:
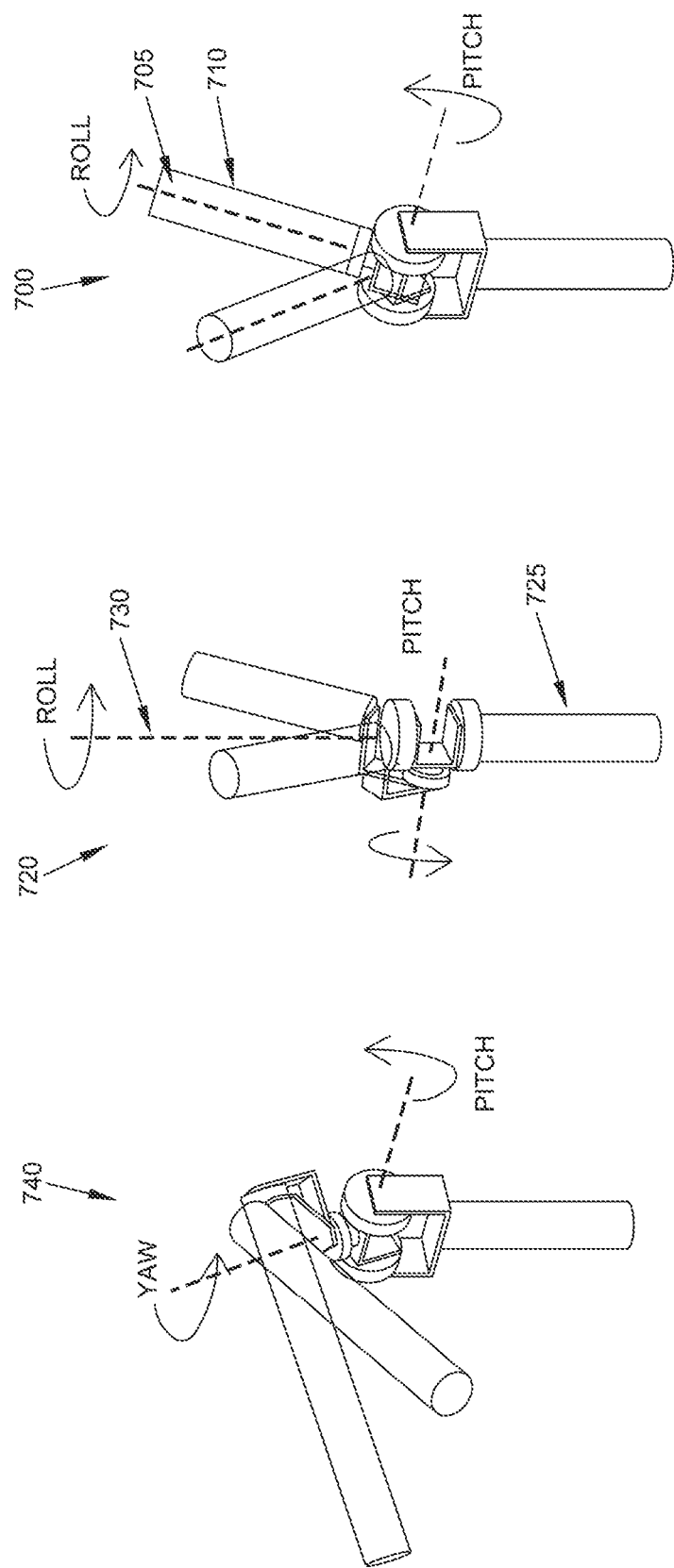
FIGS. 8A, 8B and 8C are schematic views showing the pitch-yaw configuration of the robotic device of FIGS. 1 and 2 in comparison to the roll-pitch and pitch-roll configurations of prior art devices.

Furthermore, in the preferred embodiment shown in FIGS. 1 and 6, the implementation of a cabled differential with the input and output axes (i.e., the axes of input pulleys 505 and output pulley 540) both perpendicular to the distal link axis (i.e., the axis along inner link 105) provides the benefits of a cabled differential while allowing the unique pitch-yaw kinematic arrangement that makes this device so well suited to rehabilitation use. Previous implementations of cabled differentials have either been arranged in a pitch-roll configuration such as in the Barrett WAM product of Barrett Technology, Inc. of Newton, MA as shown at 700 in FIG. 8C, or in a roll-pitch configuration such as in the Barrett WAM wrist product as shown at 720 in FIG. 8B. In both of these implementations (i.e., the pitch-roll configuration 700 of FIG. 8C and the roll-pitch configuration 720 of FIG. 8B), either the distal link (i.e., the link beyond the differential in the kinematic chain) or the proximal link (i.e., the link before the differential in the kinematic chain) is permanently coaxial with one of the two differential rotational axes. In the case of the pitch-roll configuration 700 of FIG. 8C, outer link 710 is always coaxial to the differential output axis 705; in the roll-pitch configuration 720 of FIG. 8B, inner link 725 is always coaxial to the differential input axis 730.

To date, however, the cabled differential has not been used in a configuration where neither of the differential axes is coaxial to one of the links. This configuration has been successfully implemented in the preferred embodiment of the present invention, as seen in both FIG. 6 (see the pitch-yaw configuration of joints J1 and J2 relative to the inner link of robotic device 5) and in FIG. 8A, where the novel pitch-yaw configuration 740 is shown. This new implementation of the cabled differential enables innovative kinematic configurations like that used in the present invention.

Bi-Manual, Multi-Dimensional Rehabilitation Exercises and Device Design

Figure 9:
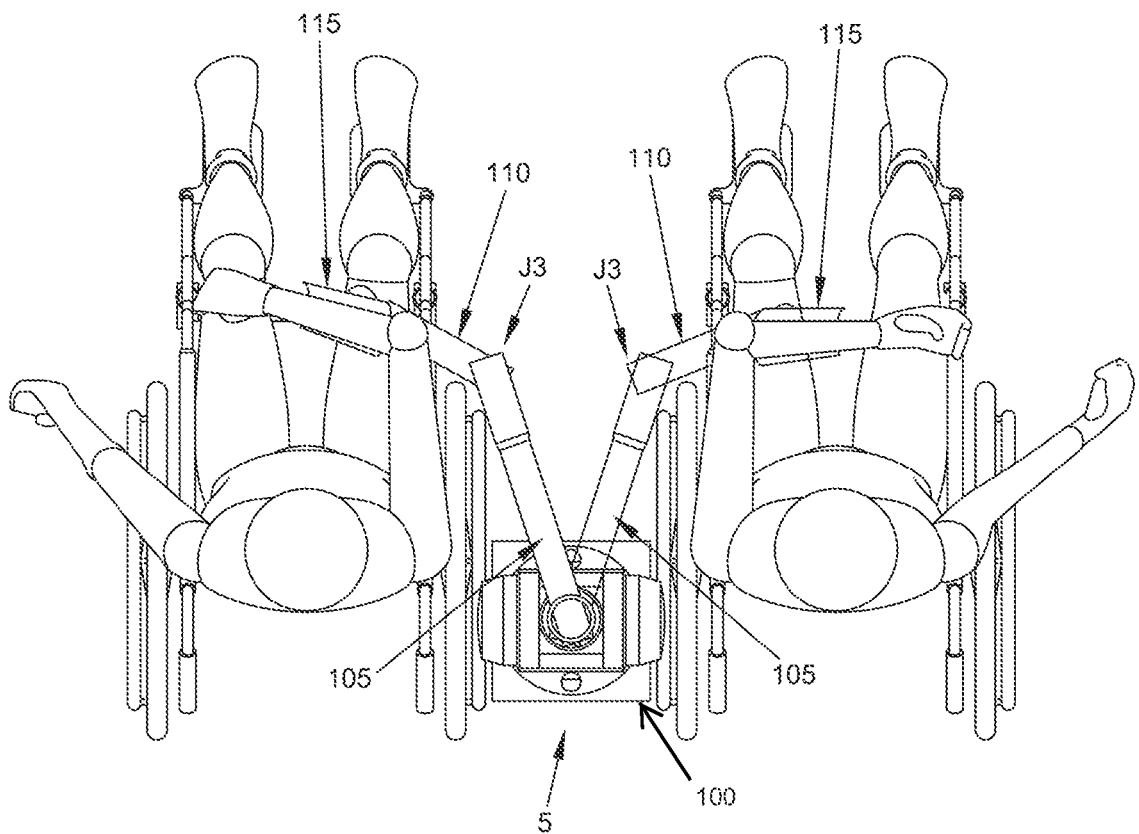
FIG. 9 is a schematic top view showing how the robotic device of the present invention may be switched from right-handed use to left-handed use.

FIG. 9 shows how the preferred embodiment of robotic device 5 is optimal for the purposes of switching from right-handed use to left-handed use. Robotic device 5 is essentially symmetric across a plane parallel to the patient's mid-sagittal plane and coincident with axis 130 of joint J2. By simply ensuring that the range of joint J2 is symmetric about the previously-described plane, and enabling outer link 110 to be reversed about axis 135 of joint J3 such that its range of motion is symmetric about the previously-described plane in either position, the device's chirality can easily be reversed, enabling it to be used on either the right side of the patient's body or the left side of the patient's body, as seen in FIG. 9.

Figure 10:
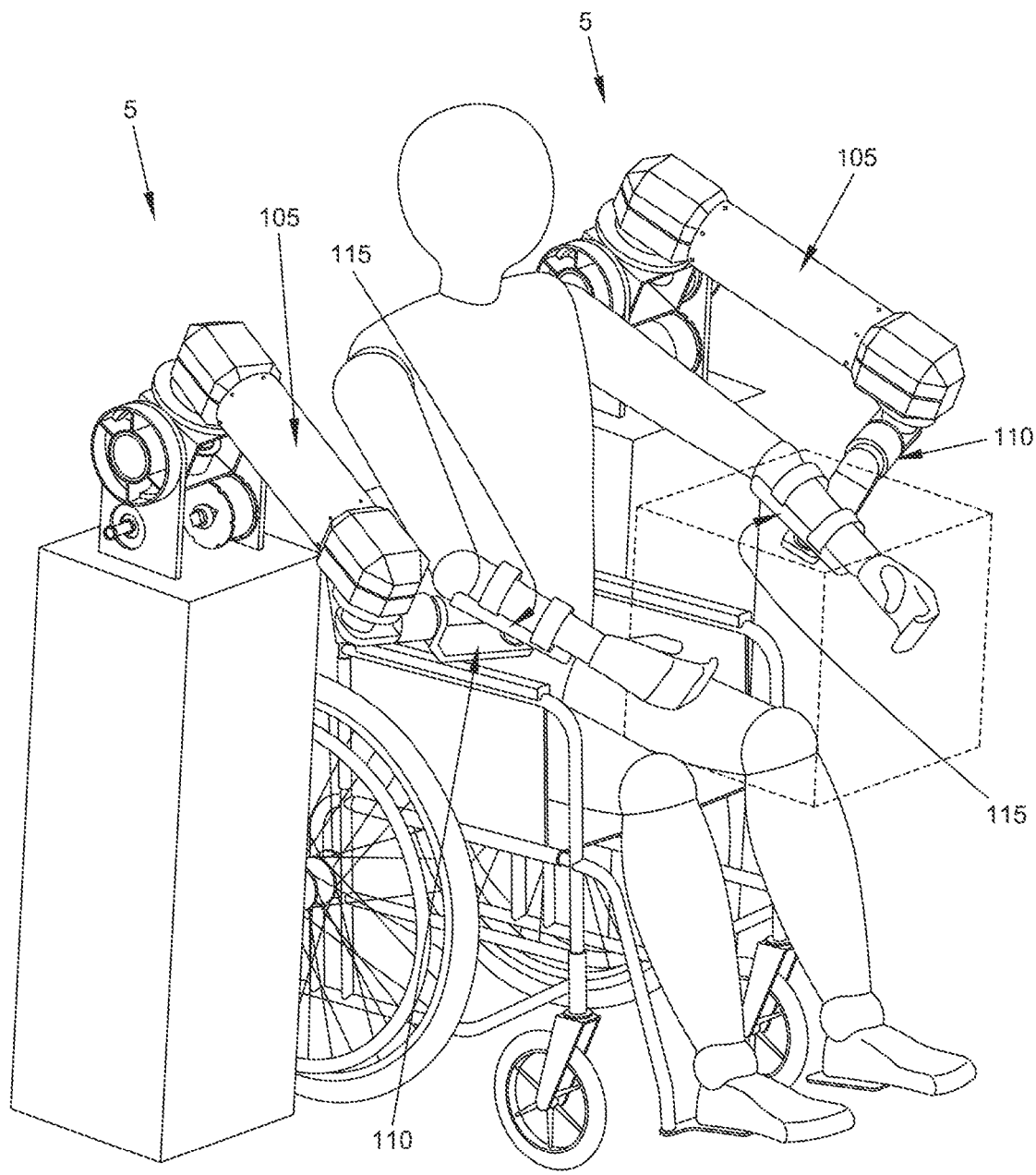
FIG. 10 is a schematic view showing two robotic devices being used for bi-manual rehabilitation.

Finally, FIG. 10 illustrates how the innate symmetry and reversible chirality of robotic device 5 combine with its unique working position/orientation and small size to allow two units of the robotic device to be used simultaneously for three-dimensional bi-manual rehabilitation. In bi-manual rehabilitation, the afflicted limb is paired with a non-afflicted limb in rehabilitation activities, including cooperative tasks, such as using both limbs to lift an object; and instructive tasks, where the healthy limb "drives" the afflicted limb. The value of bi-manual rehabilitation (particularly in the context of rehabilitation from a neuromuscular injury such as a stroke, which can make execution of neurologically complex tasks like coordinated movement between limbs on opposite sides of the body exceedingly difficult) was theorized as early as 1951, and has gained significant traction over the past 20 years. See "Bimanual Training After Stroke: Are Two Hands Better Than One?" Rose, Dorian K. and Winstein, Carolee J. Topics in Stroke Rehabilitation; 2004 Fall; 11(4): 20-30. Robotic rehabilitation devices are extremely well suited to this type of therapy, due to their ability to precisely control the motion of the patient's limbs and coordinate with other rehabilitation devices.

Figure 12:
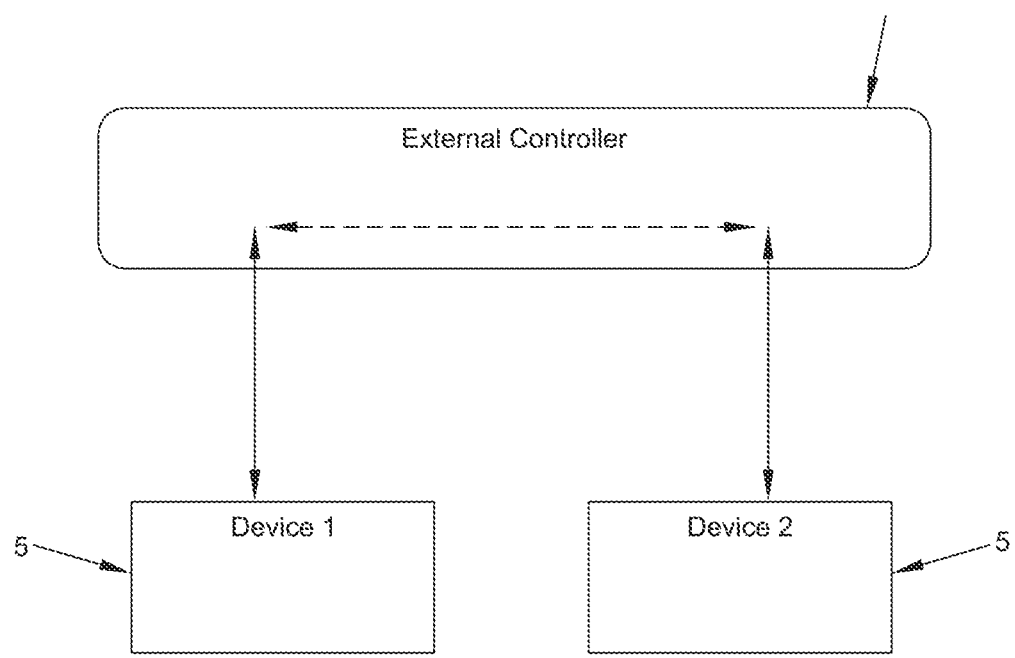
FIG. 12 shows how a pair of robotic devices may communicate with an external controller, which in turn facilitates communication between the devices.

In an exemplary implementation shown in FIG. 10, a first robotic device 5 is connected to the patient's afflicted right arm, while a second robotic device 5 is connected to a more functional left arm. The robotic devices are linked to each other through some type of common controller (e.g., as seen in FIG. 12, an external controller 597 that communicates with the onboard controllers of both robotic devices 5, while facilitating communication between the two devices), which coordinates the rehabilitation therapy. While this example is demonstrated using images of the preferred embodiment of the robotic device, it may be understood that the essential concept of bi-manual rehabilitation may be implemented with any variety of devices, even if those devices are dissimilar to one another and/or to the preferred embodiment of robotic device 5. However, there are significant advantages to using two similar robotic devices 5 for bi-manual rehabilitation, which are disclosed below, and which lead to a novel method for bi-manual rehabilitation.

The robotic device 5 described here is the first non-planar rehabilitation device to be purpose-designed for this type of dual-device, simultaneous use in a three-dimensional bi-manual system. As described earlier, the robotic device's innate symmetry allows its chirality to be easily reversed, allowing the same robotic device design to be used for rehabilitation of both right and left limbs. Furthermore, the device's small footprint facilitates simultaneous use of two systems, as shown in FIG. 10. While other devices, such as the Armeo™Power system of Hocoma AG of Volketswil, Switzerland, are similarly reversible, the size of these systems and their position relative to the patient precludes their use in a bi-manual rehabilitation system, since the bases of the two systems would interfere. There are also some devices that have been deliberately designed for bi-manual rehabilitation, such as the KINARM Exoskeleton™ and End-Point™ robots of BKIN Technologies of Kingston, Ontario, Canada. However, as mentioned above, these devices are deliberately limited to planar (i.e., two-dimensional) rehabilitative therapies, significantly impacting their utility for patients.

There exists one known example of a system that is nominally capable of performing limited 3-dimensional bi-manual rehabilitation therapies with only uni-manual actuation, i.e., the $3^{rd}$-generation Mirror-Image Motion Enabler (MIME) rehabilitation robot, developed as a collaborative project between the Department of Veterans Affairs and Stanford University in 1999. See "Development of robots for rehabilitation therapy: The Palo Alto VA/Stanford experience." Burgar et. al. *Journal of Rehabilitation Research and Development*. Vol. 37 No. 6, November/December 2000, pp. 663-673. The $3^{rd}$-generation MIME robot consists of a PUMA-560 industrial robot affixed to the patient's afflicted limb, and a passive six-axis MicroScribe™ digitizer affixed to a splint, which is in turn coupled to the patient's healthy limb. In the system's bi-manual mode, motions of the healthy limb are detected by the digitizer and passed to the robotic arm, which moves the afflicted limb such that its motions mirror those of the healthy limb. While this system can execute a limited set of bi-manual rehabilitation therapies, it is fundamentally limited by the uni-directional flow of information within the system: information can be passed from the healthy limb to the afflicted limb, but not from the afflicted limb back to the healthy limb to the healthy limb, since the digitizer is passive and does not have motors or other mechanisms with which to exert forces on the patient's healthy limb.

In the implementation described herein, the use of two similar, active robotic devices 5—in the preferred implementation, with similar kinematics, joint ranges, force output limits and static and dynamic performance characteristics—enables bi-directional information flow (i.e., bi-directional information flow wherein both devices send, receive and respond to information from the other device), creating a bi-manual rehabilitation system that is capable of monitoring the position of both the afflicted and healthy limbs, moving the patient's afflicted limb in three dimensions and potentially controlling its orientation simultaneously, and optionally providing simultaneous force feedback, support or other force inputs to the healthy limb. For example, the robotic device connected to the patient's healthy limb can be used to "drive" the robotic device connected to the patient's afflicted limb, while simultaneously supporting the healthy limb to prevent fatigue, and providing force feedback to the healthy limb as required by the therapy. In this respect it has been found that the cable drives used in the preferred implementation of the present invention are particularly well suited to this type of use, because of the high mechanical bandwidth of cable drive transmissions; however, alternative embodiments could be implemented using alternative mechanical drive systems. Regardless of the specific implementation, this bi-directional information flow—when executed between two similar devices with the facilitating characteristics described here—allows the device to be used for a far wider range of three-dimensional bi-manual rehabilitative therapies than prior art systems and enables the method disclosed herein.

User Interface Endpoint Device and Left-Hand to Right-Hand Flipping Mechanism

In the foregoing sections, robotic device 5 was described as having a coupling element 115 for coupling outer link 110 to a patient, commonly to a limb of a patient, with outer link 110 being detachably connected to the remainder of the robotic device at the aforementioned mechanism 590 (FIGS. 6 and 7), e.g., via latch 594 (FIG. 7). Coupling element 115 and outer link 110 can be thought of as together constituting a user interface endpoint device (i.e., an "endpoint") for robotic device 5, i.e., the portion of robotic device 5 that physically contacts the patient. In the following section, different possible embodiments of endpoints, all of which are modular and "swappable" on robotic device 5, are described. Different types of endpoints are important to allow patients with different functional capabilities, and different therapeutic goals, to use the system.

FIGS. 13, 13A, 14 and 15 show a cradle endpoint 800 for use by the right-hand of a patient. Cradle endpoint 800 generally comprises a cradle 805 for receiving a limb (e.g., the forearm) of a patient, straps 810 for securing the limb to cradle 805, a connector 815 for connecting cradle 805 to outer link 110, and the aforementioned outer link 110. Cradle endpoint 800 preferably also comprises a ball grip 820 for gripping by the patient (e.g., the hand of a patient). With cradle endpoint 800, the patient grabs the ball and straps their forearm to the cradle. Cradle endpoint 800 is intended to be used by patients with moderate or severe functional impairments, or by users that want to rest the weight of their arm on the system during use. If desired, a monitor 825 may be provided adjacent to robotic device 5 for providing the patient with visual feedback while using robotic device 5. By way of example but not limitation, cradle endpoint 800 may provide haptic feedback to the patient and monitor 825 may provide visual feedback to the patient, and the system may also provide audible feedback.

Figure 13:
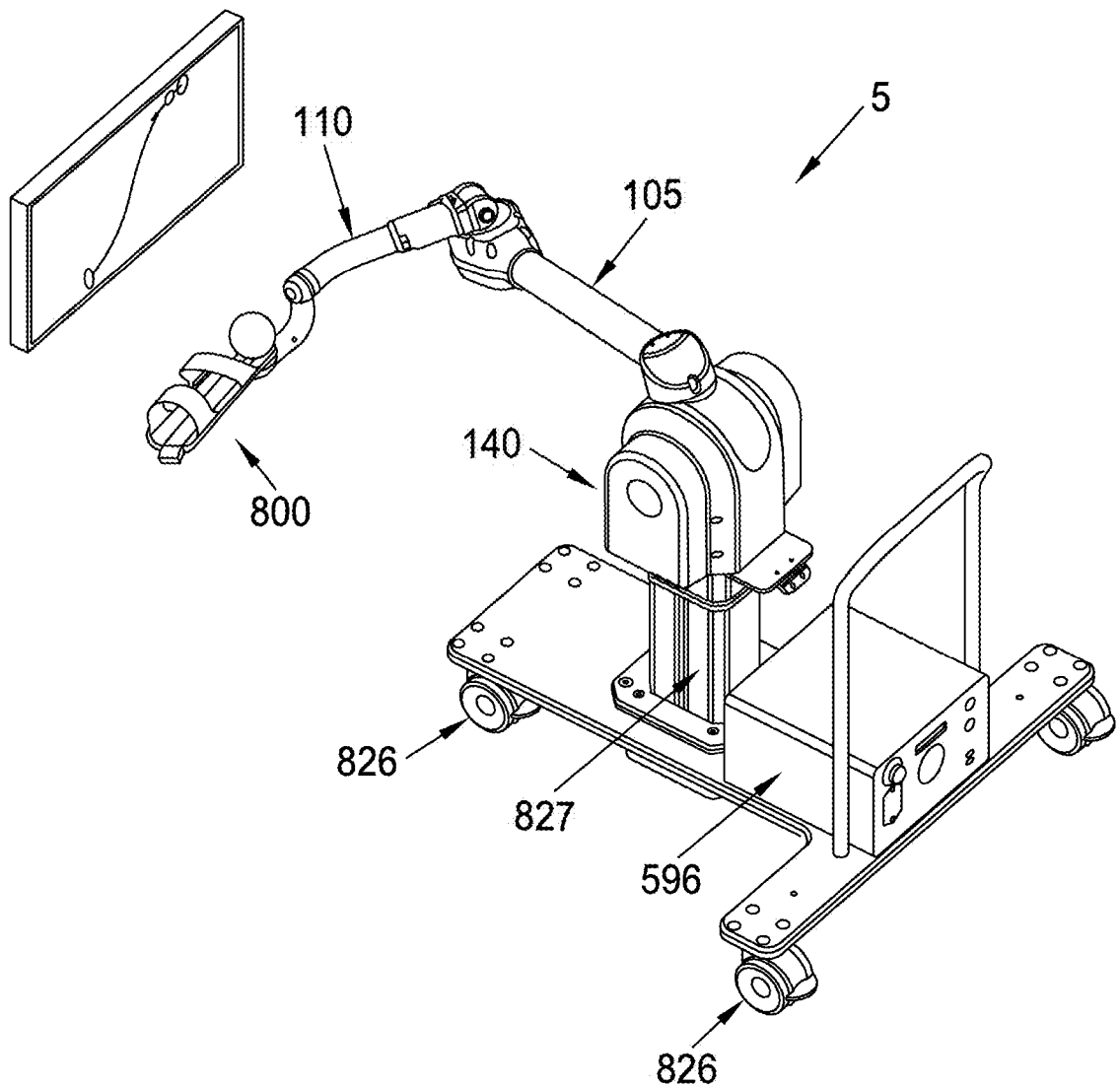
FIGS. 13, 13A, 14 and 15 are schematic views showing one preferred endpoint device for the robotic device of the present invention.
Figure 13A:
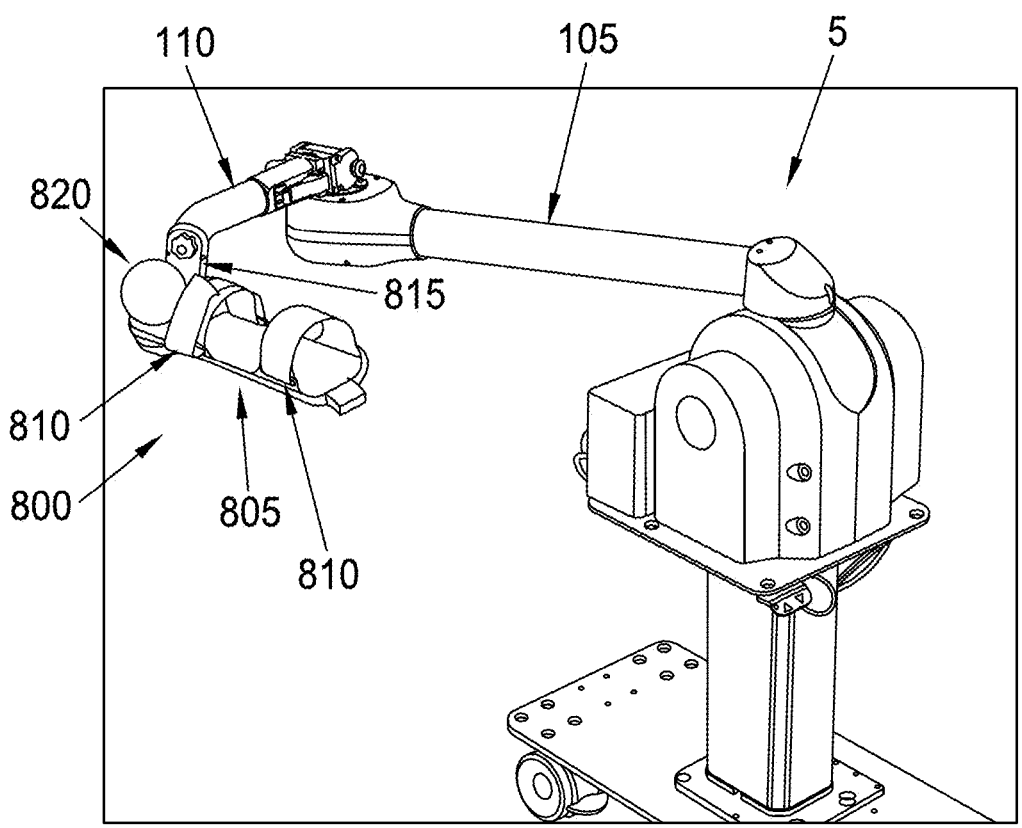
Figure 14:
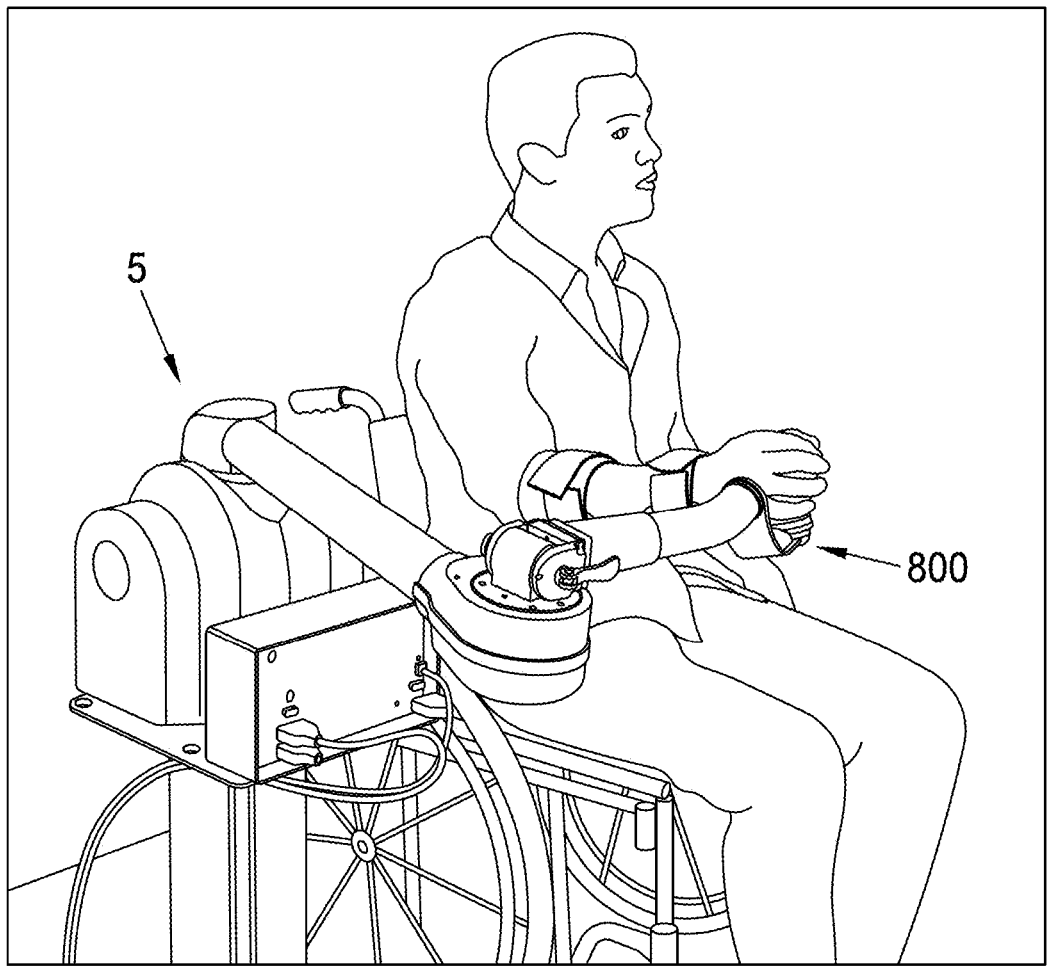

Note that in FIGS. 13 and 13A, robotic system 5 is shown mounted to a movable base 100, i.e., a base 100 which is mounted on wheels (or casters) 826 which may be free-wheeling or driven by onboard controller 596 (which may be contained in its own housing, e.g., in the manner shown in FIG. 13).

Figure 15:
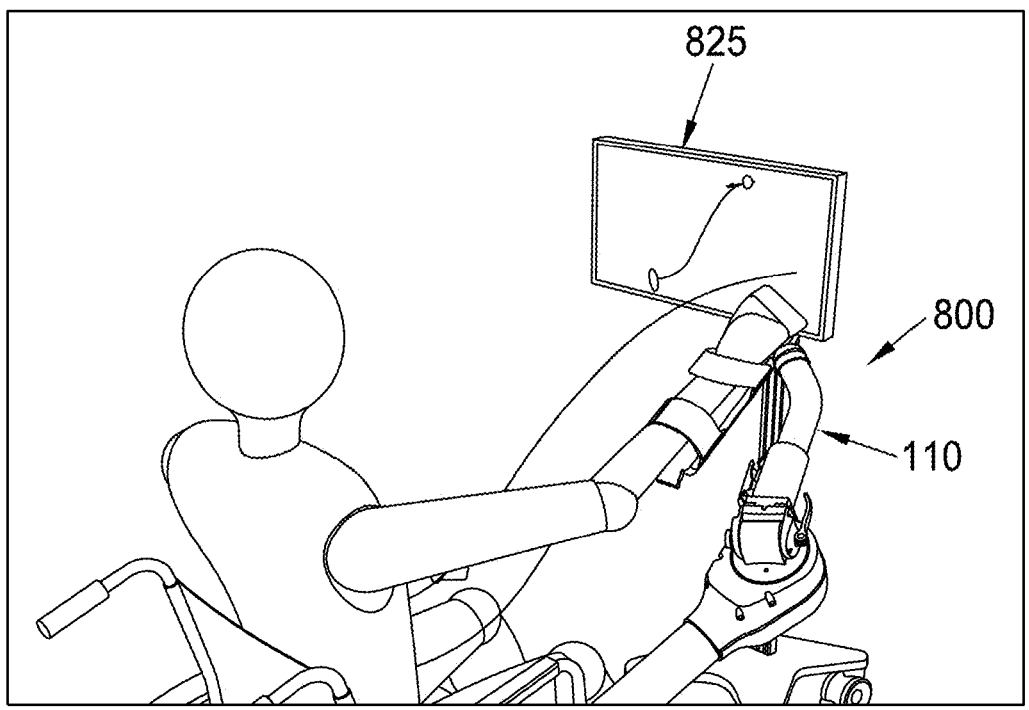
Figure 15A:
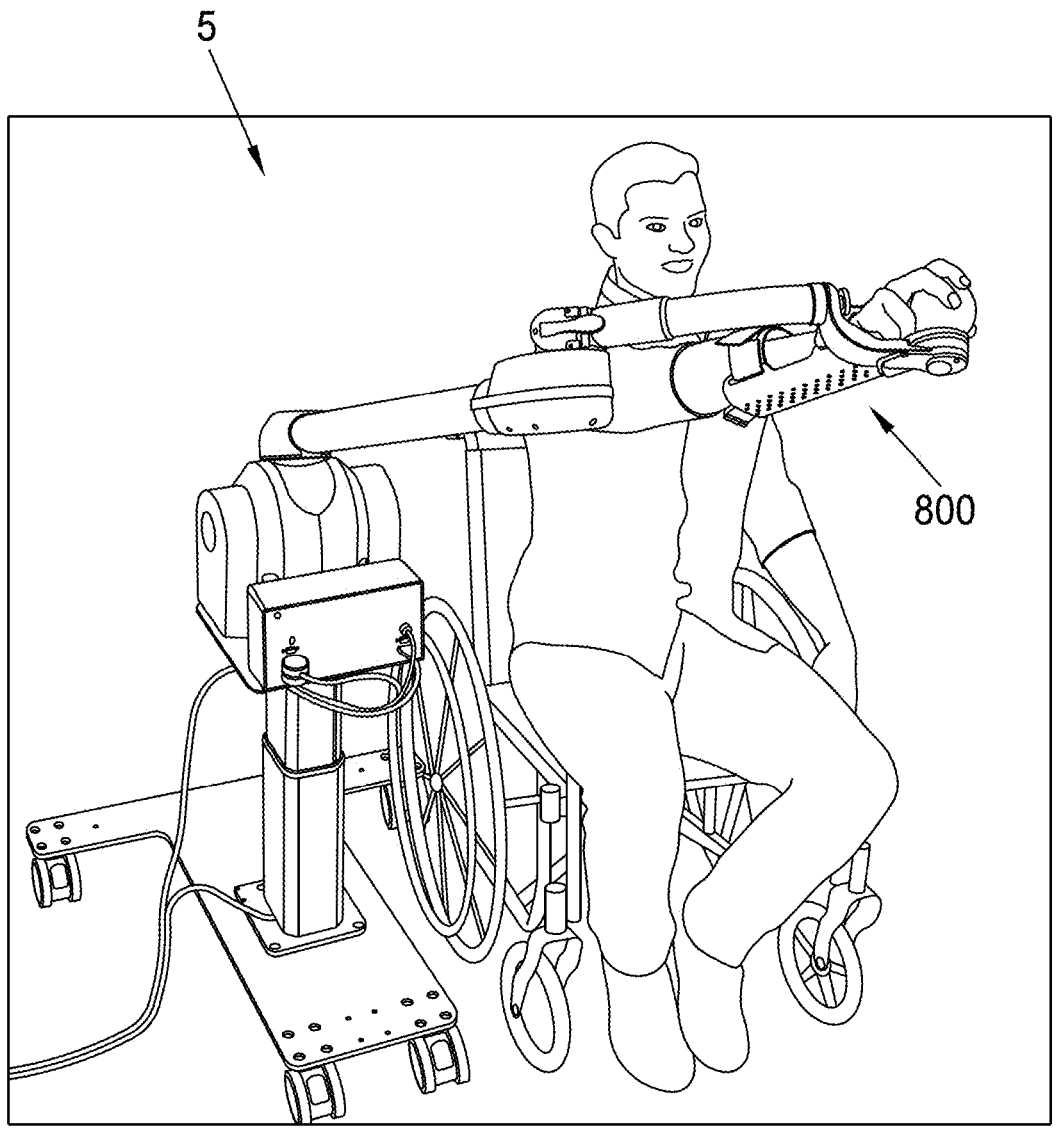
FIG. 15A is a schematic view showing the robotic device being used by a patient in a sitting position.
Figure 15B:
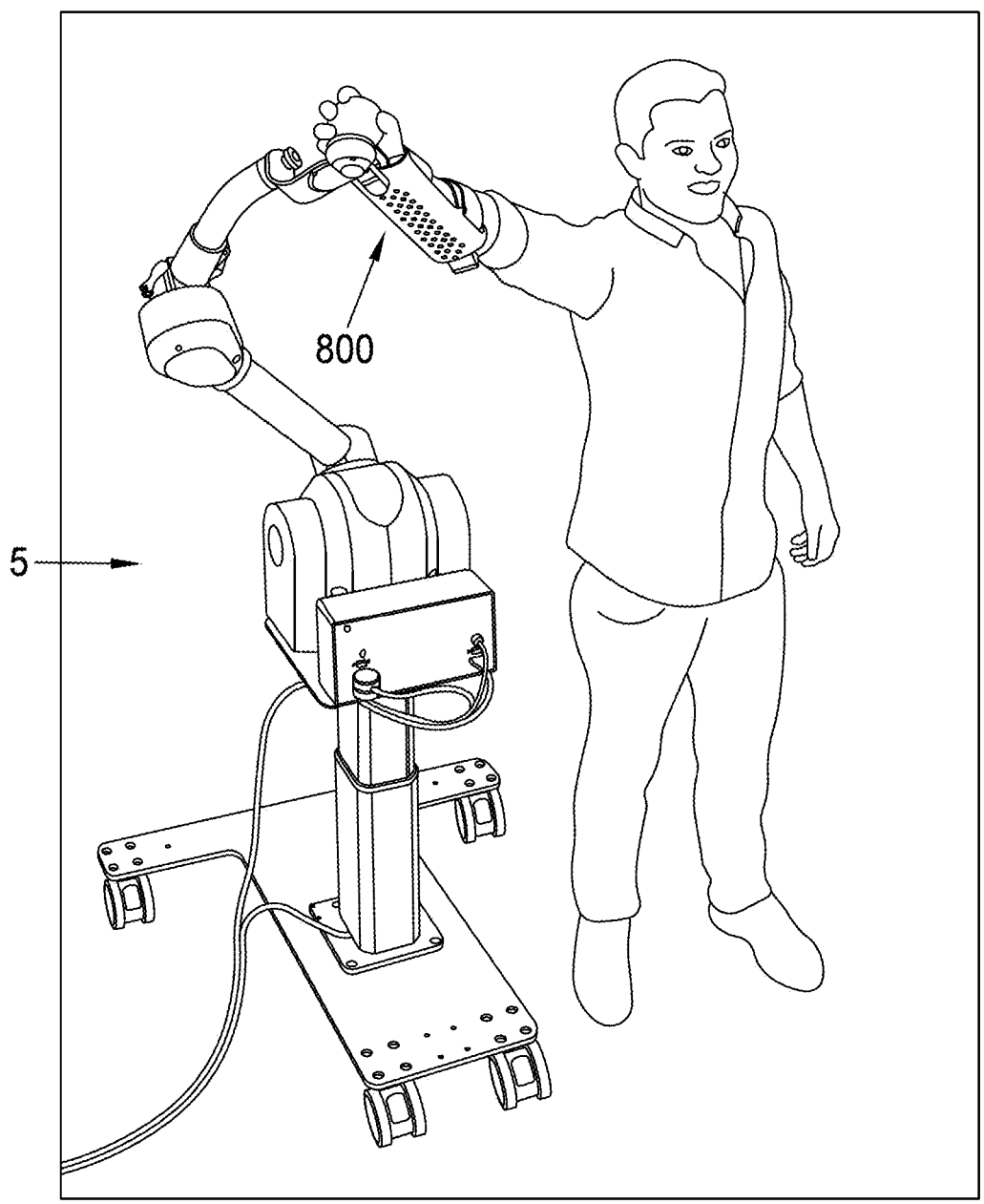
FIG. 15B is a schematic view showing the robotic device being used by a patient in a standing position.

Note also that in this form of the invention, U-shaped frame 140 may be supported above base 100 via a telescoping assembly 827 which allows the height of U-shaped frame 140 (and hence the height of the robotic arm) to be adjusted relative to base 100. This feature is highly advantageous, since it facilitates the use of robotic device 5 with patients who are both sitting (FIG. 15A) and standing (FIG. 15B). In one preferred form of the invention, telescoping assembly 827 comprises a rigid and strong linear actuator (not shown) that can extend approximately 0.5 meter in height. An electric motor (not shown) raises and lowers the top of telescoping assembly 827 (and hence raises and lowers the robotic arm mounted to the top of the telescoping assembly). This height adjustment is important for people of different heights and for different wheelchair types. By way of example but not limitation, lower-functioning patients who are wheelchair-bound can use the device near the lower end of the vertical travel. Higher-functioning patients who are re-learning to amble can use the device near the upper end of the vertical travel and engage with exercises that gently challenge balance, e.g., in an enjoyable game atmosphere.

Of course, the vertical height adjustment could be done by other means well known in the art, such as a manual foot-pumping hydraulic lift.

Figure 16:
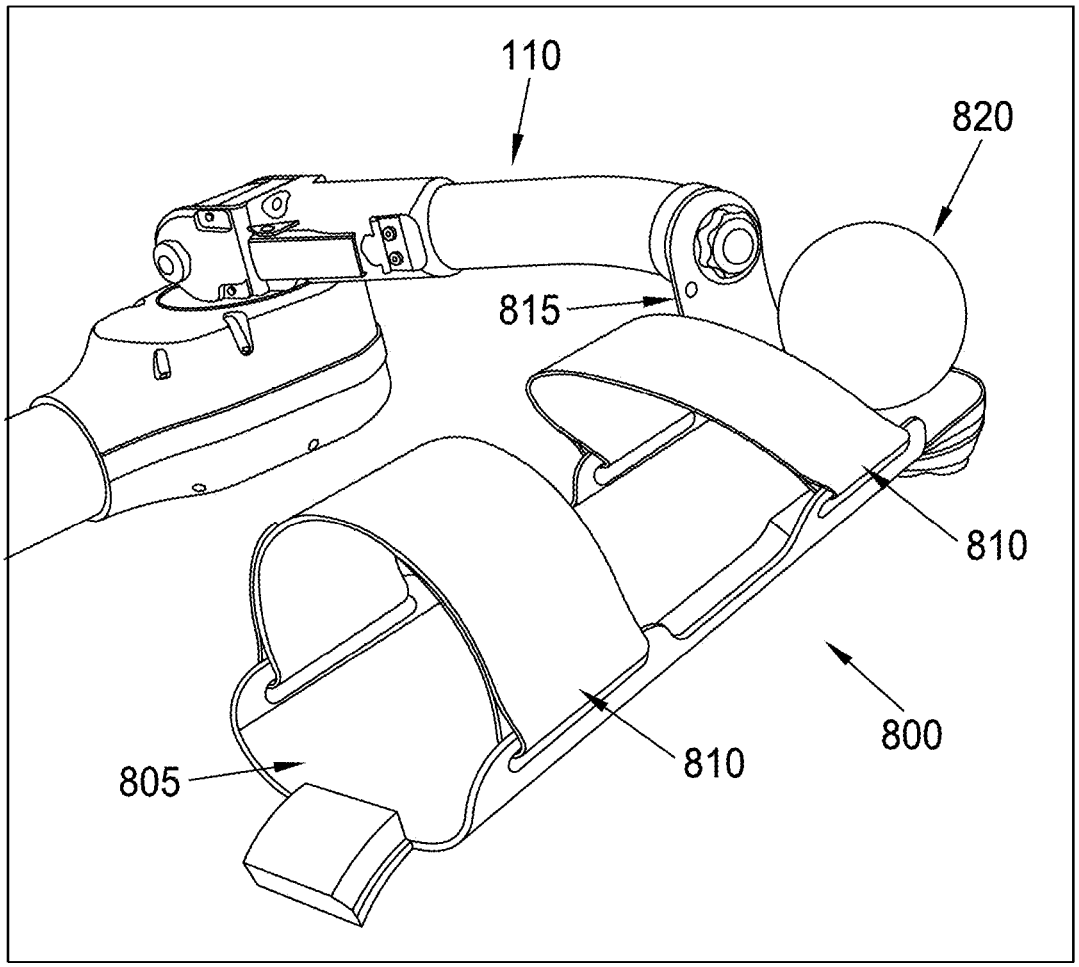
FIG. 16 is a schematic view showing another preferred endpoint device for the robotic device of the present invention.

FIG. 16 shows the same cradle endpoint 800, except reconfigured for use by the left-hand of a patient.

Figure 17:
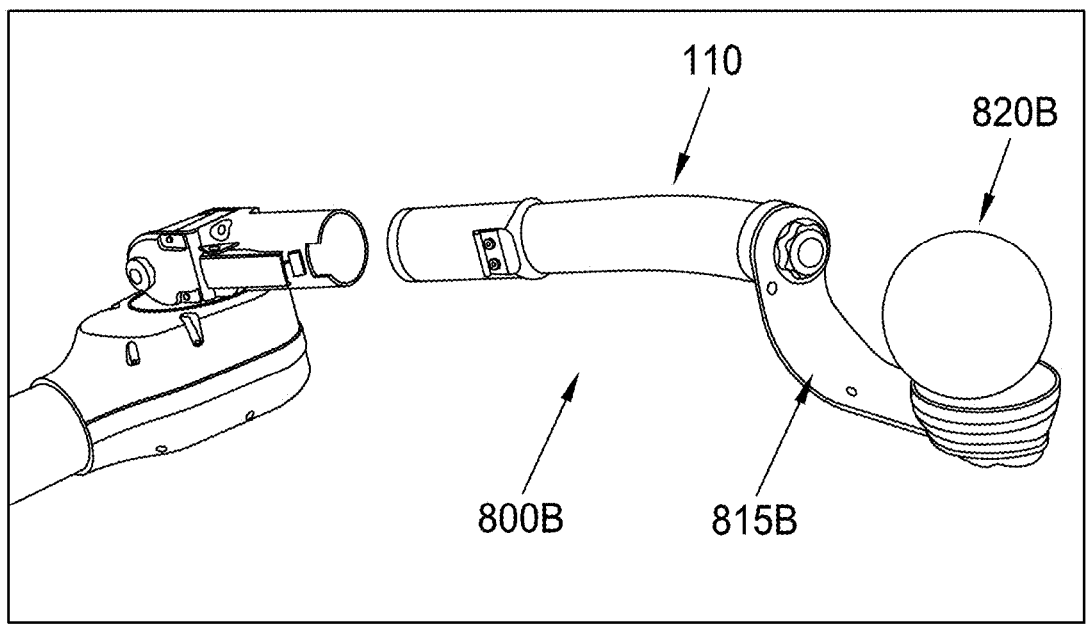
FIG. 17 is a schematic view showing another preferred endpoint device for the robotic device of the present invention.

FIG. 17 shows a ball endpoint 800B. Ball endpoint 800B is substantially the same as cradle endpoint 800A, except that cradle 805A and straps 810A are omitted. With ball endpoint 800B, ball grip 820B is simply "grabbed" by the user. Ball endpoint 800B is intended to be used by relatively healthy users, for example, high-functioning stroke patients. Ball endpoint 800B can also be used as a haptic-input device for healthy users for gaming or use with computer programs. Also contemplated is the possibility to secure the user's hand to the ball with an ace bandage (not shown) or a built-in strap/webbing system (not shown).

Figure 18:
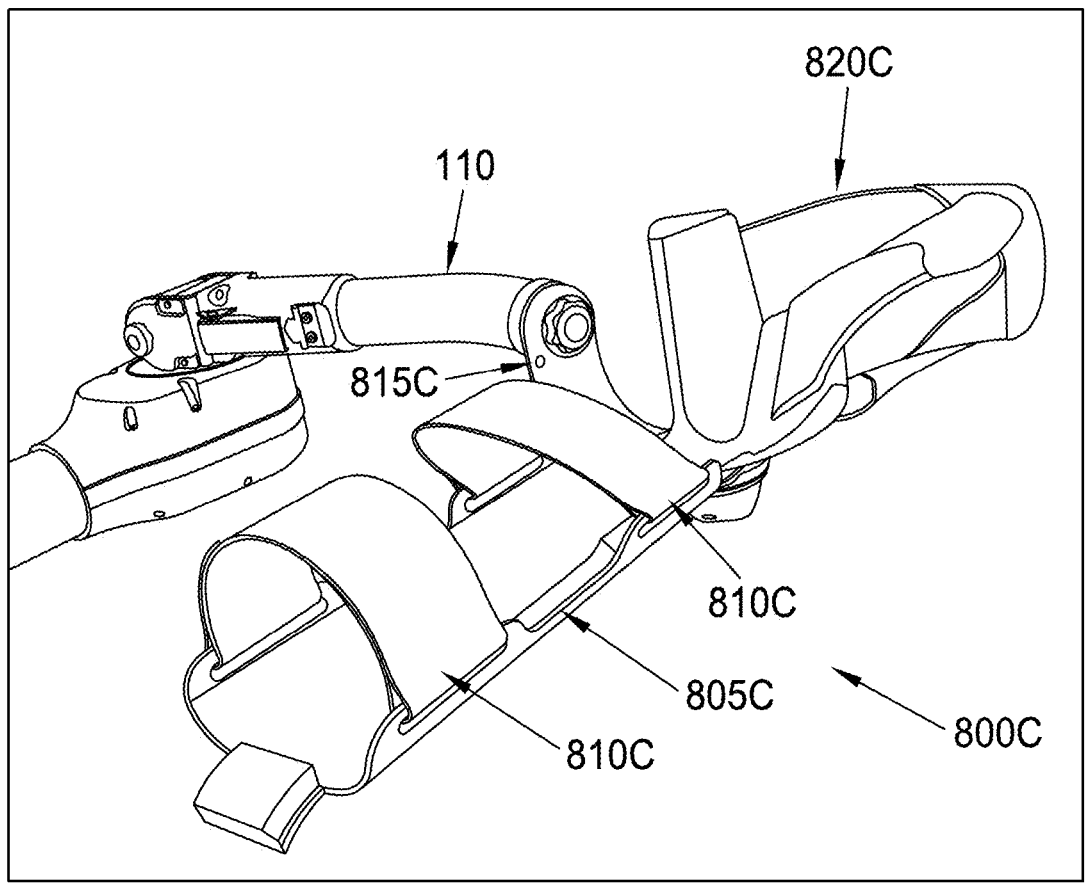
FIG. 18 is a schematic view showing another preferred endpoint device for the robotic device of the present invention.

FIG. 18 shows a cradle endpoint with hand-grip assist 800C. Cradle endpoint with hand-grip assist 800C is substantially the same as cradle endpoint 800A except that ball grip 820A is replaced by an actuated or spring-based hand-grip 820C. In this form of the invention, the user slips their hand into hand-grip 820C and straps their forearm to cradle 805C using straps 810C. Cradle endpoint with hand-grip assist 800C is similar to cradle endpoint 800A described above, with the added functionality of an actuated or spring-based device that provides assistance to the user to open and/or close their hand.

Novel attributes of these endpoint devices are listed below and described in further detail in the sections that follow:
A. single yaw-axis coincident with point-of-interest;
B. flexible arm support (cradle);
C. adjustable pitch angle;
D. off-axis rotatable hand support;
E. hand-presence sensing;
F. modular endpoint;
G. endpoint-presence sensing;
H. endpoint-type sensing;
I. gravity compensation algorithms; and
J. changing handedness.

A. Single Yaw Axis Coincident with Point-of-Interest

Figure 19:
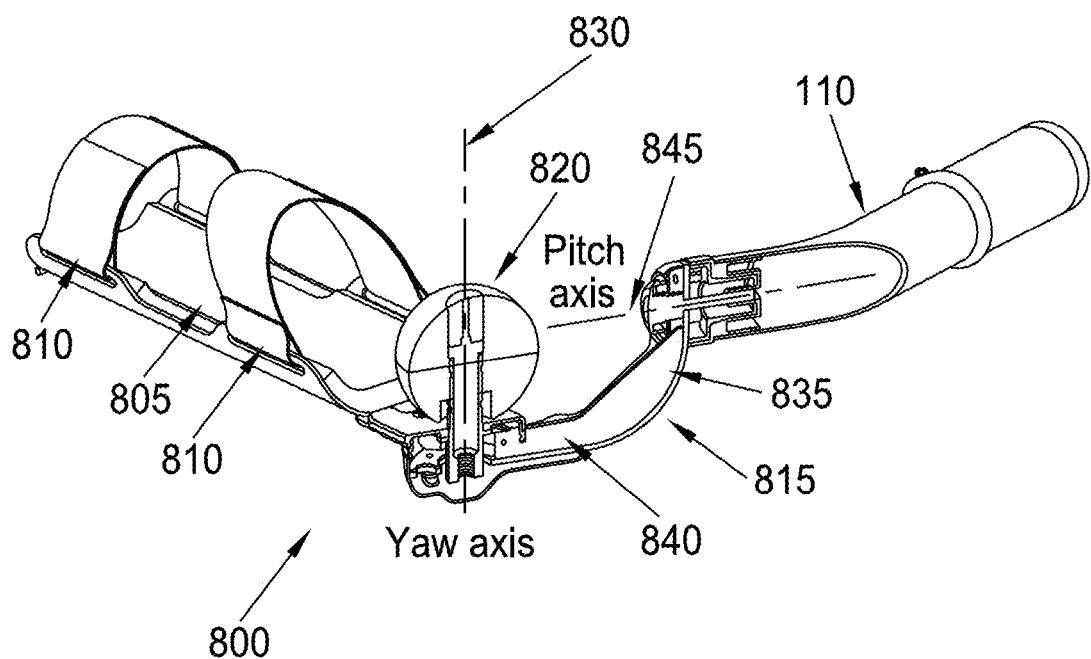
FIG. 19 is a schematic view showing details of the construction of the endpoint device of FIG. 16.

In one preferred form of the invention, the endpoint device comprises a single yaw axis which is coincident with a point-of-interest (e.g., the user's hand). By way of example but not limitation, and looking now at FIG. 19, cradle endpoint 800 comprises a single passive degree-of-freedom (yaw) that is coincident with the point-of-interest (i.e., ball grip 820 which is grasped by the user's hand). Note that cradle 805 and ball grip 820 both rotate about a yaw axis

830. Note also that connector 815 comprises a first portion 835 for connection to outer link 110, and a second portion 840 for connection to cradle 805 and ball grip 820, with first portion 835 being connected to outer link 110 so as to provide rotation about a pitch axis 845.

B. Flexible Arm Support (Cradle)

Figure 20:
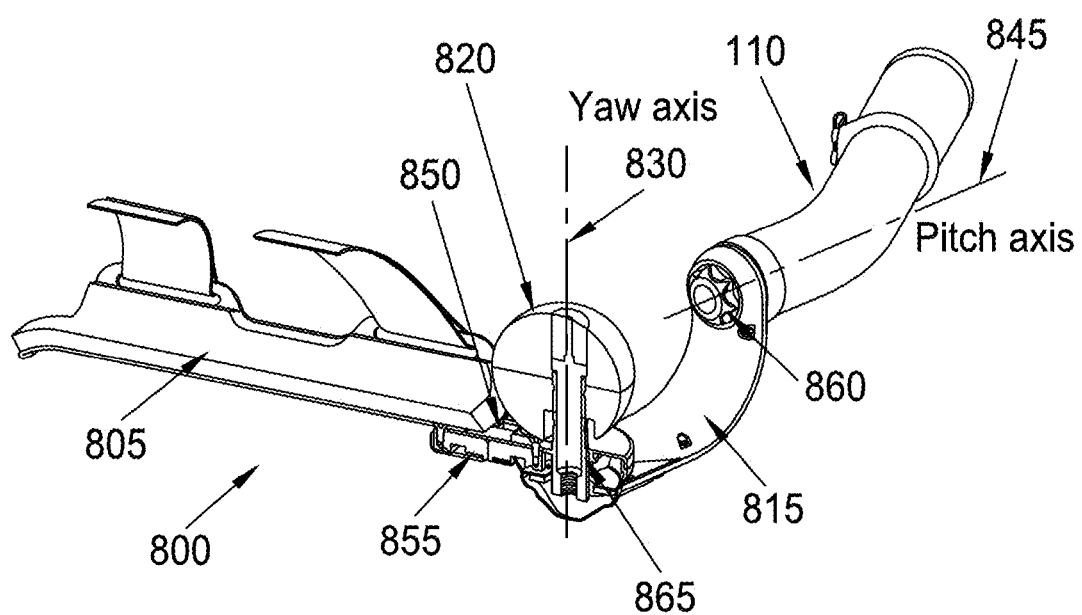
FIG. 20 is a schematic view showing another preferred endpoint device for the robotic device of the present invention.
Figure 21:
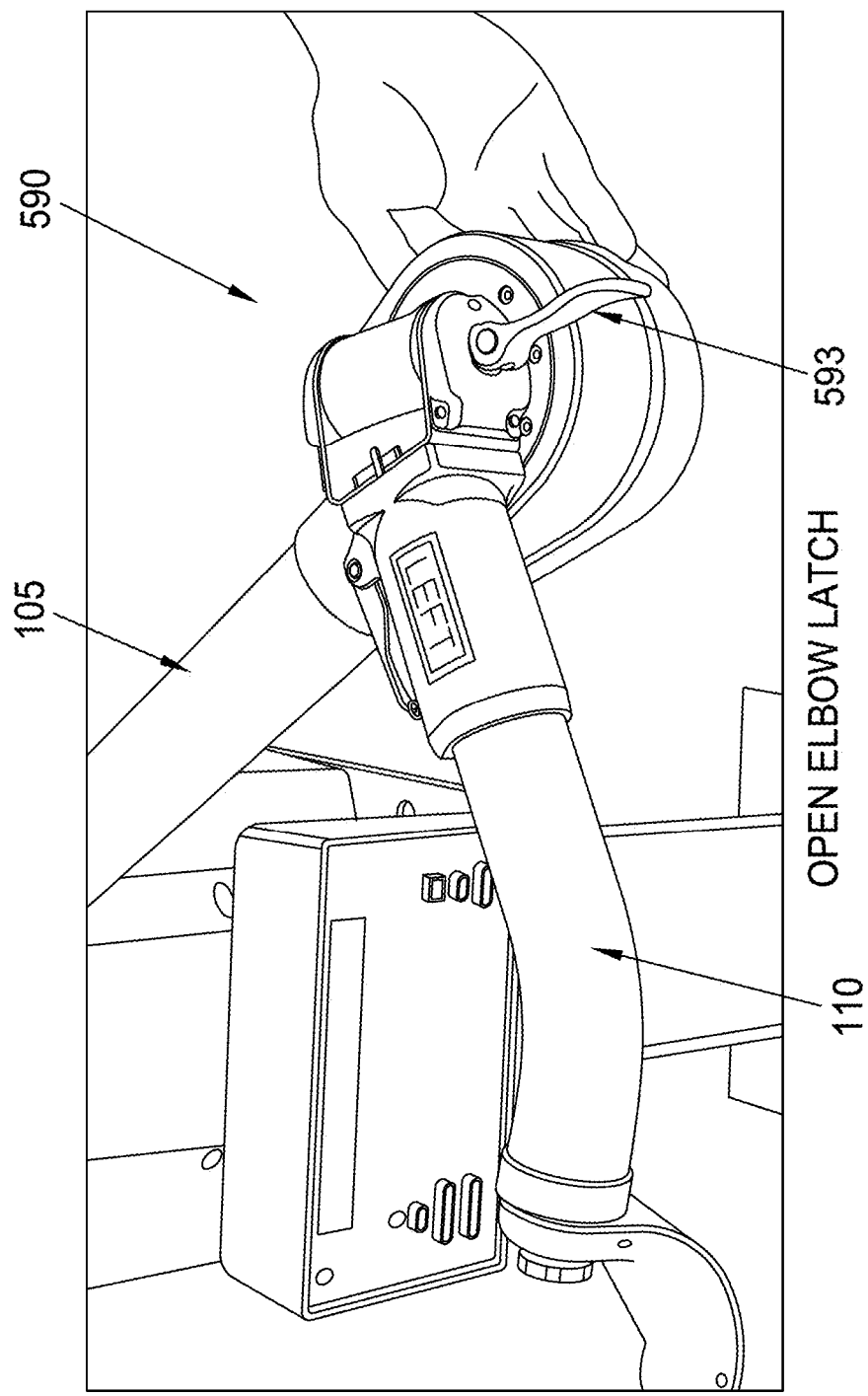
FIGS. 21-26 are schematic views showing how the robotic device may be changed from left-handed use to right-handed use.
Figure 22:
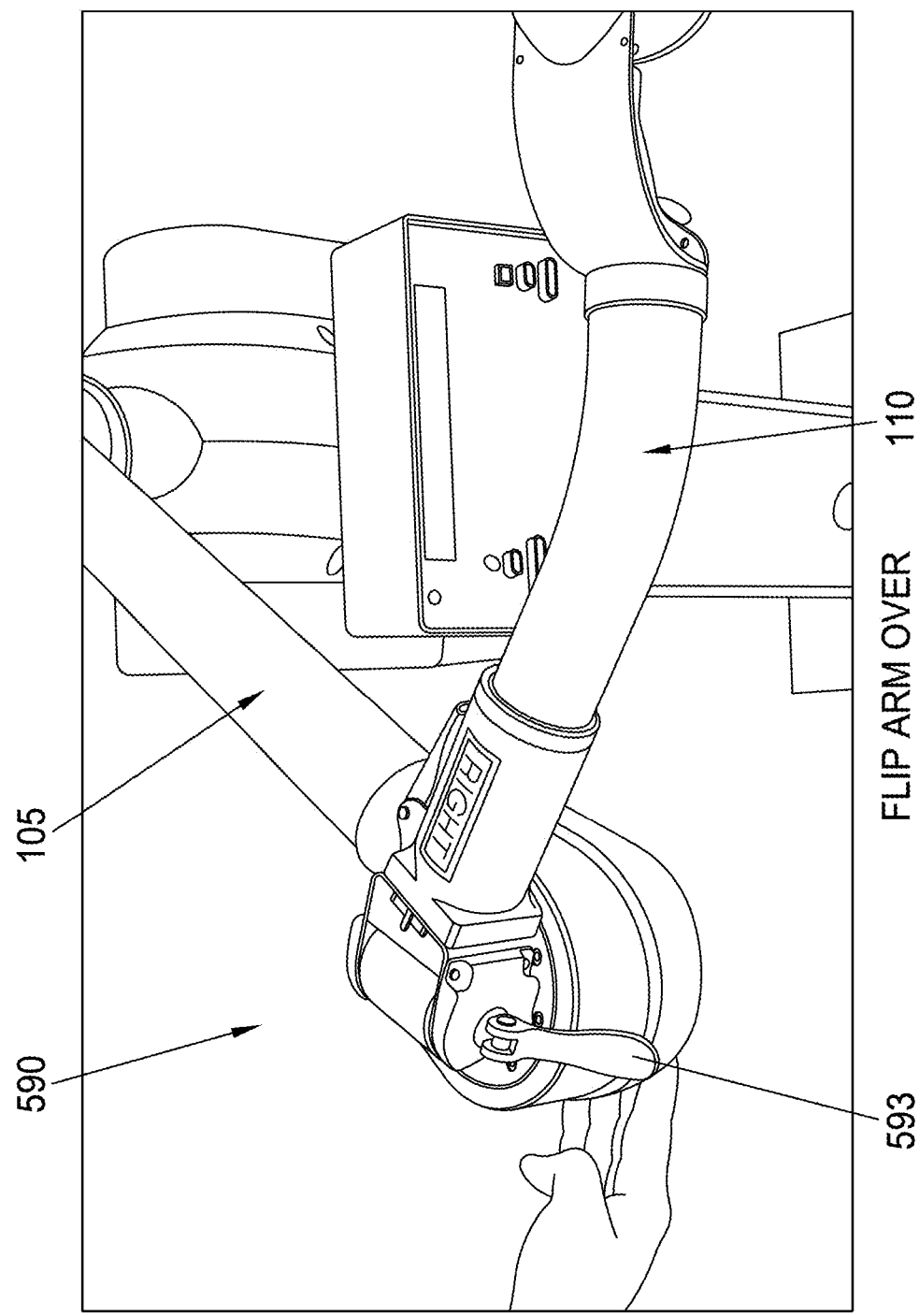
Figure 23:
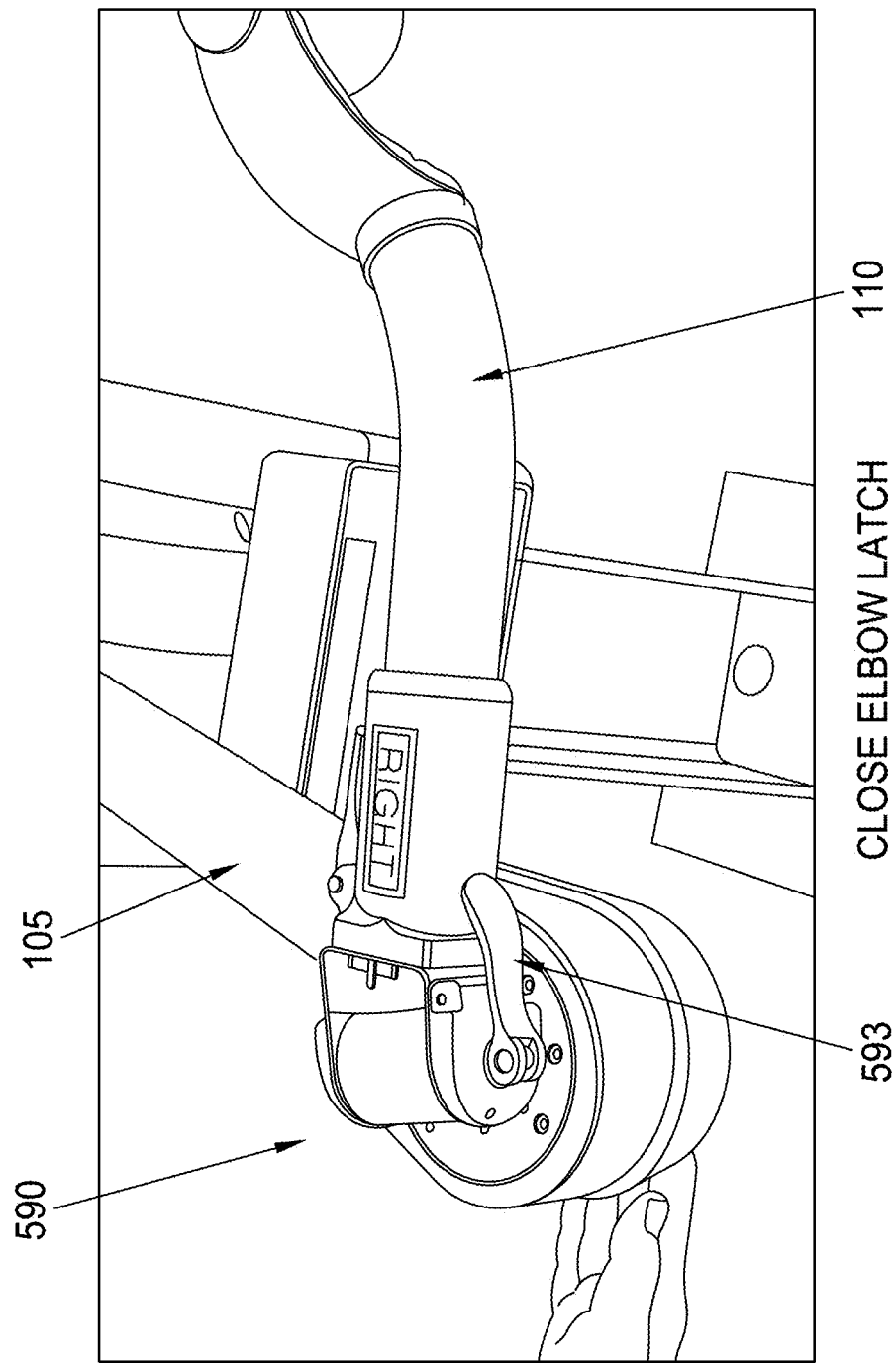
Figure 24:
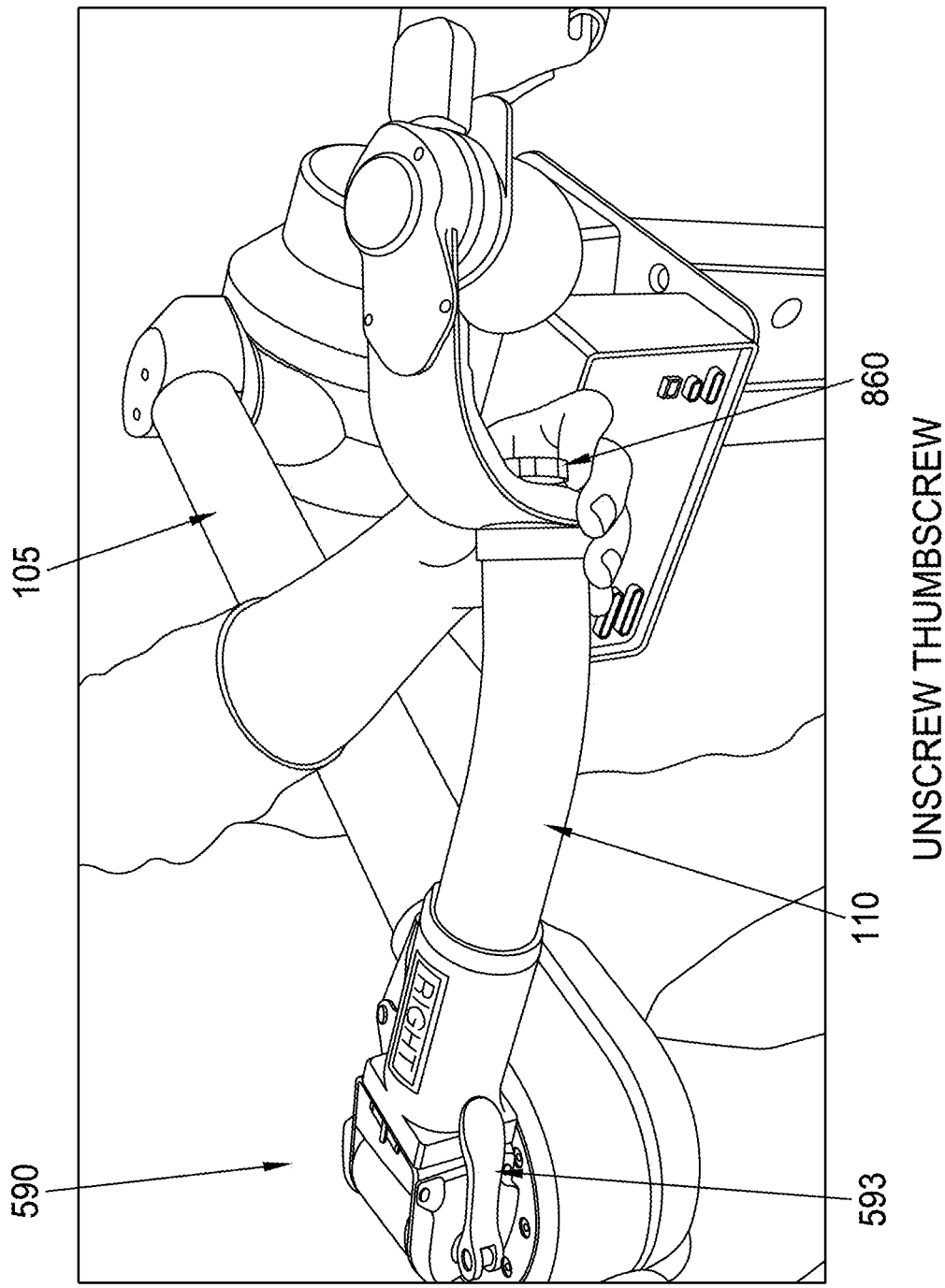
Figure 25:
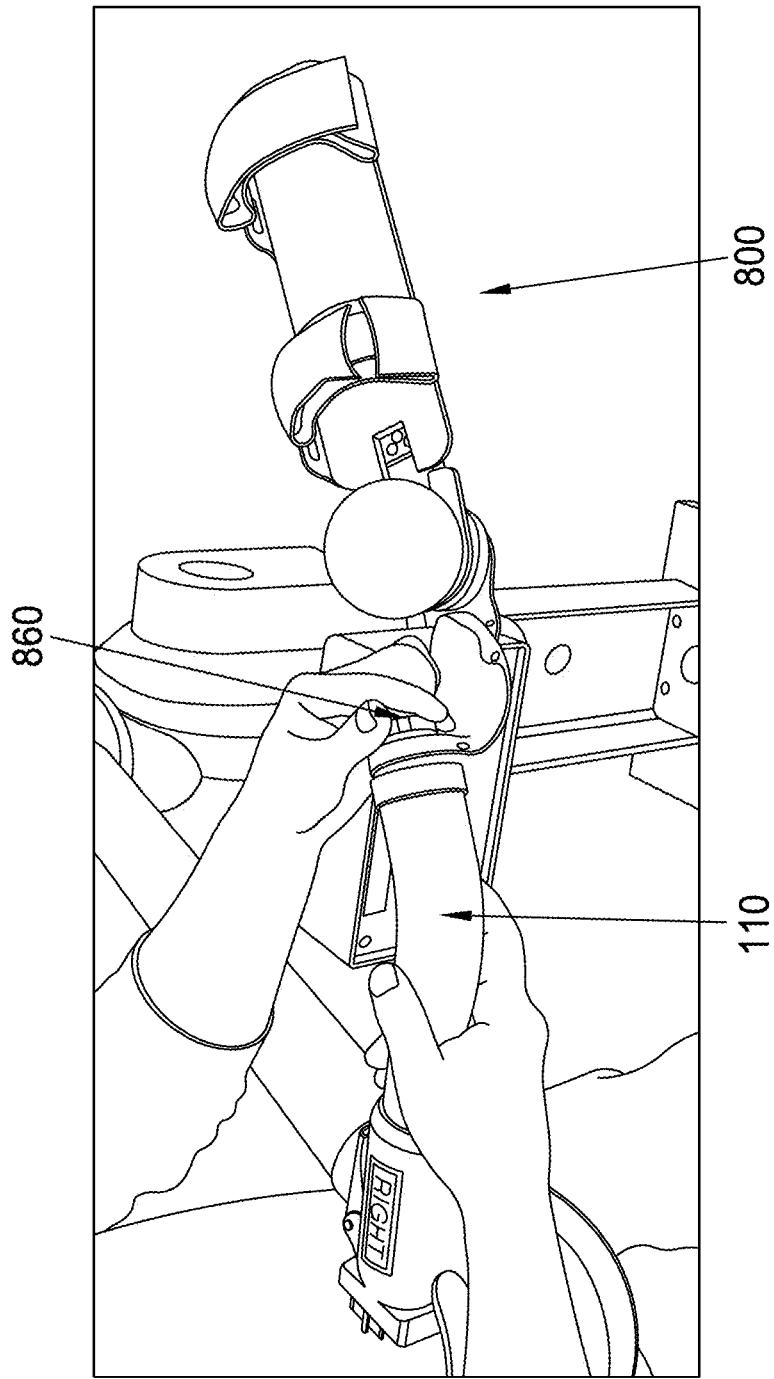
Figure 26:
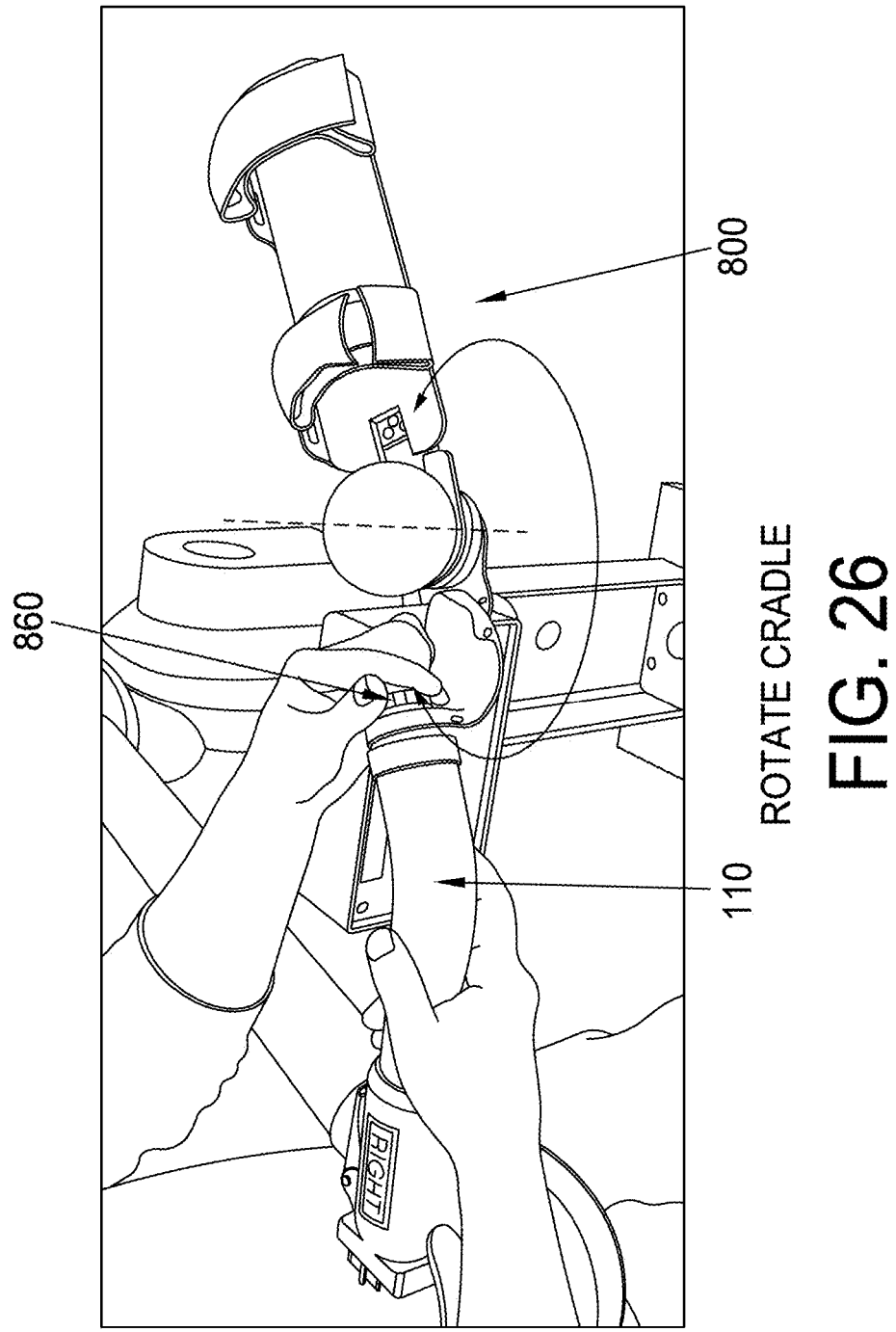

Another aspect of the present invention is the ability to provide a flexible connection between a forearm support (e.g., cradle 805) and the rest of the endpoint device. In this way the endpoint device is able to support the weight of the arm, but allows the user to outstretch their arm without uncomfortable pressure from the rear strap 810. By way of example but not limitation, and looking now at FIG. 20, there is shown a cradle endpoint 800 that comprises a leaf spring 850 which enables flexibility and allows a user's arm to lift up during certain three-dimensional motions. Hard stops 855 support the weight of the user's arm when the cradle is perpendicular to yaw axis 830.

C. Adjustable Pitch Angle

Another aspect of the present invention is the provision of an adjustable pitch angle that: 1) enables left-hand to right-hand switching, and 2) enables small angular adjustments depending on user size, the workspace of interest, and the type of exercise. By way of example but not limitation, and looking now at FIG. 20, it will be seen that a pitch angle adjustment knob 860 may allow the configuration of first portion 835 to be adjusted relative to outer link 110. It should be appreciated that first portion 835 can be connected to outer link 110 using other clamping mechanisms that permit left-hand to right-hand switching and small angular adjustments. By way of example but not limitation, adjustment knob 860 may be replaced with a cam-lever lock.

D. Off-Axis Rotatable Hand Support

Still another aspect of the present invention is the provision of an off-axis-rotatable hand grip (e.g., ball grip) that enhances comfort while allowing for different hand sizes. By way of example but not limitation, and looking now at FIG. 20, ball grip 820 can be rotated about yaw axis 830. Note that in this form of the invention, the mounting shaft 865 for ball grip 820 is disposed "off-axis" from the center of ball grip 820. This "off-axis" mounting allows the ball grip to be rotated manually for comfort—for a small hand, the ball grip can be rotated so that the bulk of the ball grip (i.e., the fatter section) is oriented away from the palm of the user, while for a larger hand, the ball grip can be rotated so that the bulk of the ball grip is oriented towards the palm of the user.

E. Hand-Presence Sensing

Another feature of the present invention is the inclusion of an electronic hand-presence sensing system. More particularly, in one preferred form of the invention, a capacitive sensing system is provided which detects the presence of the user's limb on the endpoint device and signals the robotic device that a person's limb is (or is not) present on the endpoint device. This is a safety and functionality feature and is particularly important for some endpoint devices, e.g., ball endpoint 800B (FIG. 17) in which the user's arm is not necessarily strapped to the endpoint—if the user lets go of the endpoint device, the capacitive sensing system detects this and the robotic device can pause ("soft-stop"). Even in the case where straps are used, the patient may still slip off of the device. Once the user re-engages the endpoint device (e.g., grabs the ball grip again), the capacitive sensing system detects this and the robotic device continues working.

The status of the presence of the user is preferably made clear to the patient and therapist immediately by lighting up ball grip 820 (or another status light, not shown, provided on the endpoint device or elsewhere on robotic device 5) in one of several colors to report status, such as green when the patient engages the device and the device is active, or yellow to indicate that the system is ready to go and awaiting the patient or user. The system may also use audible sounds to help identify or confirm the status of the presence of the user.

By way of example but not limitation, cradle endpoint 800 may have its ball grip 820 configured with a capacitive sensing system which communicates with onboard controller 596 of robotic device 5. Such capacitive sensing systems are well known in the sensor art and are easily adaptable to ball grip 820. In accordance with the present invention, when the user grips ball grip 820, the capacitive sensing system associated with ball grip 820 detects user engagement and advises onboard controller 596 of robotic device 5 that the user is engaged with the endpoint device. Robotic device 5 may then proceed with the therapeutic regime programmed into onboard controller 596 of robotic device 5. However, if the user lets go of ball grip 820, the capacitive sensing system associated with ball grip 820 detects user disengagement and advises onboard controller 596 of robotic device 5 that the user is no longer engaged with the endpoint device. Robotic device 5 may then suspend the therapeutic regime programmed into onboard controller 596 of robotic device 5.

F. Modular Endpoint

Another aspect of the present invention is the ability to easily "swap out" different endpoints on robotic device 5 and to have electrical connections occur automatically when the mechanical connection between the new endpoint and the robotic device is made. In one preferred form of the invention, this is accomplished with a mechanical latch (e.g., a mechanical latch such as one manufactured by SouthCo of Concordville, Pennsylvania), custom-designed nested tubes, and a floating electrical connector system (e.g., a "Molex Mini-Fit Blindmate" system such as one manufactured by Molex of Lisle, Illinois) which together provide mechanical and electrical connections which are able to account for mechanical misalignment without stressing the electrical connections.

G. Endpoint-Presence Sensing

In one preferred form of the invention, a mechanical switch is provided on robotic device 5 that detects the presence (or absence) of an endpoint device. Alternatively, an electrical switch may also be provided to detect the presence (or absence) of an endpoint device. Such mechanical and electrical switches are well known in the sensor art and are easily adaptable to the portion of robotic device 5, which receives outer link 110 of the endpoint devices. Endpoint-presence sensing is important for system safety—if the endpoint should become disconnected from robotic device 5 during operation of robotic device 5, the robotic device 5 can go into a safe ("motionless") mode until the endpoint is re-attached (or another endpoint is attached in its place).

H. Endpoint-Type Sensing

An important aspect of the modularity of the endpoints is that robotic device 5 is configured so that it can automatically sense and recognize the type of endpoint that is installed on the robotic device. This allows robotic device 5 to automatically adjust its operating parameters according to the particular endpoint which is mounted to the robotic device, e.g., it allows robotic device 5 to adjust various operating parameters such as the kinematics related to endpoint location, gravity-assist calculations (see below), etc. By way of example but not limitation, outer link 110 of each endpoint can comprise an encoded element representative of the type of endpoint and the portion of robotic device 5 which receives outer link 110 can comprise a reader element—when an endpoint is mounted to robotic device 5, the reader element on robotic device 5 reads the encoded element on the mounted endpoint and the reader element appropriately advises onboard controller 596 for robotic device 5.

I. Gravity Compensation Algorithms

In one preferred form of the invention, gravity compensation means are provided to make the user's limb feel weightless. This is done by applying an upward bias to the endpoint device which can offset the weight of the user's limb, thereby effectively rendering the user's limb "weightless". Such gravity compensation may be achieved by having onboard controller 596 read the torque levels on motors 500 and 565 when a user's limb is engaging the endpoint device and then energizing motors 500 and 565 so as to apply an offsetting torque to the motors, whereby to offset the weight of the user's limb. Gravity compensation is important inasmuch as it allows a user to use the system for extended periods of time without tiring. However, this can be complex inasmuch as the weight of different people's limbs are different and because the weight of a single person's limb changes as he/she moves the limb to different locations and activates/adjusts different muscle groups. To this end, the gravity compensation means of the present invention includes various apparatus/algorithms/procedures which involve:

1) strapping a user's limb to an endpoint device, having the user move the endpoint of their limb to a predetermined number of points, relaxing at each point, and having the robotic device record the motor-torques (e.g., the loads imposed on motors 500 and 565) at each point;
2) taking the data as described in step 1) above from multiple users and taking an average of the data;
3) taking the data as described in step 1) above from multiple users and creating different user profiles based on body/limb size;
4) using the results of the above steps to create an easily-adjustable gain factor that increases and decreases the gravity-assistance forces provided by robotic device 5 so as to render the user's limb substantially weightless as it moves through a prescribed physical therapy regime; and
5) using the results of the above steps so that a new user (with no calibration record) needs to relax his/her limb in only a small set of data points (e.g., 1 to 5 data points) and the system then maps that user to a useful gravity-compensation profile using the reduced set of data points.

Note that onboard controller 596 may be configured to compensate for the effects of gravity when the endpoint device is engaged by a limb of a user in a single step, or onboard controller 596 may be configured to compensate for the effects of gravity in a series of incremental steps. This latter approach can be advantageous in some circumstances since the gradual application of gravity compensation avoids any surprise to the user. Note also that onboard controller 596 can apply the gravity compensation automatically or onboard controller 596 can apply the gravity compensation under the guidance of an operator (e.g., a therapist).

J. Changing Handedness

Robotic device 5 is configured so that it has the ability to easily flip from a right-hand to a left-hand configuration, e.g., using a cam-latch (similar to those found on front bicycle wheels) such as the aforementioned cam-latch 594 which allows outer link 110 of a given endpoint device to be quickly and easily attached to/detached from the remainder of robotic device 5. Furthermore, robotic device 5 has knowledge of the "handedness" of a given endpoint device due to the aforementioned automatic endpoint sensing switches. This allows robotic device 5 to automatically alter the software in its onboard controller 596 to account for the different kinematics of different endpoint devices. The various endpoint devices have been designed to accommodate this flipping and can be used in both right-hand and left-hand configurations.

To change from left-handed use to right-handed use, or vice versa, requires three 180-degree flips about three axes.

By way of example but not limitation, and looking now at FIGS. 21-26, the process of changing from left-handed use to right-handed use will now be described. First, lever 593 is released (FIG. 21) to unclamp the extra joint located near the elbow joint J3. This action allows the entire arm beyond the elbow of the device to be flipped 180 degrees (FIG. 22), then that freedom is re-secured (FIG. 23) using lever 593. Next, there is a second 180-degree flip (FIGS. 24 and FIG. 25) by loosening, flipping and then tightening the clamping mechanism connecting cradle 805 and ball grip 820 to outer link 110 (e.g., thumbscrew 860). Finally, there is the last 180-degree flip (FIG. 26) where the cradle is rotated 180 degrees. Note that there is no mechanical lock for this last flip because the rotation of this joint is passive.

To change back from right-handed use to left-handed use, the flips are performed in the same order, but reversing the directions of the flips.

It is important to note that when the hand grip used with the endpoint device is not a symmetrical shape, or when mounting shaft 865 for ball grip 820 is disposed "off-axis" from the center of ball grip 820 (FIG. 20), then the hand grip must also be rotated 180 degrees along the yaw axis when changing from left-handed use to right-handed use. Preferably, the hand grip is mounted to the endpoint device through a magnetic connection so as to enable the hand grip to be rotated relative to the remainder of the endpoint device and/or to enable one hand grip to be swapped out for another hand grip.

Accommodating Pronation/Supination of the Forearm/Wrist

In some situations it may be important to allow pronation/supination of the user's forearm/wrist while the user's forearm is strapped to cradle 805. Pronation/supination is the twist/rotation of the wrist about the longitudinal axis of the forearm.

Figure 27:
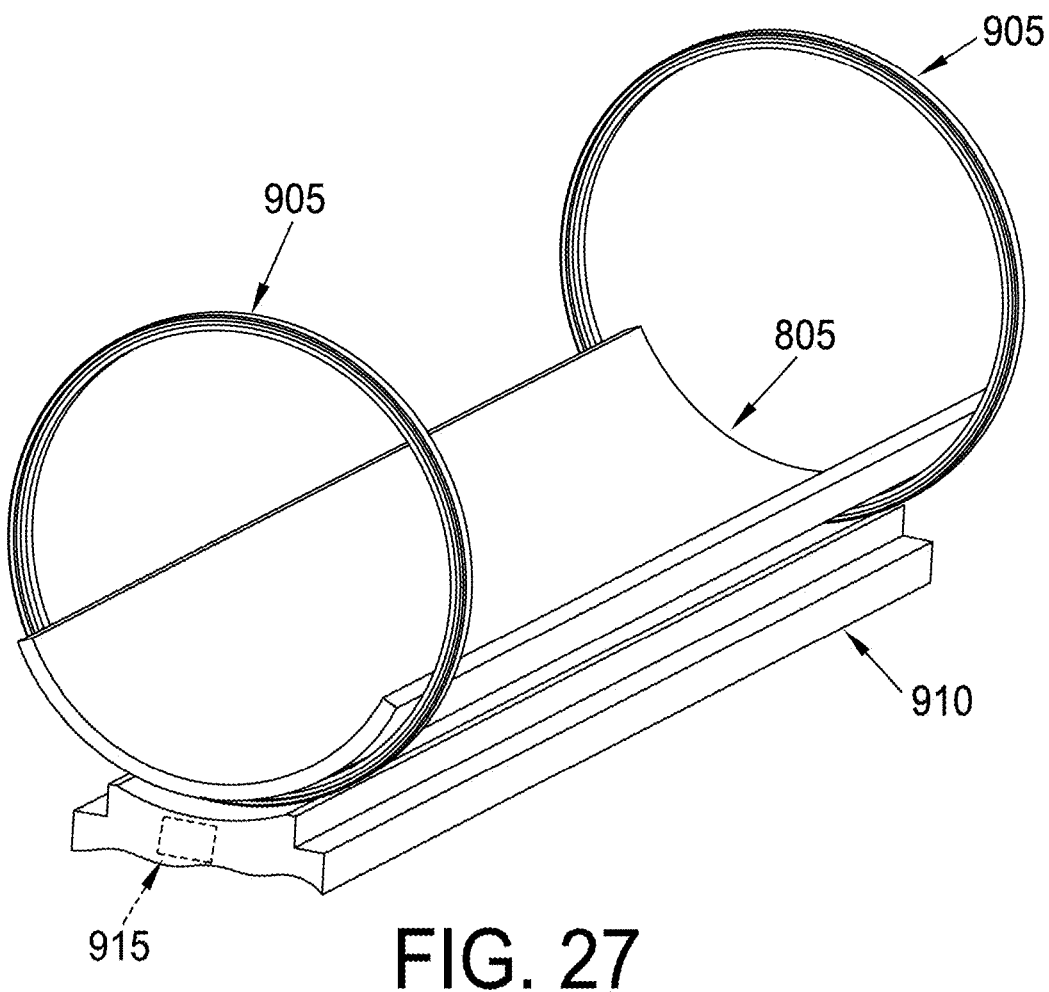
FIGS. 27-29 are schematic views showing still another construction for an endpoint device.
Figure 28:
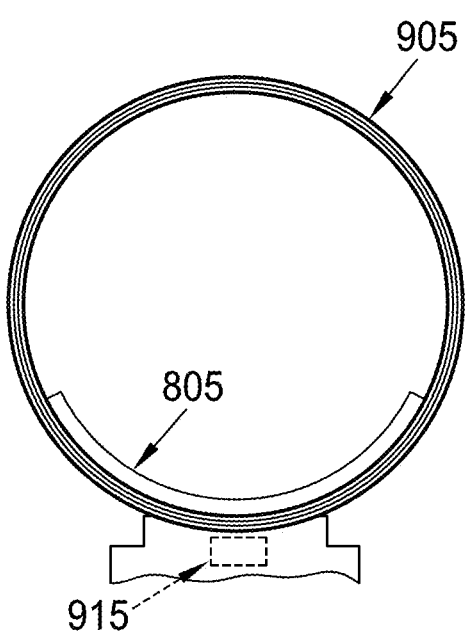
Figure 29:
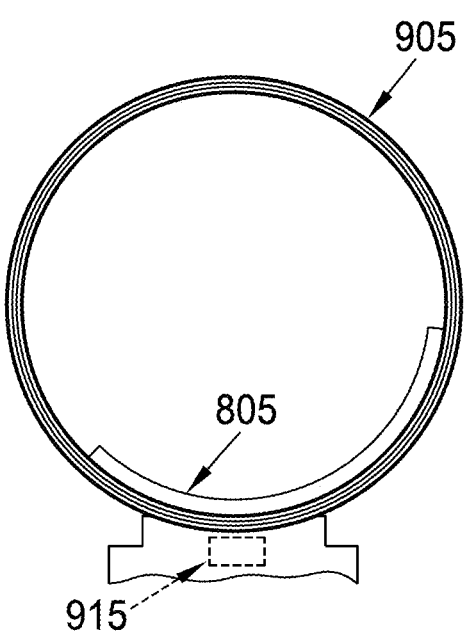

To that end, in one form of the invention, and looking now at FIGS. 27-29, a pair of Kaydon-style ring bearings 905 are used to support cradle 805 above a cradle support 910 (not shown in FIGS. 27-29), which is in turn connected to outer link 110 (not shown in FIGS. 27-29). Kaydon-style ring bearings 905 are large enough (e.g., 150 mm) to accommodate pronation/supination of the forearm/wrist of the 95th-percentile male hand and arm while the user's forearm is strapped to cradle 805. An encoder 915 is used to track user position and communicate the same to onboard controller 956 of robotic device 5.

Alternatively, other arcuate bearings of the sort well known in the bearing art may also be used.

However, the use of such Kaydon-style ring bearings and other arcuate bearings can increase the cost of the endpoint device.

Figure 30:
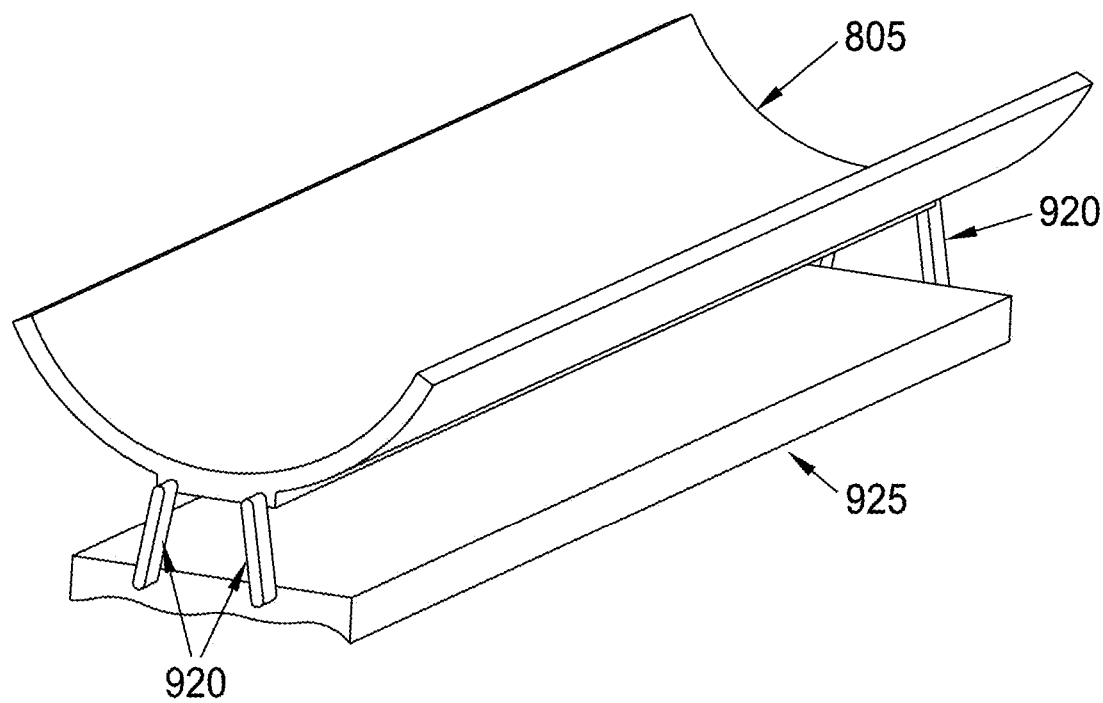
FIGS. 30-32 are schematic views showing still another construction for an endpoint device.
Figures 31, 32:
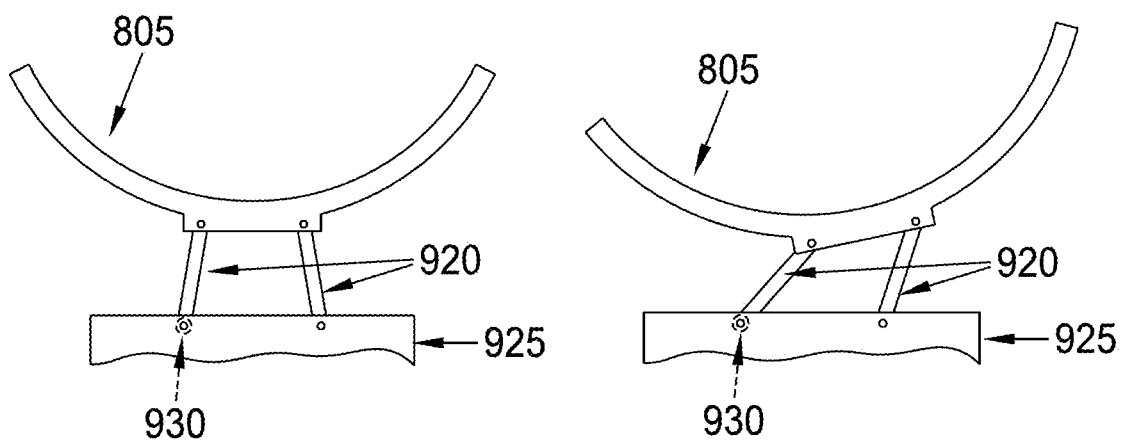

Therefore, in another preferred embodiment of the present invention, and looking now at FIGS. 30-32, a 4-bar linkage 920 is used to support cradle 805 above a cradle support 925, with cradle support 925 being connected to connector 815 (not shown in FIGS. 30-32), which is in turn connected to outer link 110 (not shown in FIGS. 30-32). Cradle support 925 and linkage 920 are located beneath the cradle, completely hidden from the view of the user. This approach enables about 90 degrees of wrist pronation/supination and lowers fabrication costs by avoiding the use of ring bearings. Also, with this approach, the patient or user can more easily get into and out of the endpoint device. Furthermore, there is no limitation on the size of the user's hand and forearm as there might be the case with the ring bearings. An encoder 930 is used to track user position and communicate the same to onboard controller 956 of robotic device 5.

A Motorized Endpoint Enabling Wrist Pronation and Supination on an Upper-Extremity of a User In the foregoing sections, robotic device 5 was described as having a coupling element 115 for coupling outer link 110 to a patient, commonly to a limb of a patient, with outer link 110 being detachably connected to the remainder of the robotic device at the aforementioned mechanism 590 (FIGS. 6 and 7), e.g., via latch 594 (FIG. 7). Coupling element 115 and outer link 110 can be thought of as together constituting a user interface endpoint device (i.e., an "endpoint") for robotic device 5, i.e., the portion of robotic device 5 that physically contacts the patient.

Various embodiments of cradle endpoints (e.g., cradle endpoint 800, cradle endpoint with actuated or spring-based hand-grip assist 800C, etc.) have been previously described in the foregoing sections. These previously-described cradle endpoints generally comprise a padded cradle 805 for receiving and supporting a limb (e.g., the forearm) of a patient, straps 810 for securing the limb to cradle 805, a connector 815 for connecting cradle 805 to outer link 110, a hand grip (e.g., ball grip 820) for gripping by the patient (e.g., by the hand of the patient), and multiple passive and manually-lockable degrees-of-freedom for making adjustments and for enabling a large range-of-motion. Each of the previously-described cradle endpoints are designed to be swapped in and out of robotic device 5 so as to allow patients with different size limbs, with different functional capabilities, and different therapeutic goals, to use robotic device 5. Furthermore, each of the hand grips provided with the various embodiments of endpoints are designed to be swapped in and out of the endpoint so as to allow patients with different size limbs, with different functional capabilities, and different therapeutic goals, to use robotic device 5.

In the following section, and looking now at FIGS. 33-35, a modular endpoint 1000 for connection to robotic device 5 is shown and described. Endpoint 1000 is similar to the endpoints previously described in that endpoint 1000 passively provides a user with the ability to move its limb along multiple degrees of freedom (e.g., along a yaw axis), as will be discussed in further detail below. However, endpoint 1000 also provides a user with the ability to move its limb along an additional, and preferably powered, degree-of-freedom (e.g., along a roll axis which is coaxial with a user's wrist pronation/supination axis), whereby to enable passive and active pronation and supination of the wrist of a user. Furthermore, like the previously-described endpoints, endpoint 1000 is also designed to be swapped in and out of robotic device 5 so as to allow patients with different functional capabilities, and different therapeutic goals, to use robotic device 5, as will also be discussed in further detail below.

Endpoint 1000 generally comprises a cradle 1005 for receiving a limb (e.g., the forearm) of a patient, straps 1010 passing through slots 1012 for securing the limb to cradle 1005, a connector 1015 for connecting cradle 1005 to outer link 110, and the aforementioned outer link 110. Cradle endpoint 1000 preferably also comprises a stick grip 1020 for gripping by the patient (e.g., by the hand of a patient). If desired, a cushioned foam pad (not shown in FIGS. 33-35) may be positioned on cradle 1005 in order to provide a more comfortable surface for receiving the forearm of the user.

Cradle 1005 and stick grip 1020 are configured to move along a first yaw axis 1030 and a second yaw axis 1033, whereby to permit a limb of a user to swivel from left and right (i.e., along the flexion/extension axis of the wrist). Note that connector 1015 comprises a first portion 1035 for connection to outer link 110, and a second portion 1040 for connection to cradle 1005 and stick grip 1020. Preferably, a leaf spring 1050 is provided between cradle 1005 and second portion 1040, whereby to enable flexibility and allow a patient's arm to lift up during certain three-dimensional motions.

Another aspect of the present invention is the provision of a mechanism for permitting the pitch angle of cradle 1005 and connector 1015 to be adjusted along pitch axis 1045 relative to outer link 110, whereby to 1) enable left-hand to right-hand switching, and 2) enable small angular adjustments depending on user size, the workspace of interest, and the type of exercise. By way of example but not limitation, a cam-lever 1060 may be provided to allow the angular disposition of first portion 1035 to be adjusted relative to outer link 110. Cam-lever 1060 may be released to unlock first portion 1035 from outer link 110, whereby first portion 1035 can be adjusted (e.g., rotated about pitch axis 1045) relative to outer link 110, and then cam-lever 1060 may be re-locked once first portion 1035 is in the desired angular position.

As stated above, a unique feature of endpoint 1000 is the provision of an additional degree of freedom along a roll axis, whereby to enable passive and active pronation and supination of the wrist of a user. In order to provide this additional degree of freedom, stick grip 1020 is mounted to a rotatable plate 1065. Rotatable plate 1065 is free to rotate under the influence of a user's own power, however, rotatable plate 1065 is also configured to be rotated by an electric motor 1070 contained within a motor housing 1075 and connected to rotatable plate 1065. When actuated, motor 1070 rotates rotatable plate 1065 and stick grip 1020 along roll axis 1080, whereby to pronate and supinate the wrist of a user gripping stick grip 1020. Preferably, a geared transmission is provided within motor housing 1075 for reducing the speed of motor 1070 to rotatable plate 1065. If desired, motor housing 1075 can include a protective cover 1085 for protecting the user and/or healthcare professionals from the heat of the motor contained in motor housing 1075. Furthermore, if desired, a protective shield 1090 may be disposed around stick grip 1020 for covering potential finger pinch points as stick grip 1020 is rotated along roll axis 1080. Protective shield 1090 is preferably connected to rotatable plate 1065 so that protective shield 1090 rotates with rotatable sheath 1065 and stick grip 1020 as rotatable sheath 1065 and stick grip 1020 rotate.

In an additional embodiment of the present invention, a second motor (not shown) may be provided to enable powered movement of stick grip 1020 along second yaw axis 1033, whereby to provide powered movement (i.e., flexion and extension) of a wrist along second yaw axis 1033. Powered movement along second yaw axis 1033 can be beneficial to users who are unable to swivel their wrist from left to right under their own power due to a physical impairment.

As was discussed above in connection with the previously-discussed endpoints, endpoint 1000 can be easily "swapped out" for different endpoints on robotic device 5, with the electrical connections occurring automatically when the mechanical connection between the new endpoint and robotic device 5 is made. To this end, it is noted that mechanical and electrical connections between endpoint 1000 and robotic device 5 are made with a quick connect-disconnect mechanism 1100. Quick connect-disconnect mechanism 1100 comprises a mechanical fitting 1105 and an electrical port 1110 which together mechanically and electrically connect outer link 110 to coupling element 115 of robotic device 5. A threaded ring 1115 may be used to further secure mechanical fitting 1105 (and thus outer link 110) to coupling element 115.

Figure 33:
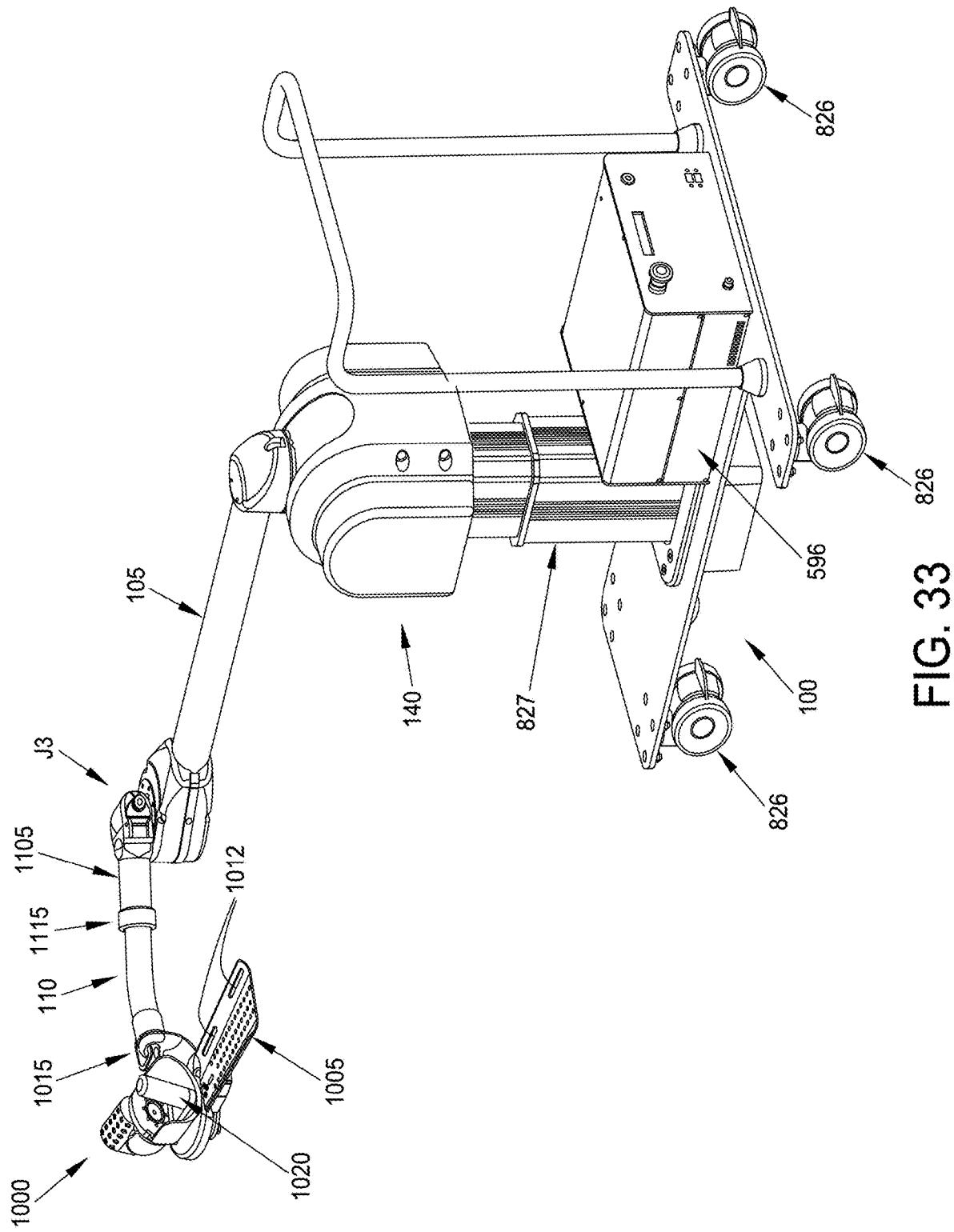
FIGS. 33 and 34 are schematic views showing another preferred endpoint device for the robotic device of the present invention.
Figure 34:
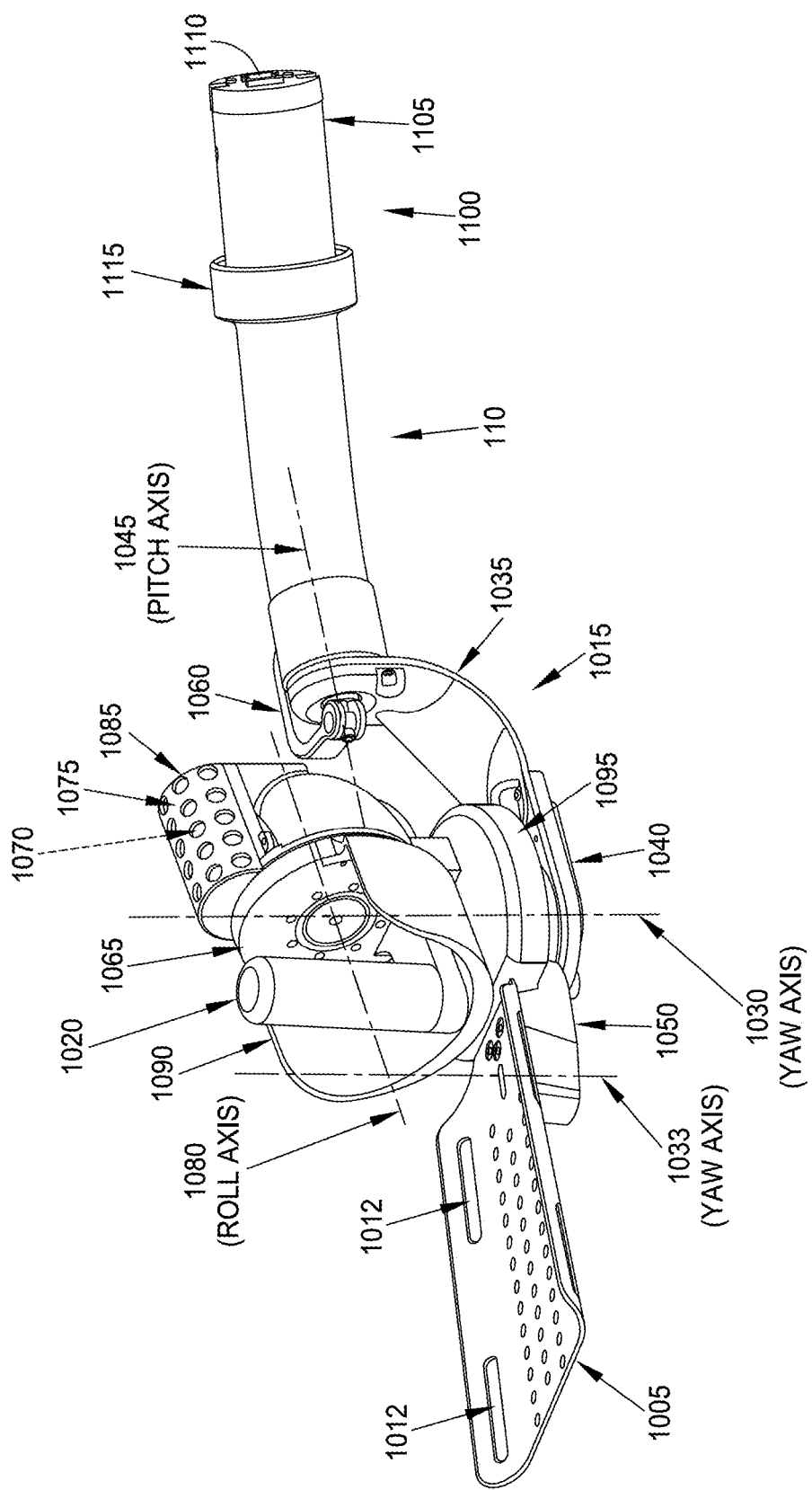
Figure 35:
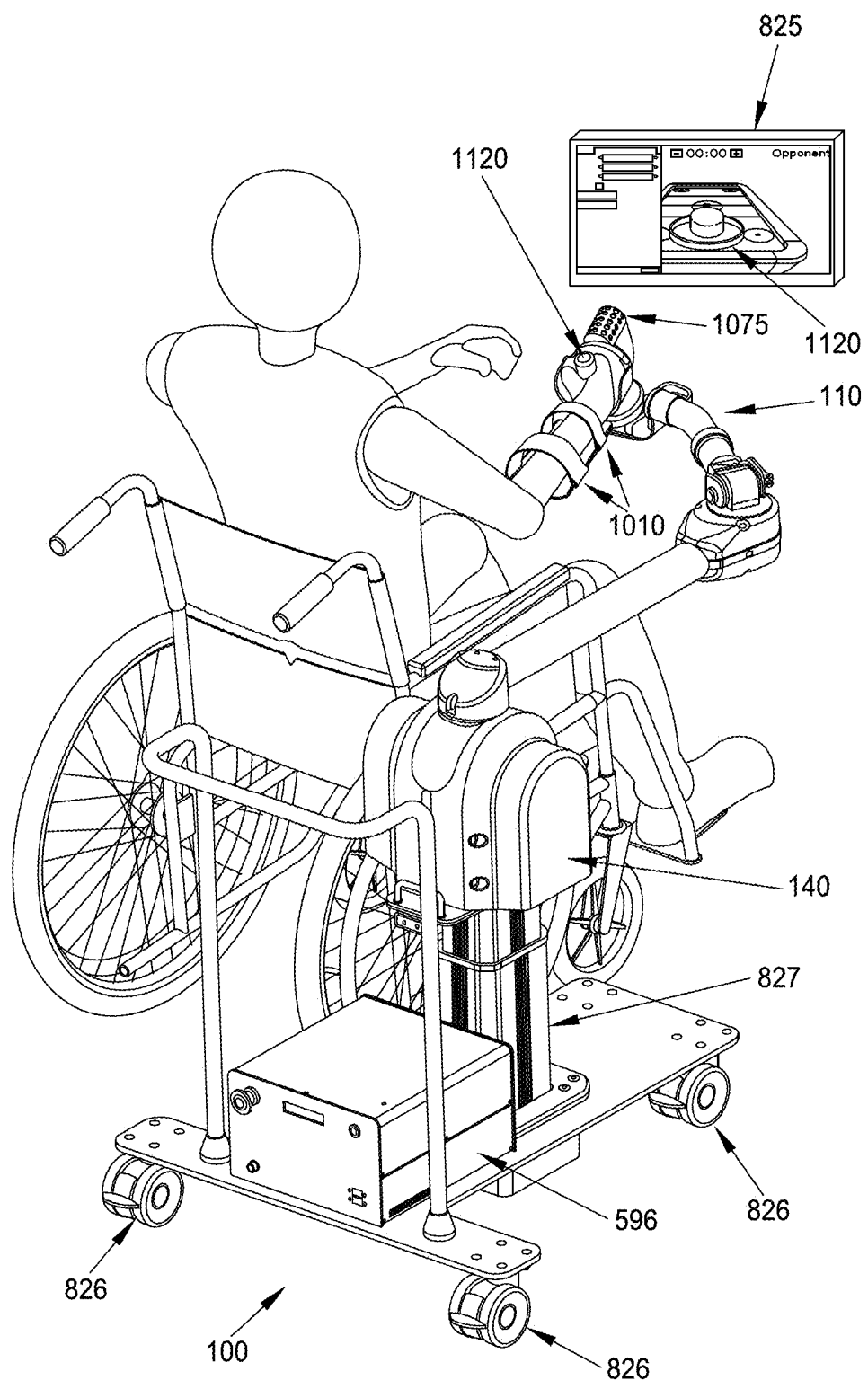
FIG. 35 is a schematic view showing the endpoint device of FIGS. 33 and 34 being used by a patient in a sitting position.

Note that in FIGS. 33 and 35, robotic system 5 is shown mounted to a movable base 100, i.e., a base 100 which is mounted on wheels (or casters) 826 which may be free-wheeling or driven by onboard controller 596 (which may be contained in its own housing, e.g., in the manner shown in FIGS. 33 and 35).

Note also that in this form of the invention, U-shaped frame 140 may be supported above base 100 via a telescoping assembly 827 which allows the height of U-shaped frame 140 (and hence the height of the robotic arm) to be adjusted relative to base 100. This feature is highly advantageous, since it facilitates the use of robotic device 5 with patients who are both sitting (FIG. 35) and standing. This height adjustment is also important for people of different heights and for different wheelchair types. By way of example but not limitation, lower-functioning patients who are wheelchair-bound can use the device near the lower end of the vertical travel. Higher-functioning patients who are re-learning to amble can use the device near the upper end of the vertical travel and engage with exercises that gently challenge balance, e.g., in an enjoyable game atmosphere.

Of course, the vertical height adjustment could be done by other means well known in the art, such as a manual foot-pumping hydraulic lift.

As noted above, robotic device 5 is specifically configured so that it has the ability to easily flip from a right-hand to a left-hand configuration, e.g., using a cam-latch (similar to those found on bicycle wheels) such as the aforementioned cam-latch 594 which allows outer link 110 of a given endpoint device to be quickly and easily attached to/detached from the remainder of robotic device 5. Furthermore, robotic device 5 has knowledge of the "handedness" of a given endpoint device due to the aforementioned automatic endpoint sensing switches. This allows robotic device 5 to automatically alter the software in its onboard controller 596 to account for the different kinematics of different endpoint devices. The various endpoint devices have been designed to accommodate this flipping and can be used in both right-hand and left-hand configurations.

To change endpoint 1000 from left-handed use to right-handed use, or vice versa, requires three 180-degree flips about three axes.

By way of example but not limitation, the process of changing endpoint 1000 from left-handed use to right-handed use will now be described. First, the clamping mechanism connecting outer link 110 to inner link 105 (e.g., lever 593 shown in FIG. 21) is released to unclamp outer link 110 from the extra joint located near the elbow joint J3. This action allows the entire arm beyond the elbow of the device (i.e., outer link 110) to be flipped 180 degrees, then that freedom is re-secured using the clamping mechanism (e.g., lever 593). Next, there is a second 180-degree flip by loosening, flipping and then tightening the clamping mechanism connecting cradle 1005 and stick grip 1020 to outer link 110 (e.g., cam-lever 1060). Finally, there is a third 180-degree flip where the cradle is rotated 180 degrees along yaw axis 1030. Note that there is no mechanical lock for this last flip because the rotation of this joint is passive.

To change back from right-handed use to left-handed use, the flips are performed in the same order, but reversing the directions of the flips.

In use, endpoint 1000 is mechanically and electrically connected to robotic device 5 by connecting mechanical fitting 1105 and electrical port 1110 of outer link 110 to tubular member 595 (FIG. 7) and tightening threaded ring 1115 to secure mechanical fitting 1105 (and thus outer link 110) to robotic device 5. Then cam-lever 1060 is released to unlock first portion 1035 of connector 1015 from outer link 110, and first portion 1035 of connector 1015 is adjusted about pitch-axis 1045 for handedness and angular positioning. Once first portion 1035 is in the desired angular position, cam-lever 1060 is relocked. Then the user rests their forearm on cradle 1005, and grips stick grip 1020 with their hand. Straps 1010 may then be used to secure the user's arm to cradle 1005. Robotic device 5 is then be used for rehabilitation and evaluation of the upper extremities of the patient, with endpoint 1000 adding an additional powered degree-of-freedom that enables active and passive pronation and supination of the user's wrist. By way of example but not limitation, moving stick grip 1020 provides the input necessary to effect changes in a virtual setting on a display screen (e.g., moving stick grip 1020 may increase the amount of water cascading in a waterfall). By way of further example but not limitation, the position of a virtual on-screen object 1120 can be controlled by the user moving stick grip 1020 of endpoint 1000 of robotic device 5.

Hand-Presence Sensing System and Force-Sensing System

In one preferred form of the invention, stick grip 1020 may be provided with an electronic hand-presence sensing system. More particularly, a capacitive sensing system is provided which detects the presence of the user's limb on stick grip 1020 and signals the robotic device that a person's limb is (or is not) present on stick grip 1020. By way of example but not limitation, endpoint 1000 may have its stick grip 1020 configured with a capacitive sensing system which communicates with onboard controller 596 of robotic device 5. Such capacitive sensing systems are well known in the sensor art and are easily adaptable to stick grip 1020. In accordance with the present invention, when the user grips stick grip 1020, the capacitive sensing system associated with stick grip 1020 detects user engagement and advises onboard controller 596 of robotic device 5 that the user is engaged with the endpoint device. Robotic device 5 may then proceed with the therapeutic regime programmed into onboard controller 596 of robotic device 5. However, if the user lets go of stick grip 1020, the capacitive sensing system associated with stick grip 1020 detects user disengagement and advises onboard controller 596 of robotic device 5 that the user is no longer engaged with the endpoint device.

Robotic device 5 may then suspend the therapeutic regime programmed into onboard controller 596 of robotic device 5.

In another form of the invention, stick grip 1020 may also, or alternatively, be provided with an electronic force sensing system. More particularly, a force sensing system may be provided to detect the force of the grip of the user's hand on stick grip 1020 and signal to the robotic device how much force the user's hand is providing to stick grip 1020.

The hand-presence sensing system and the force sensing system described above with respect to stick grip 1020 may also be implemented in any of the hand grips used with the previously-described endpoints (e.g., ball grip 820, ball grip 820B, actuated or spring-biased hand-grip 820C, etc.).

Modifications to Endpoint 1000 to Provide Clearance for a Wrist During Pronation and Supination of the Wrist If desired, a contoured foam pad (not shown) could be positioned on cradle 1005 so as to provide a space under the wrist of the user which would allow the user to pronate and/or supinate their wrist without their wrist rubbing against the foam pad.

Furthermore, if desired, one or more of straps 1010 may be omitted so that the wrist has more freedom to rotate (i.e., pronate and supinate).

Figure 36:
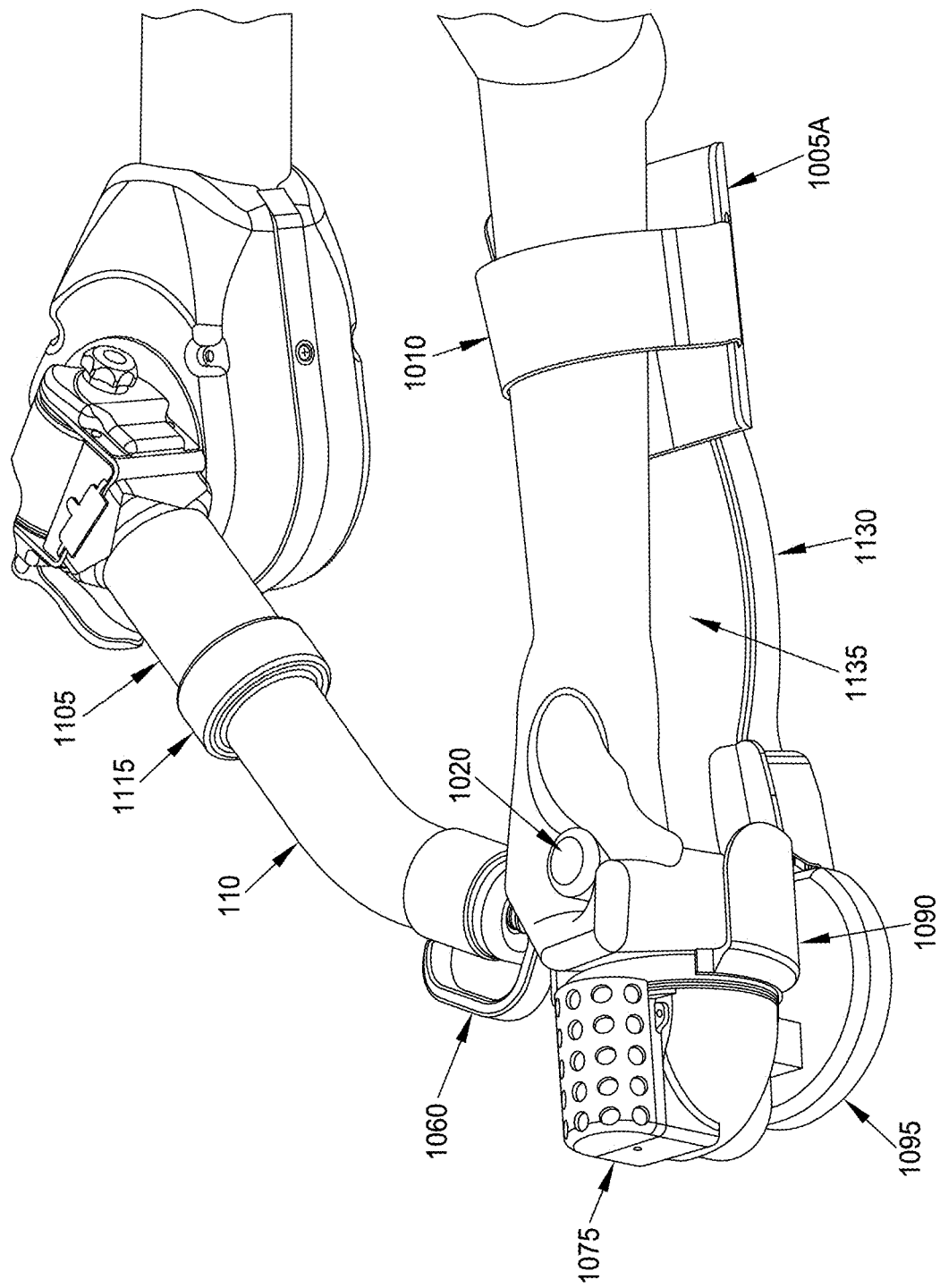
FIGS. 36 and 37 are schematic views showing an alternative cradle that can be used with an endpoint device of the robotic device of the present invention.
Figure 37:
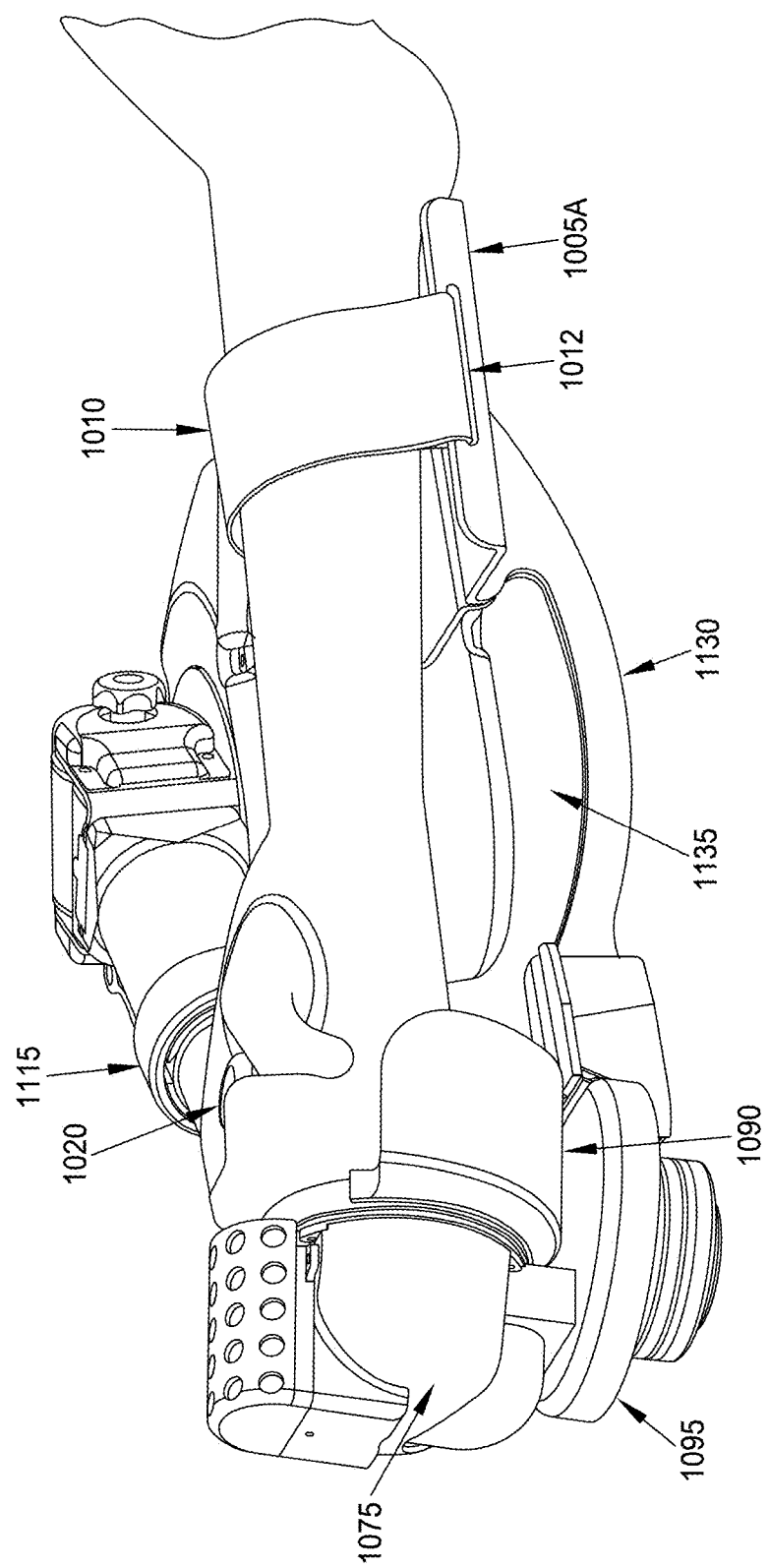

In another embodiment of the present invention, and looking now at FIGS. 36 and 37, an alternative cradle 1005A is shown and described. In this embodiment, cradle 1005A is connected to stick grip 1020 with a support bar 1130. Support bar 1130 is curved so that when an arm of a user is placed on cradle 1005A and the hand of the user is gripping stick grip 1020, a space 1135 is provided under the wrist of the user which will allow the user to pronate and/or supinate along roll axis 1080 without interference from cradle 1005A (and/or a foam pad positioned on cradle 1005A).

Angled Handlebar Grip

Figure 38:
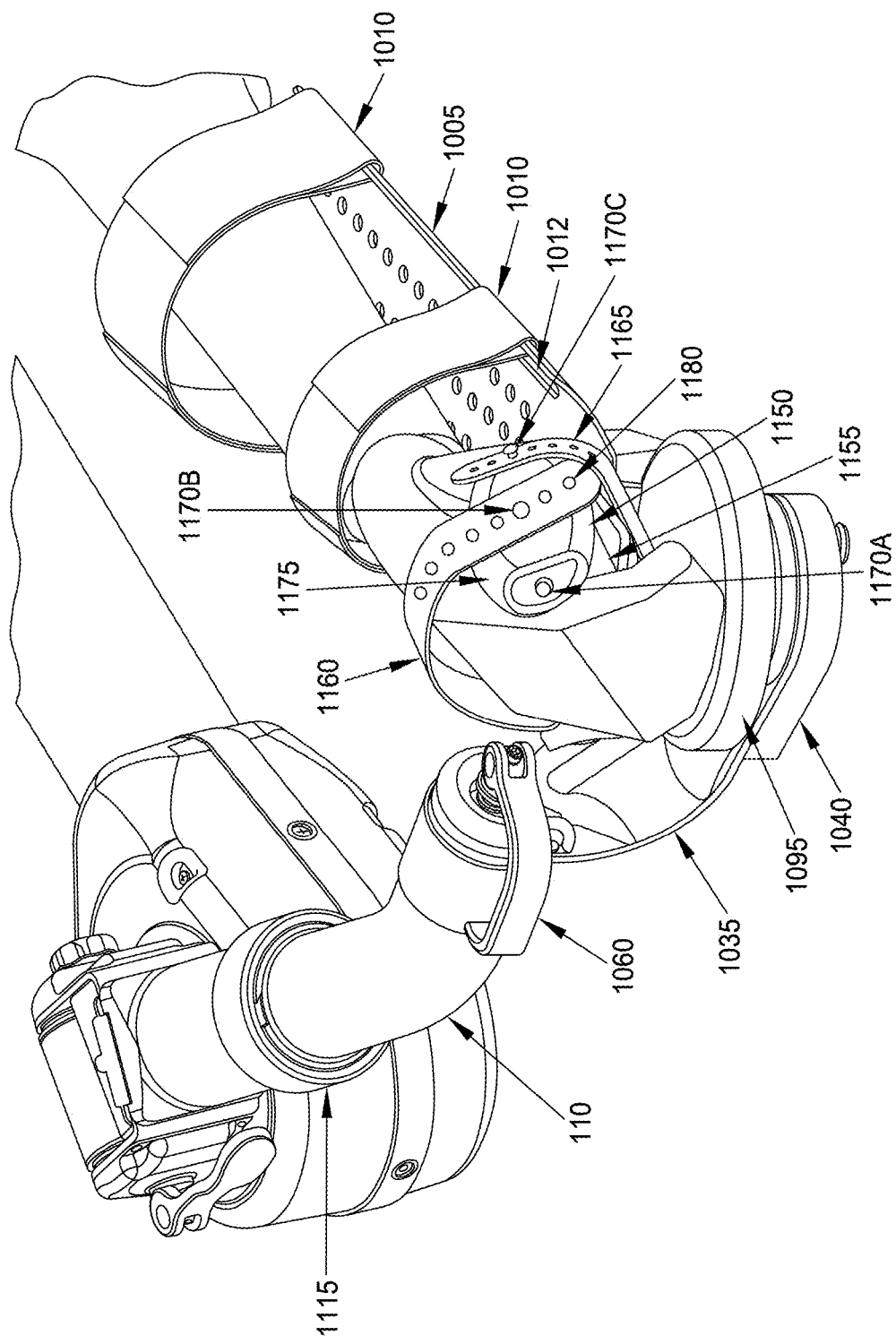
FIGS. 38-40 are schematic views showing an alternative hand grip that can be used with an endpoint device of the robotic device of the present invention.
Figure 39:
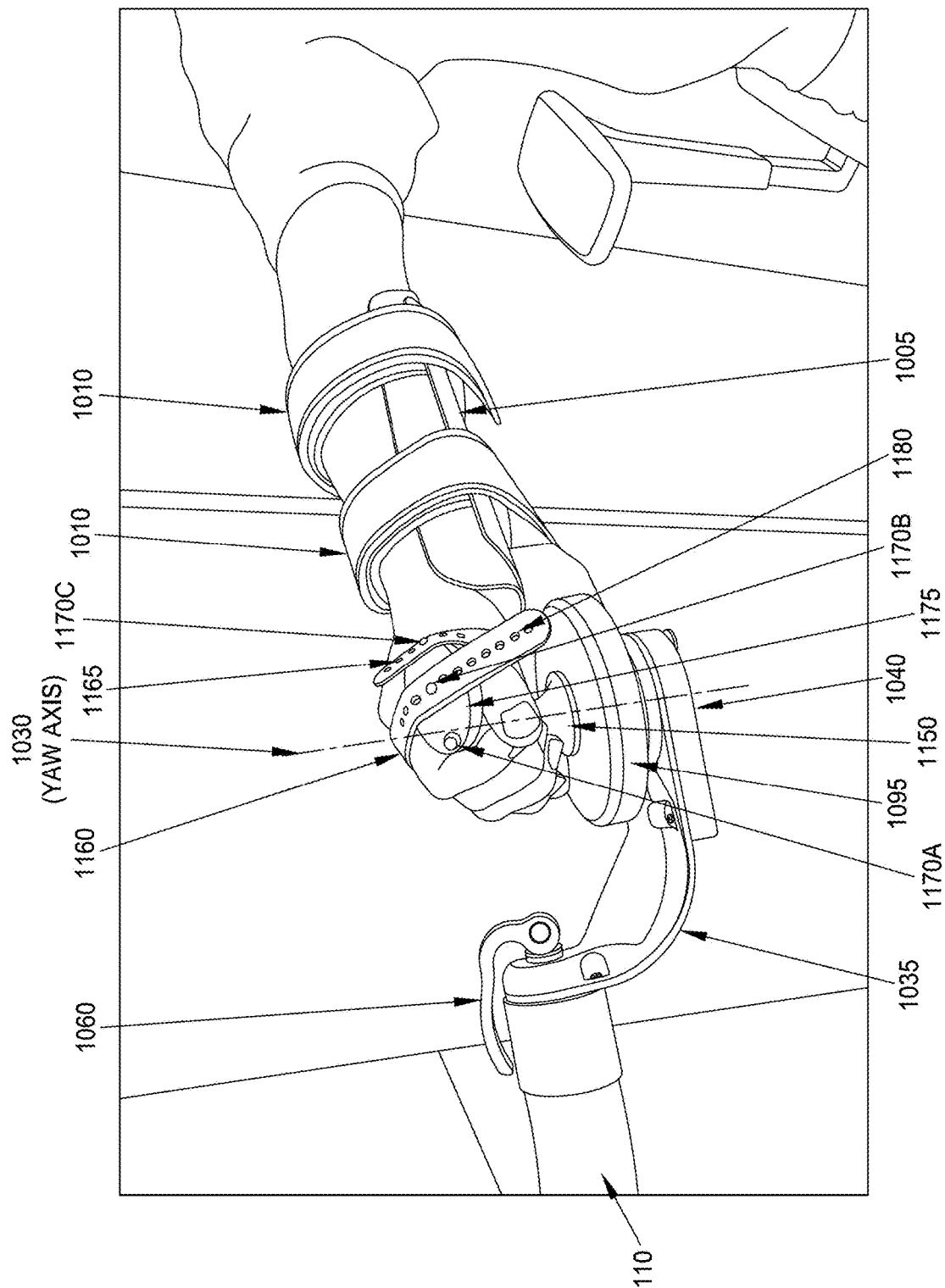
Figure 40:
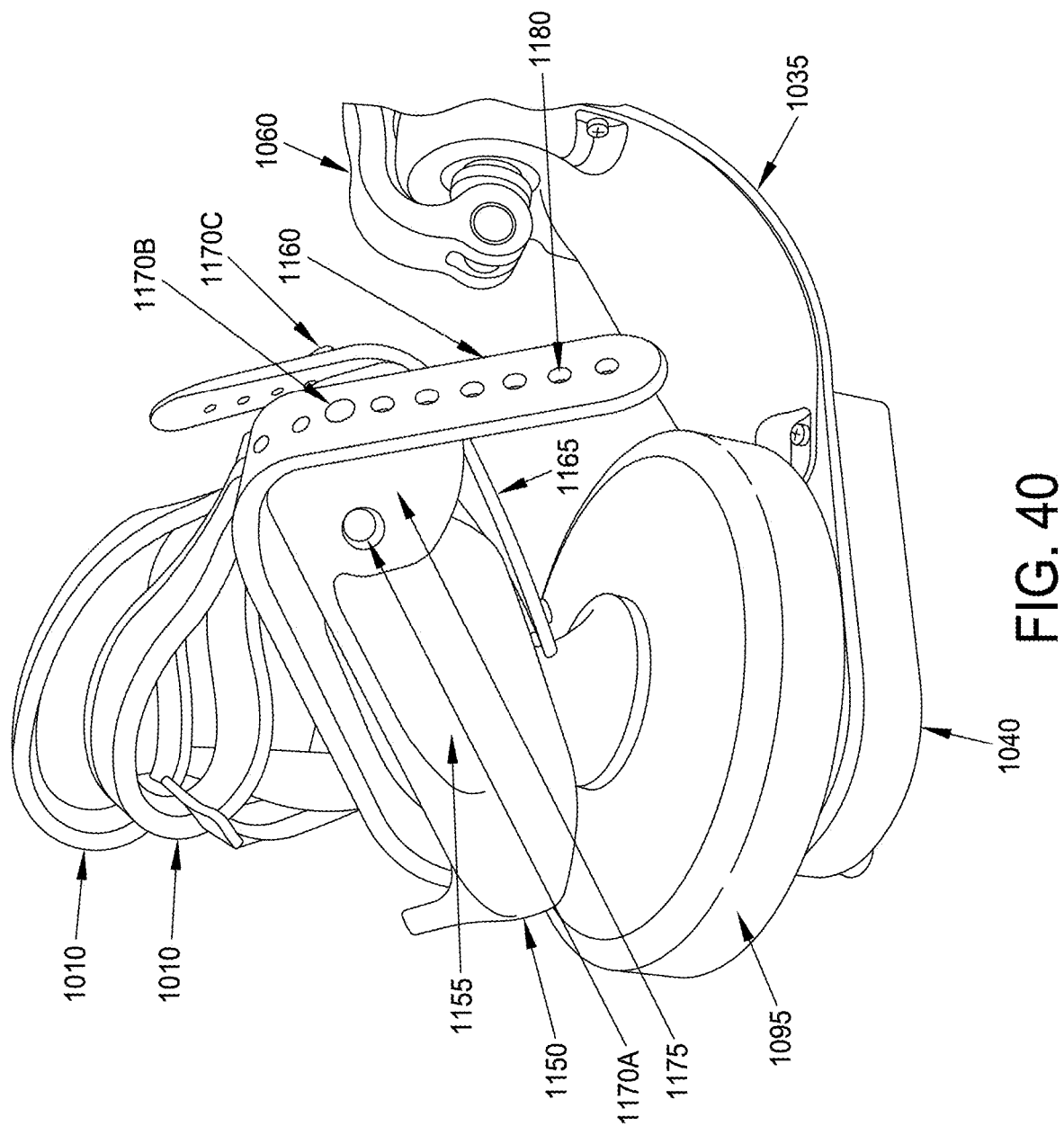

In another embodiment of the present invention, and looking now at FIGS. 38-40, an alternative hand grip for a user is provided. More particularly, it has been found that some users have trouble grasping a ball grip (such as ball grip 820) or a stick grip (such as stick grip 1020) because of physical impairments. Therefore, an angled handlebar grip 1150 is provided in which a user can wrap its fingers around handlebar 1155 and then a finger strap 1160 and a thumb strap 1165 can be positioned over the user's fingers and thumb and connected to a post 1170 on mount 1175 to hold the user's hand on handlebar 1155 of angled handlebar grip 1150. Preferably, multiple holes 1180 are provided in finger strap 1160 and thumb strap 1165 so as to accommodate different sizes of hands. In this way, a user's hand can be secured to a hand grip for rehabilitation and evaluation of the upper extremity of the user without requiring the user to physically grasp a ball grip or stick grip. Of course, if the user does not require finger strap 1160 or thumb strap 1165 (i.e., if the user is capable of grasping handlebar 1155 of angled handlebar grip 1150 under their own power), then finger strap 1160 and/or thumb strap 1165 can be omitted.

Angled handlebar grip 1150 is designed to be used in both right-hand and left-hand configurations. In a preferred form of the present invention, angled handlebar grip 1150 is mounted to rotatable base plate 1095 with a magnetic connection so as to enable angled handlebar grip 1150 to be rotated along yaw axis 1030 when angled handlebar grip 1150 is switched from right-handed use to left-handed use.

By way of example but not limitation, the process of changing angled handlebar grip 1150 from left-handed use to right-handed use will now be described. First, the clamping mechanism connecting outer link 110 to inner link 105 (e.g., lever 593 shown in FIG. 21) is released to unclamp outer link 110 from the extra joint located near the elbow joint J3. This action allows the entire arm beyond the elbow of the device (i.e., outer link 110) to be flipped 180 degrees, then that freedom is re-secured using the clamping mechanism (e.g., lever 593). Next, there is a second 180-degree flip by loosening, flipping and then tightening the clamping mechanism connecting angled handlebar grip 1150 to outer link 110 (e.g., cam-lever 1060). Next, there is a third 180-degree flip where the cradle is rotated 180 degrees along yaw axis 1030. Note that there is no mechanical lock for this last flip because the rotation of this joint is passive. Finally, there is a fourth 180 degree flip where angled handlebar grip 1150 is rotated 180 degrees along yaw axis 1030. To this end, multiple posts 1170 are provided along mount 1175, and multiple holes 1180 are provided in finger strap 1160 and thumb strap 1165 to accommodate right-handed use to left-handed use. By way of example but not limitation, when angled handlebar grip 1150 is used with a right hand, finger strap 1160 is secured to post 1170B and thumb strap 1165 is secured to post 1170C. However, when angled handlebar grip 1150 is used with a left hand, finger strap 1160 is secured to post 1170B and thumb strap 1165 is secured to post 1170A.

To change back from right-handed use to left-handed use, the flips are performed in the same order, but reversing the directions of the flips.

It is important to note that angled handlebar grip 1150 may be used as an alternative to any of the hand grips shown with the previously-described endpoints (e.g., ball grip 820, ball grip 820B, actuated or spring-biased hand-grip 820C, stick grip 1020, etc.). Preferably, the hand grips are mounted to the endpoint device (e.g., to base plate 1095) through a magnetic connection so as to enable one hand grip to be easily swapped in for another hand grip.

Furthermore, while angled handlebar grip 1150 of FIGS. 38-40 is shown without a motor, it is important to note that angled handlebar grip 1150 can also be used with a motor (e.g., motor 1070) to provide powered movement of the wrist.

Providing Game-Based Physical Therapy and Occupational Therapy, and Providing Activity-Based Physical Therapy and Occupational Therapy, with the Robotic Device In the foregoing disclosure, there is disclosed a novel multi-active-axis, non-exoskeletal robotic device for providing physical therapy and occupational therapy (sometimes collectively referred to herein as "physical therapy/occupational therapy" and/or simply "therapy") to a patient.

A. Game-Based Therapy

In one form of the invention, the robotic device is configured to provide game-based rehabilitation. In this form of the invention, the patient views a two-dimensional (2D) or three-dimensional (3D) scene using a computer screen, a projector, glasses, goggles, or similar means. The 2D or 3D scene depicts a game which the patient "plays" by moving their limb (which is connected to the robotic device) so as to cause corresponding movement of a virtual object (or virtual character) within the 2D or 3D scene. As the patient endeavors to appropriately move their limb so as to cause appropriate movement of the virtual object (or virtual character) within the 2D or 3D scene of the game, the patient "effortlessly" participates in the therapy process. This form of the invention is a powerful tool, since it promotes increased engagement of the patient in the therapy process, and thereby yields higher "dosages" of the physical therapy or occupational therapy, which is known to be an essential element in successful recovery from stroke and many other injuries and diseases.

If desired, the 2D or 3D scene may take another non-game form, i.e., the 2D or 3D scene may be a non-game graphical or textual display, with the patient endeavoring to appropriately move their limb (which is connected to the robotic device) so as to cause appropriate movement of a virtual object within a graphical or textual display. This non-game approach, while less engaging for the patient than the game-based physical therapy or occupational therapy described above, is nonetheless capable of providing a valuable assessment measure.

In both of the foregoing forms of the invention, the patient is essentially endeavoring to appropriately move their limb (which is connected to the endpoint of the robotic device) so as to cause corresponding appropriate movement of a virtual object (or virtual character) on a computer screen, projector, glasses, goggles or similar means.

B. Activity-Based Therapy

While the foregoing approaches provide excellent therapy for the patient, they do not lend themselves to Activity Based Training (ABT). With ABT, the patient learns to accomplish an important daily activity, e.g., feeding themselves with a spoon.

To this end, in another form of the present invention, the robotic device is configured so that the therapist guides (e.g., manually assists) the patient in moving their limb (which is connected to the robotic device) through a desired motion (e.g., feeding themselves with a spoon). As this occurs, the robotic device "memorizes" the desired motion (i.e., by recording the movements of the various segments of the robotic device), and then the robotic device thereafter assists the patient in repeating the desired motion, e.g., by helping carry the weight of the patient's limb and by restricting motion of the patient's limb to the desired path. Thus, with the robotic device operating in this activity-based mode, the patient is manipulating a real object in real space (and is not manipulating a virtual object on a computer screen, as with the game-based physical therapy).

However, it should be appreciated that the robotic device is also configured so that activity-based therapy may be provided without requiring physical intervention from the therapist, as it may be sufficient for the robotic device to simply suspend some fraction of the weight of the patient's limb, thereby allowing the patient to succeed at a given activity. The robotic device may also be provided with pre-conceived therapy modalities that go beyond just simply limb suspension, such as a generalized pre-defined path along which the patient movement is constrained, so that the robotic device acts in the sense of a guide.

Additional Applications for the Present Invention

In the preceding description, the present invention is generally discussed in the context of its application for a rehabilitation device. However, it will be appreciated that the present invention may also be utilized in other applications, such as applications requiring high-fidelity force feedback. By way of example but not limitation, these applications may include use as an input/haptic feedback device for electronic games, as a controller for other mechanical devices such as industrial robotic arms and/or construction machines, or as a device for sensing position, i.e., as a digitizer or coordinate-measuring device.

Modifications of the Preferred Embodiments

It should be understood that many additional changes in the details, materials, steps and arrangements of parts, which have been herein described and illustrated in order to explain the nature of the present invention, may be made by those skilled in the art while still remaining within the principles and scope of the invention.

What is claimed is:

1. A robotic device for operation in association with a body of a user, wherein the body of the user comprises a torso and a limb, the robotic device comprising:
    a base;
    an arm comprising a first segment and a second segment, wherein the first segment and the second segment each have a first end and a second end;
    a base joint assembly mounted to the base and to the first end of the first segment of the arm, the base joint assembly being configured to enable movement of the arm along a first axis and a second axis with two independently-controllable degrees of freedom relative to the base, wherein the first axis is a pitch axis and the second axis is a yaw axis;
    an arm joint assembly mounted to the second end of the first segment of the arm and to the first end of the second segment of the arm, the arm joint assembly being configured to enable movement of the second segment of the arm along a third axis relative to the base, wherein the third axis is a yaw axis;
    a grip configured to be gripped by the limb of the user;
    a cradle for receiving the limb of the user; and
    a connector for rotatably connecting the grip and the cradle to the second end of the second segment of the arm, wherein the connector comprises a first portion rotatably mounted to the second end of the second segment of the arm, a second portion rotatably mounted to the grip and the cradle and a third portion rotatably mounted to the grip, wherein the first portion of the connector is rotatably connected to the second end of the second segment of the arm so as to enable the grip and the cradle to be rotatable about a pitch axis, the second portion of the connector is rotatably connected to the grip and the cradle so as to enable the grip and the cradle to be rotatable about a yaw axis, and the third portion of the connector is rotatably connected to the grip so as to enable the grip to be rotatable about a roll axis.

2. A robotic device according to claim 1 wherein the grip comprises a motor assembly for adjusting the grip along at least one of the yaw axis and the roll axis.

3. A robotic device according to claim 1 wherein the grip comprises one from the group consisting of a ball grip, an actuated hand grip, a spring-biased hand grip, a stick grip and an angled handlebar grip.

4. A robotic device according to claim 1 wherein the grip comprises an angled handlebar grip and at least one strap for securing the limb of the user to the handlebar grip.

5. A robotic device according to claim 1 wherein the cradle comprises at least one strap for securing the limb of the user to the cradle.

6. A robotic device according to claim 5 wherein the cradle is configured to allow a wrist of the user to pronate and supinate without interference from the cradle.

7. A robotic device according to claim 1 further comprising a controller for controlling operation of the arm.

8. A robotic device according to claim 1 wherein the grip comprises a user-presence sensing unit for detecting engagement of the grip by the limb of the user.

9. A robotic device according to claim 8 wherein the user-presence sensing unit comprises a capacitive sensor.

10. A robotic device according to claim 1 wherein the grip comprises a force sensing unit for measuring the force being applied to the grip by the limb of the user.

11. A robotic device according to claim 1 wherein the first portion of the connector is mountable to the second end of the second segment of the arm using a modular connection which provides mechanical mounting of the connector to the second end of the second segment of the arm and electrical communication between the grip and the base.

12. A robotic device according to claim 1 wherein the first portion of the connector is mountable to the second end of the second segment of the arm using a modular connection which allows the robotic device to be used in either a right-hand configuration or a left-hand configuration.

13. A robotic device according to claim 7 wherein the controller is configured to compensate for the effects of gravity.

14. A robotic device according to claim 1 wherein the grip comprises a hand-grip and a base plate, and further wherein the hand-grip is mounted to the base plate with a magnet.

15. A method for providing rehabilitation therapy to a user, the method comprising:
providing a robotic device comprising:
a base;
an arm comprising a first segment and a second segment, wherein the first segment and the second segment each have a first end and a second end;
a base joint assembly mounted to the base and to the first end of the first segment of the arm, the base joint assembly being configured to enable movement of the arm along a first axis and a second axis with two independently-controllable degrees of freedom relative to the base, wherein the first axis is a pitch axis and the second axis is a yaw axis;
an arm joint assembly mounted to the second end of the first segment of the arm and to the first end of the second segment of the arm, the arm joint assembly being configured to enable movement of the second segment of the arm along a third axis relative to the base, wherein the third axis is a yaw axis;
a grip configured to be gripped by the limb of the user;
a cradle for receiving the limb of the user; and
a connector for rotatably connecting the grip and the cradle to the second end of the second segment of the arm, wherein the connector comprises a first portion rotatably mounted to the second end of the second segment of the arm, a second portion rotatably mounted to the grip and the cradle and a third portion rotatably mounted to the grip, wherein the first portion of the connector is rotatably connected to the second end of the second segment of the arm so as to enable the grip and the cradle to be rotatable about a pitch axis, the second portion of the connector is rotatably connected to the grip and the cradle so as to enable the grip and the cradle to be rotatable about a yaw axis, and the third portion of the connector is rotatably connected to the grip so as to enable the grip to be rotatable about a roll axis; and
operating the robotic device.

16. A method according to claim 15 wherein operating the robotic device comprises adjusting the grip along at least one of the pitch axis, the yaw axis and the roll axis so as to provide rehabilitation therapy to the user.

17. A method according to claim 16, further comprising a display screen displaying a virtual scene, wherein adjusting the grip affects the virtual scene.

18. A method according to claim 17 wherein affecting the virtual scene comprises controlling the position of a virtual on-screen object.

19. A method according to claim 15 wherein the grip comprises a motor assembly for adjusting the grip along at least one of the yaw axis and the roll axis.

* * * * *